(12) United States Patent
Ochiai et al.

(10) Patent No.: US 7,099,937 B1
(45) Date of Patent: Aug. 29, 2006

(54) SYSTEM FOR SEARCHING FOR DEVICE ON NETWORK

(75) Inventors: Masato Ochiai, Yokohama (JP); Nobuhiko Maki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1012 days.

(21) Appl. No.: 09/609,222

(22) Filed: Jun. 30, 2000

(30) Foreign Application Priority Data

| Jul. 2, 1999 | (JP) | ................................. | 11-189727 |
| Jul. 2, 1999 | (JP) | ................................. | 11-189729 |
| Jul. 6, 1999 | (JP) | ................................. | 11-192383 |
| Jul. 14, 1999 | (JP) | ................................. | 11-200848 |
| Jul. 16, 1999 | (JP) | ................................. | 11-203639 |
| Jul. 16, 1999 | (JP) | ................................. | 11-203640 |

(51) Int. Cl.
*G06F 15/173* (2006.01)

(52) U.S. Cl. ....................................... 709/224; 358/1.1

(58) Field of Classification Search ........ 709/220–224, 709/226, 203; 707/10, 100; 358/1.9, 1.15–1.16, 358/1.1; 345/764; 714/47; 715/700, 761; 719/318

See application file for complete search history.

(56) References Cited

U.S. PATENT DOCUMENTS

| 5,872,569 | A | * | 2/1999 | Salgado et al. ............. 345/764 |
| 5,991,846 | A | * | 11/1999 | Ooki .......................... 710/241 |
| 6,430,711 | B1 | * | 8/2002 | Sekizawa .................... 358/1.14 |
| 6,552,813 | B1 | * | 4/2003 | Yacoub ....................... 358/1.1 |
| 2003/0115199 | A1 | | 6/2003 | Ochial et al. ................. 707/10 |
| 2003/0120754 | A1 | | 6/2003 | Muto et al. ................. 709/220 |
| 2004/0083210 | A1 | | 4/2004 | Ochial et al. .................. 707/3 |

OTHER PUBLICATIONS

Hattori Munehiro et al. "Printer Management system" pp. 1-33. (Translation of Japanese Patent Publication 06-324823) Nov. 25, 1994.*
U.S. Appl. No. 09/570,407, filed May 12, 2000.
U.S. Appl. No. 09/612,946, filed Jul. 10, 2000.

* cited by examiner

*Primary Examiner*—Andrew Caldwell
*Assistant Examiner*—Hieu Le
(74) *Attorney, Agent, or Firm*—Fitzpatrick, Cella, Harper & Scinto

(57) ABSTRACT

A system capable of displaying locations of devices connected to a network so as to be easy to understand for a user with managing location information of the devices in a hierarchical structure and capable of displaying event information about jobs issued by the user on a display unit. The system manages the location information of the devices connected to the network in the hierarchical structure, makes a client unit store map information so as to specify a hierarchical location of a device requested to be searched for if the client unit issues a request of searching for the device, and enables a display unit of the client unit to display information indicating the specified device location and information about a job issued by the user, by which the user can easily and visually understand how the issued job has been processed.

21 Claims, 58 Drawing Sheets

| | | | | |
|---|---|---|---|---|
| 801 NM | LBP1110 | MFP6550 | LBP3310 | LBP3310 | SCN2160 |
| 802 MAP | 10X+10Y | 5X+30Y | 10X+10Y | 15X+25Y | 5X+5Y |
| 803 DV | PRINTER | MFP | PRINTER | PRINTER | SCANER |
| 804 BL | 2-1 | 2-1 | 2-2 | 1-1 | 1-2 |
| 805 FL | 2F | 2F | 2F | 1F | 1F |
| 806 BU | AA BUILDING | AA BUILDING | AA BUILDING | AA BUILDING | AA BUILDING |
| 807 OP | EXTEND | EXTEND | EXTEND | EXTEND | EXTEND |
| 808 BR | TOKYO BRANCH | TOKYO BRANCH | TOKYO BRANCH | TOKYO BRANCH | TOKYO BRANCH |
| 809 O | ABC TRADING CO LTD. | ABC TRADING CO LTD. | ABC TRADING CO LTD. | ABC TRADING CO LTD. | ABC TRADING CO LTD. |
| 810 C | JP | JP | JP | JP | JP |
| 811 COLOR | TRUE | FALSE | FALSE | FALSE | TRUE |
| 812 IP ADDRESS | 192.1.2.1 | 192.1.2.10 | 192.1.2.100 | 192.1.2.101 | 192.1.2.200 |

FIG. 10

| | | |
|---|---|---|
| 901 | LOCATION INFORMATION TAG | |
| 902 | NM | LBP1110 |
| 903 | MAP | 10X+10Y |
| 904 | DV | PRINTER |
| 905 | BL | 2-1 |
| 906 | FL | 2F |
| 907 | BU | AA BUILDING |
| 908 | OP | EXTEND |
| 909 | BR | TOKYO BRANCH |
| 910 | O | ABC TRADING CO LTD. |
| 911 | C | JP |
| 912 | DEVICE ATTRIBUTE INFORMATION TAG | |
| 913 | COLOR | TRUE |
| 914 | IP ADDRESS | 192.1.2.1 |

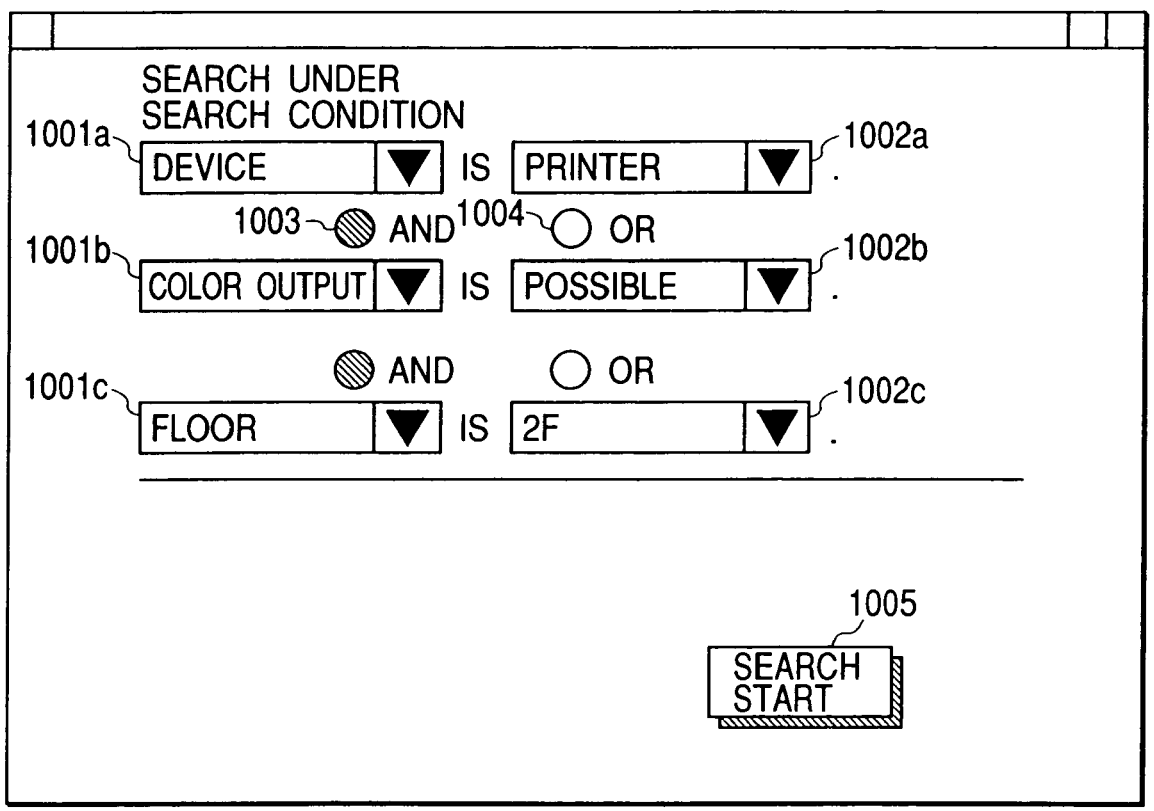

FIG. 14

| NM | LBP1110 | 1301 |
|---|---|---|
| MAP | 10X+10Y | 1302 |
| DV | PRINTER | 1303 |
| BL | 2-1 | 1304 |
| FL | 2F | 1305 |
| BU | AA BUILDING | 1306 |
| OP | EXTEND | 1307 |
| BR | TOKYO BRANCH | 1308 |
| O | ABC TRADING CO LTD. | 1309 |
| C | JP | 1310 |
| COLOR | TRUE | 1311 |
| IP ADDRESS | 192.1.2.1 | 1312 |

FIG. 15

C=JP, O=ABC TRADING CO LTD.,
BR=TOKYO BRANCH, OP=EXTEND,
BU=AA BUILDING

1401

| BL (1402) | BITMAP (1403) |
|---|---|
| 1-1 | FIG. 16 |
| 1-2 | FIG. 17 |
| 2-1 | FIG. 18 |
| 2-2 | FIG. 19 |
| ETC | FIG. 20 |

FIG. 21
| NM | BITMAP |
|---|---|
| MFP6550 | 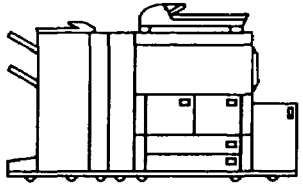 |
| LBP1110 |  |
| LBP3310 |  |
| SCN2160 | 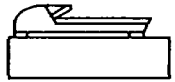 |
| PC5330 |  |
| NOTE5133 |  |
| GY33115 | 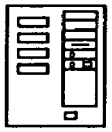 |
| PC6450 | 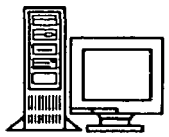 |
| UNKOWN |  |

FIG. 32

| JOBID | 1234 | 1236 | |
|---|---|---|---|
| EVENT CONDITION | AT PRINT END OR ERROR OCCUR | AT PRINT END | |
| NOTICE PROTOCOL | TCP/IP | TCP/IP | |
| NOTICE DESTINATION NETWORK ADDRESS | 192.1.2.16:1025 | 192.1.2.18:2040 | |

| EVENT NOTICE TAG |  |
|---|---|
| JOBID=1234 | |
| EVENT CONDITION<br>=PRINT END | |
| EVENT NOTICE DESTINATION<br>=TCPIP:192.1.2.16.1025 | |
| LOCATION TAG | |
| NM | LBP1110 |
| MAP | 10X+10Y |
| DV | PRINTER |
| BL | 2-1 |
| FL | 2F |
| BU | AA BUILDING |
| OP | EXTEND |
| BR | TOKYO BRANCH |
| O | ABC TRADING CO LTD. |
| C | JP |

3302 (braces the LOCATION TAG rows)

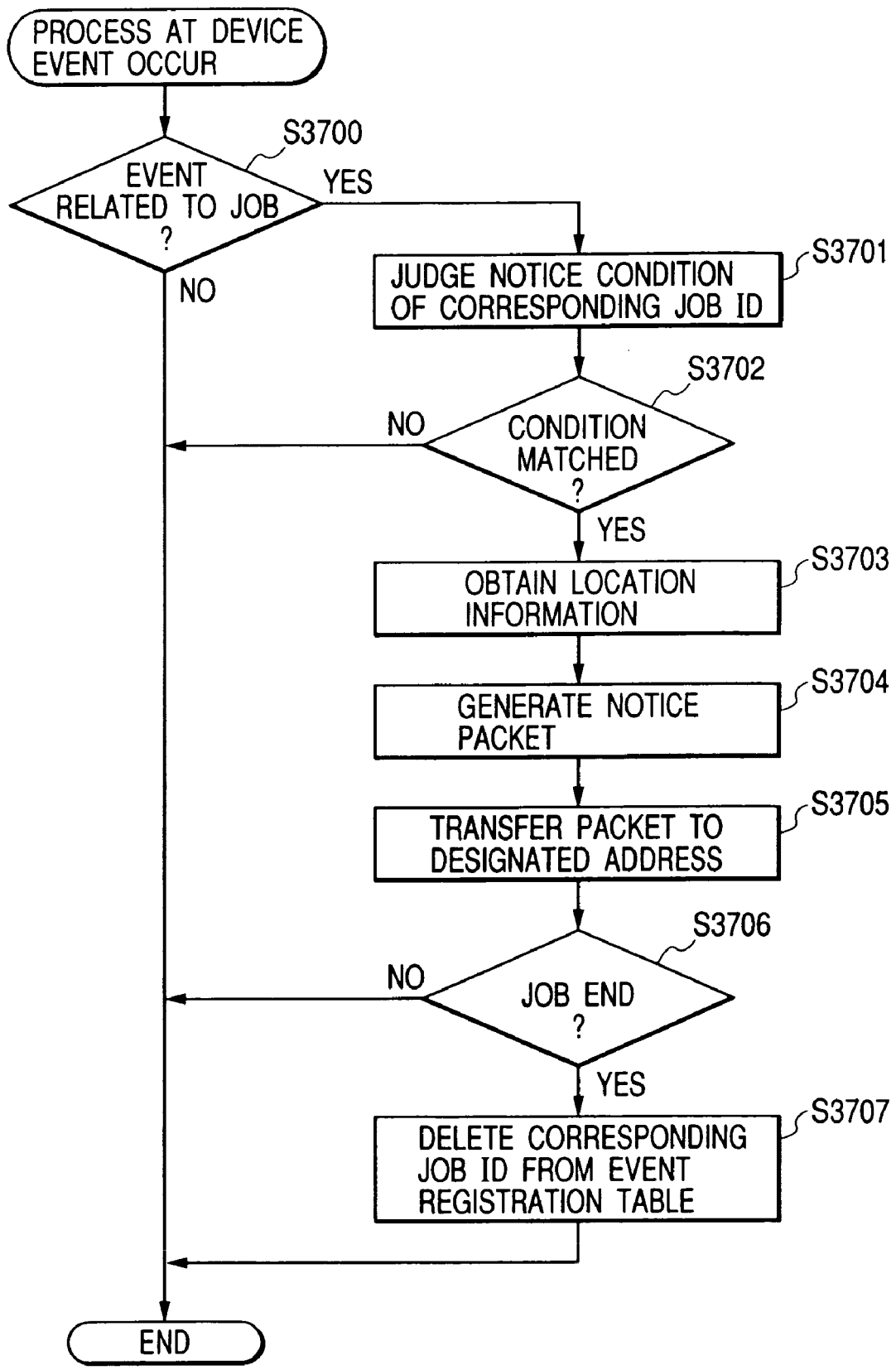

FIG. 38

| C | JP | JP | JP | JP | JP |
|---|---|---|---|---|---|
| O | ABC TRADING CO LTD. | ABC TRADING CO LTD. | ABC TRADING CO LTD. | ABC TRADING CO LTD. | ABC TRADING CO LTD. |
| BR | | TOKYO BRANCH | TOKYO BRANCH | TOKYO BRANCH | TOKYO BRANCH |
| OP | | EXTEND | EXTEND | EXTEND | EXTEND |
| BU | | | AA BUILDING | AA BUILDING | AA BUILDING |
| FL | | | | 2F | 1F |
| BL | | | | | |
| MAP | | | | | |
| CORRESPONDING MAP | FIG. 33 | FIG. 35 | FIG. 37 | FIG. 39 | FIG. 41 |

| C | JP | JP | JP | JP | — |
|---|---|---|---|---|---|
| O | ABC TRADING CO LTD. | ABC TRADING CO LTD. | ABC TRADING CO LTD. | ABC TRADING CO LTD. | — |
| BR | TOKYO BRANCH | TOKYO BRANCH | TOKYO BRANCH | TOKYO BRANCH | — |
| OP | EXTEND | EXTEND | EXTEND | EXTEND | — |
| BU | AA BUILDING | AA BUILDING | AA BUILDING | AA BUILDING | — |
| FL | 1F | 2F | 2F | 2F | |
| BL | 1-1 | 1-2 | 2-1 | 2-2 | |
| MAP | | | | | |
| CORRESPONDING MAP | FIG. 16 | FIG. 17 | FIG. 18 | FIG. 19 | FIG. 20 |

FIG. 53

| NM | READY | NO PAPER | PAPER JAMMED |
|---|---|---|---|
| MFP6550 | | | |
| LBP1110 | | | |
| LBP3310 | | | |
| SCN2160 | | NONE | NONE |
| PC5330 | | NONE | NONE |
| NOTE5133 | | NONE | NONE |
| GY33115 | | NONE | NONE |
| PC6450 | | NONE | NONE |
| UNKOWN PRINTER | | | |

FIG. 69

| EVENT NOTICE | |
|---|---|
| OCCURRED EVENT TAG | |
| EVENT=PAPER EMPTY | |
| LOCATION TAG | |
| NM | LBP1110 |
| MAP | 10X+10Y |
| DV | PRINTER |
| BL | 2-1 |
| FL | 2F |
| BU | AA BUILDING |
| OP | EXTEND |
| BR | TOKYO BRANCH |
| O | ABC TRADING CO LTD. |
| C | JP |

FIG. 70

| NOTICE CONDITION | NOTICE PROTOCOL | NOTICE DESTINATION NETWORK ADDRESS |
|---|---|---|
| PAPER EMPTY \| PAPER JAM | TCP/IP | 192.1.2.16:1025 |
| PAPER EMPTY | TCP/IP | 192.1.2.18:2040 |
|  |  |  |

SYSTEM FOR SEARCHING FOR DEVICE ON NETWORK

BACKGROUND OF THE INVENTION

1. Field of the Invention

The present invention relates to a system for searching for a device on a network, and particularly to a device search system for displaying a device which has been found and its location information understandably.

2. Related Background Art

Conventionally, there has been provided a method of efficiently finding and using various sources (a printer, a server unit, a scanner, etc.) connected to a network, which is called a directory service.

The above directory service is, in a sense, a phone directory related to a network, which is used for storing various types of information. As a specific example of a directory system with the above directory service, there is a Lightweight Directory Access Protocol (LDAP), for example. Provisions of the above LDAP are described in standard specifications, RFC (request for comments) 1777 issued by the Internet Engineering Task Force (IETF).

By using the above directory service to search for device terminal equipments connected to a network, for example, you can obtain a network address list of the device terminal equipments usable on the network.

In the above list, however, it is impossible to obtain location information of devices to be used which is easy to understand.

By way of example of a network printer as a device, it has been desired to achieve a system capable of notifying a user understandably of hierarchical location information of the device such as, for example, "where is a printer nearest my location on my floor" or "what location in the building is a printer capable of outputting a color image."

Furthermore, conventionally it has been desired to achieve a system capable of understandably notifying a user of information on a location of a printer which has been used for printing, on whether or not printing requested by the user is normally completed, or on an occurrence of an error such as a paper jam or paper empty condition if an execution of printing or the like is requested of an information processing unit on the network.

SUMMARY OF THE INVENTION

In view of these problems, it is an object of the present invention to provide a system capable of understandably notifying a user of job status in addition to a location of a network device after requesting the network device to execute the job.

According to one aspect, the present invention which achieves this object related to a system comprising a device for processing a job requested via a network and an information processing unit for monitoring the requested job, wherein the device stores hierarchical location information representing a location of itself hierarchically, judges status of the requested job, and transmits first information indicating the judged job status and second information indicating the hierarchical location information to another unit on the network on request from the unit.

Then, the information processing unit receives the first and second information from the device and displays the first information with the location of the device on the basis of the second information.

Other objects and features of the present invention shall be apparent from the following specifications and accompanying drawings.

BRIEF DESCRIPTION OF THE DRAWINGS

FIG. 9 is a diagram showing hierarchical location information and attribute information managed by a server unit;

FIG. 10 is a diagram showing hierarchical location information and attribute information registered by a device;

FIG. 12 is a diagram showing an illustration of the device search input screen;

FIG. 13 is a diagram showing an example of a device search condition;

FIG. 14 is a diagram showing an example of a device search result;

FIG. 15 is a diagram showing bit maps managed by a client unit and the hierarchical location information;

FIG. 21 is a diagram showing device icons managed by a client unit;

FIG. 32 is a diagram showing an event notice table managed by a device;

FIG. 33 is a schematic diagram for an event notice sent from a device to a client;

FIG. 37 is a flowchart showing a processing procedure at an occurrence of a device event;

FIG. 38 is a diagram showing an example of a layout bit map list corresponding to respective classes according to a third embodiment;

FIG. 53 is a diagram showing a device icon management table for a client unit according to a fourth embodiment;

FIG. 69 is a diagram showing an event notice packet of the device according to the fifth embodiment; and FIG. 70 is a diagram showing an event notice destination table managed by the device according to the fifth embodiment.

DETAILED DESCRIPTION OF THE PREFERRED EMBODIMENTS

Embodiments of the present invention will be described in detail below by referring to accompanying drawings.

Figure 1:
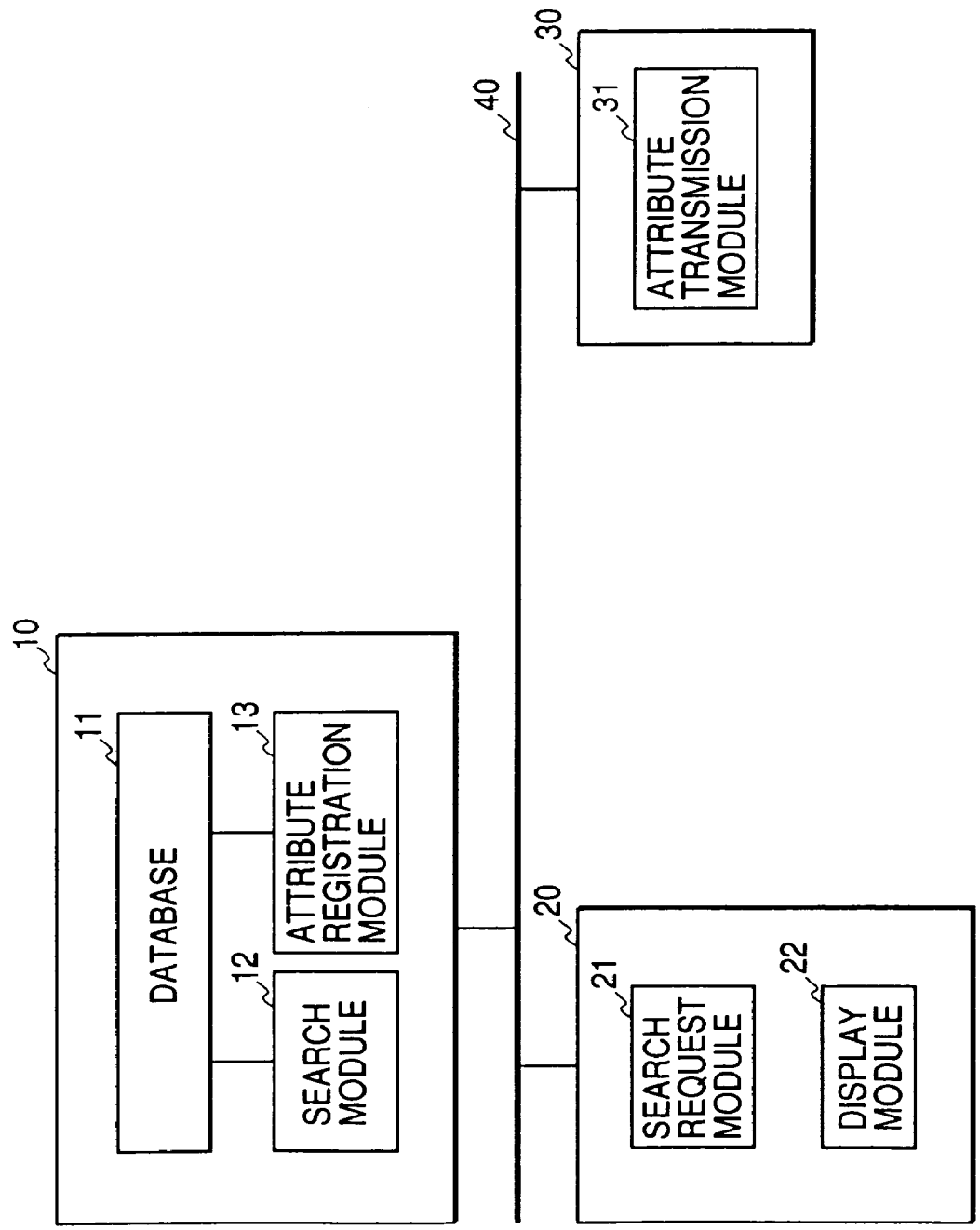
FIG. 1 is a diagram showing features of a network system according to the present invention.

Referring to FIG. 1, there is shown a diagram illustrating a configuration of a device search system according to an embodiment of the present invention.

As shown in FIG. 1, a client unit 20, a device 30, and a server unit 10 are arranged on a network 40.

The client unit 20 comprises a general purpose computer and the like, for example, having a search module 21 for transmitting a desired device search condition to the server unit and receiving its result and a display module for visually displaying the received search result.

The server unit 10 has a function of a directory server having a database 11 for managing attribute information of the device on the network 40. The database 11 contains registered identification information of devices on the network and information on various attributes of the devices.

The search module 12 searches for a device satisfying a device search condition from the database 11 on the basis of the device search condition received from the client unit 20 and transmits the search result to the client unit. The device attribute registration module 13 receives a device attribute from the device 30 or the like and registers it on the database 11.

The device 30 has a function of providing various services to the client unit 20 or the like, such as, for example, a scanner, a printer, or a facsimile. The device attribute transmission module 31 transmits attribute information of itself to the server unit 10 for issuing a registration request.

The example shown in FIG. 1 is an illustration of a configuration of the minimum unit of a device search system, and therefore there are a plurality of client units and a plurality of devices arranged on the network.

In addition, it can be a device search system in which a plurality of server units are arranged.

Figure 2:
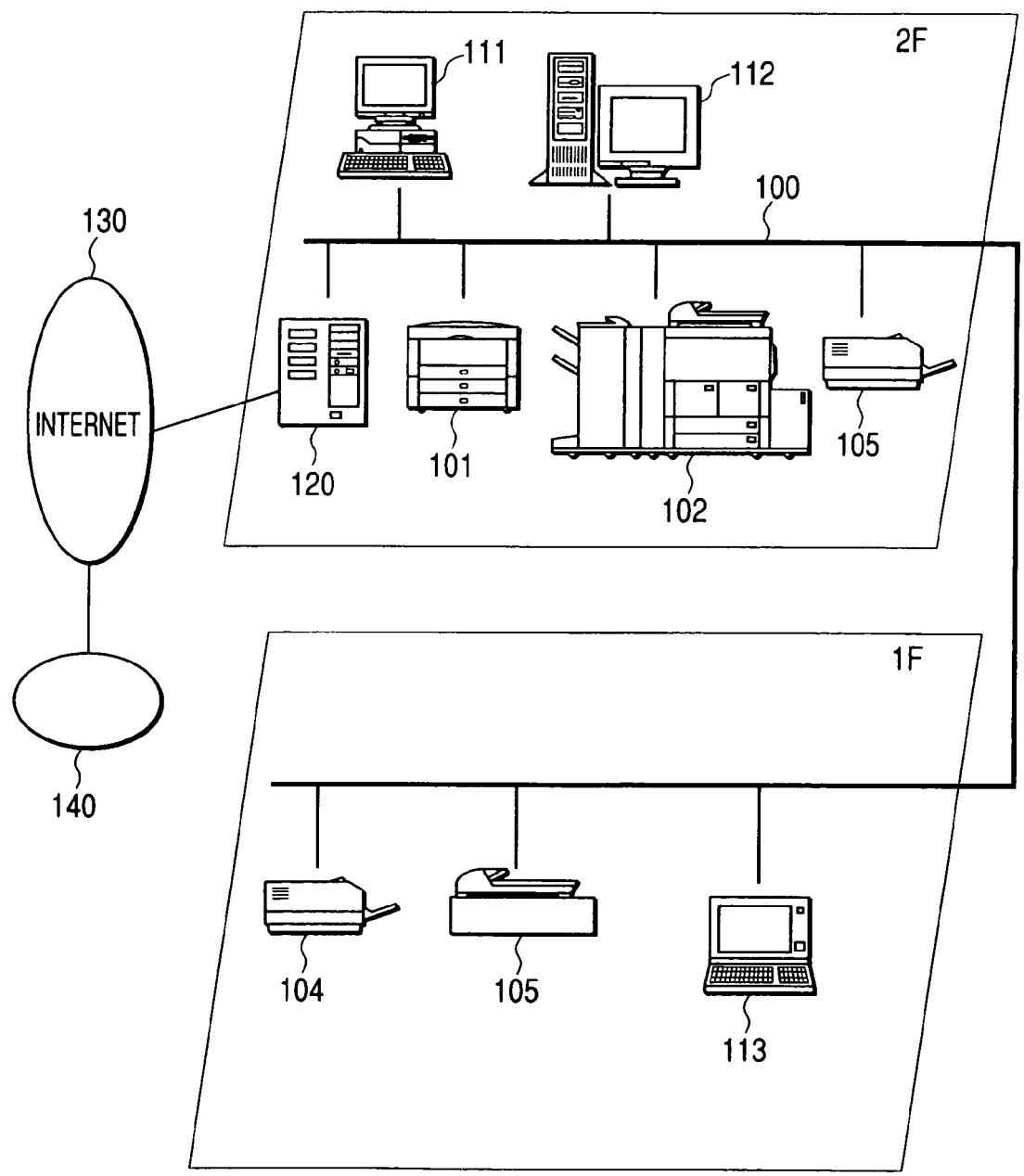
FIG. 2 is a diagram showing a configuration of a network in which a device search system according to an embodiment of the present invention is operable.

Referring to FIG. 2, there is shown a diagram of a configuration of a network in which the device search system according to this embodiment is operable.

In FIG. 2, there are shown a color printer 101, an MFP 102 (multi-function peripheral; while it is a copying machine, it is usable also as a network printer), monochrome printers 103 and 104, and a network-connected scanner 105.

Reference characters 111 and 113 designate a desk-top personal computer and a notebook-sized personal computer, respectively. These are personal computers in which a network client program is executable. These desktop personal computer 111 and the notebook-sized personal computer 113 are connected as client units to the network, having a function of issuing query information on a device satisfying a desired condition to the server unit connected to the network as described later and display information for displaying a search result.

A reference numeral 112 designates a personal computer in which a network server program is executable. The personal computer 112 is connected as a server unit to the network, with various information on the network devices 101 and 105 as described later being stored, having a function of receiving a device search query sent from the client terminal equipment 111 or 113 connected to the network and returning its result.

Among these devices, the color printer, the multi-function copying machine 102, the monochrome printer 103, the client unit 111, the server unit 112, and a fire wall 120 are installed on the second floor, and the monochrome printer 140 and the scanner 105 are installed on the first floor. While the notebook-sized personal computer 113 is currently connected to a LAN 100 on the first floor, it may be removed in some cases.

Furthermore, the network 100 in which these devices are connected with each other is connected to an Internet 130 via the fire wall 120 and then connected to other networks 140 via the Internet 130.

Figure 3:
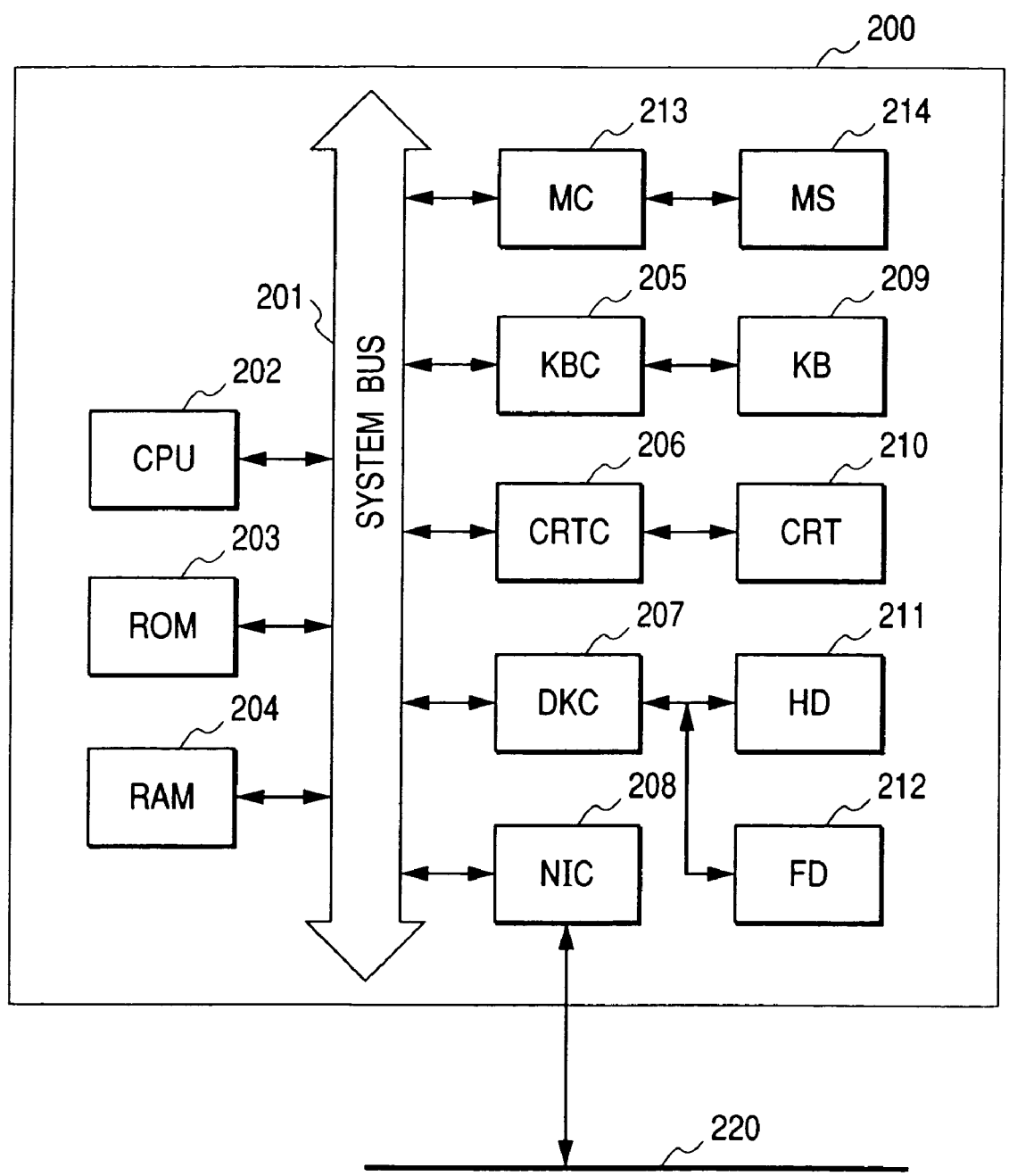
FIG. 3 is a diagram showing an internal configuration of a general personal computer.

Referring to FIG. 3, there is shown a schematic constitutional diagram showing an internal configuration of a general personal computer. The desktop personal computer 111, the notebook-sized personal computer 113, and the server terminal equipment 112 shown in FIG. 2 have this kind of an internal configuration.

In FIG. 3, there is shown a personal computer 200 in which client unit software or network server unit software (hereinafter, collectively referred to as "network device terminal equipment search software") is executable, which is equivalent to the device 111, 112, or 113.

The PC 200, which has a CPU 202 for executing network device search software stored in a ROM 203 or a hard disk (HD) 211 or supplied from a floppy disk drive (FD) 212, generally controls respective devices connected to a system bus 201.

A RAM 204 functions as a main memory, a work area, or the like of the CPU 202. A keyboard controller (KBC) 205 controls an instruction input from a keyboard (KB) 209 or from a pointing device which is not shown. A CRT controller (CRTC) 206 controls a display of a CRT display (CRT) 210.

A disk controller (DKC) 207 controls accesses to the hard disk (HD) 211 and a floppy disk controller (FD) 212 for storing a boot program, various applications, an editing file, a user file, a network management program or the like.

A network interface card (NIC) 208 is used for interactively transmitting or receiving data to or from a network printer, other network devices, or other PCs via the LAN 220.

A mouse controller (MC) 213 controls a mouse (MS) 214. In this embodiment, the LAN 220 is the same as the LAN 100 in FIG. 2.

Next, a description will be made below for hierarchical location information for indicating a location of a device on a network.

Figure 4:
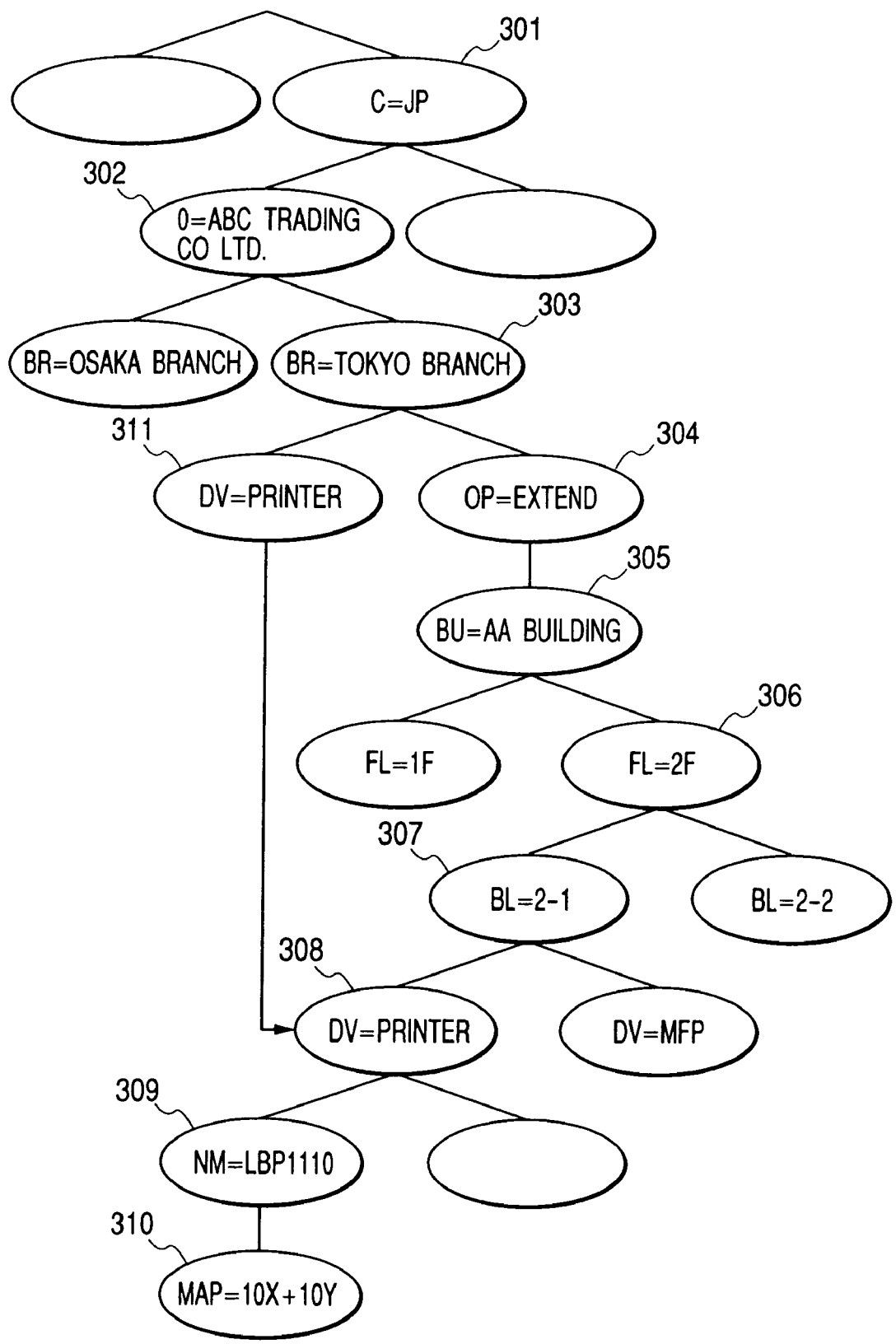
FIG. 4 is a diagram showing an example of hierarchical location information.

As shown in FIG. 4, a data structure of the hierarchical location information is a hierarchical structure so that more detailed location information is specified in order from the top class to the bottom class.

Therefore, a user may specify a desired class according to a purpose of use. In FIG. 4, regarding an LBP 1110 designated by a reference numeral 309, its hierarchical location information is specified as (C=JP (301), O=ABC trading Co., Ltd. (302), BR=Tokyo branch (303), OP=extend (304), BU=AA building (305), FL=2F (306), BL=2-1 (307), DV=printer (308)). In this case, a map shows a location "10X+10Y."

Describing respective entries, C indicates country information (JP is Japan, US is United States, etc.), O indicates organization information (ABC Trading Co., Ltd, XYZ Products Co., Ltd, etc.), and BR indicates a branch or a local (Tokyo branch, Osaka branch, etc.; hereinafter, referred to as "branch information").

BU indicates building information as a building name (such as AA building, BB building, etc.), FL indicates floor information as a floor number (such as 1F, 2F, etc.), BL indicates block information as a block number (1-1, 2-1, etc.), DV indicates a device (printer, MFP, etc.) and NM indicates a device name (LBP 1110, LBP 3310, etc.).

In addition, a layout bit map which is image data of a visually displayed layout corresponding to the block BL and the MAP in FIG. 4 indicates coordinate information on the map.

Furthermore, OP in FIG. 4 indicates option information, which means that information on a BU class, an FL class, and a BL class are included (extend).

It is also possible to set other classes in the option information and to apply a data structure having no settings of classes in the option information.

As described above, a main object of the present invention is to specify a location of a device requested to be searched for so as to display the location of the specified device understandably for a user by managing location information of respective device terminal equipments connected to the network in this hierarchical structure.

FIGS. 5 to 8 show examples of layout bit maps corresponding to block classes of the hierarchical location information, and a location of a device can be displayed understandably by displaying these layout bit maps on the client unit 111.

Figure 5:
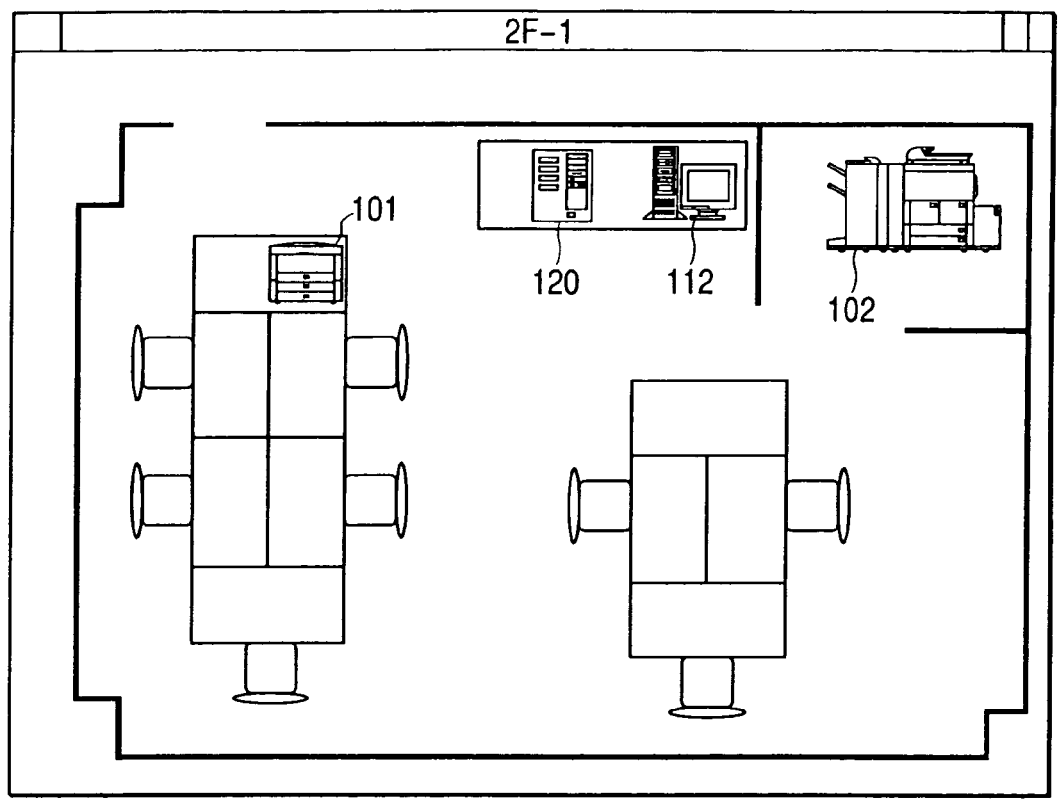
FIG. 5 is a diagram showing locations of respective devices in a 2F 2-1 block.

Referring to FIG. 5, there is shown a location map in the 2-1 block on 2F. A layout of actual desks and partition conditions on the floor is previously stored as a bit map and then a color printer 101 and an MFP 102 are arranged on the layout and a fire wall 120 and a server unit 112 are arranged in a layout as shown in FIG. 5.

Figure 6:
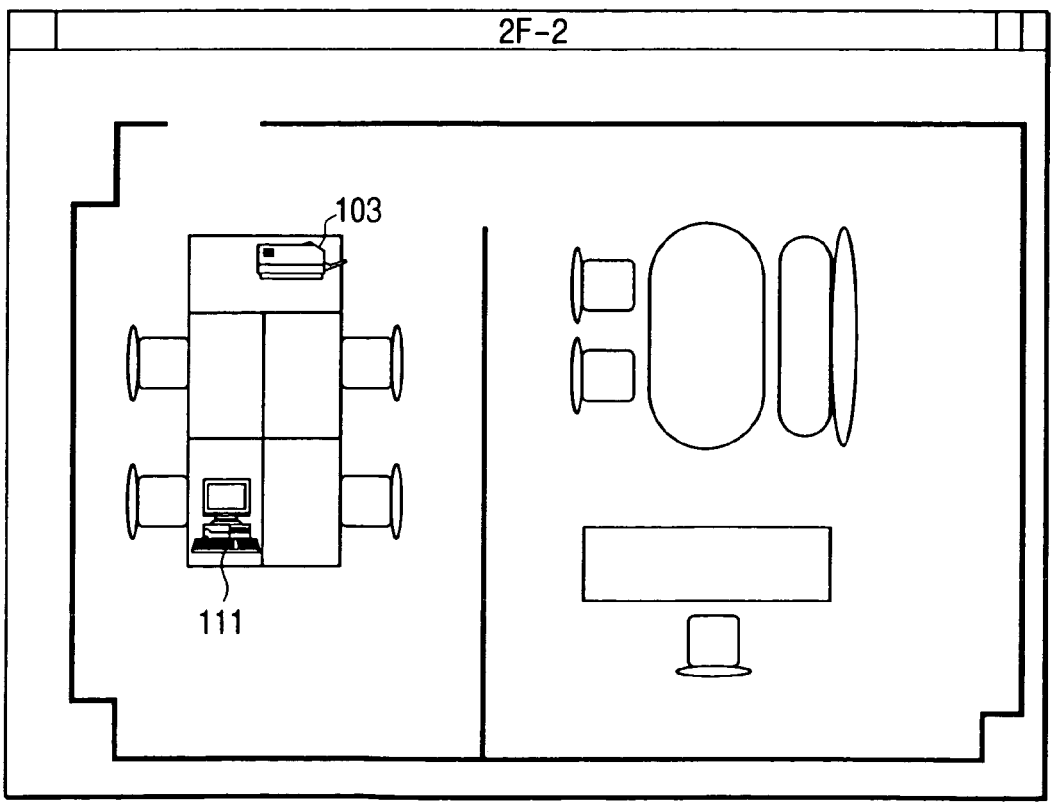
FIG. 6 is a diagram showing locations of respective devices in a 2F 2-2 block.

Referring to FIG. 6, there is shown a diagram of a location map in the 2-2 block on 2F. As shown in FIG. 6, the 2-2 block on 2F has a layout in which a PC 111 and a printer 103 are arranged as shown in FIG. 6.

Figure 7:
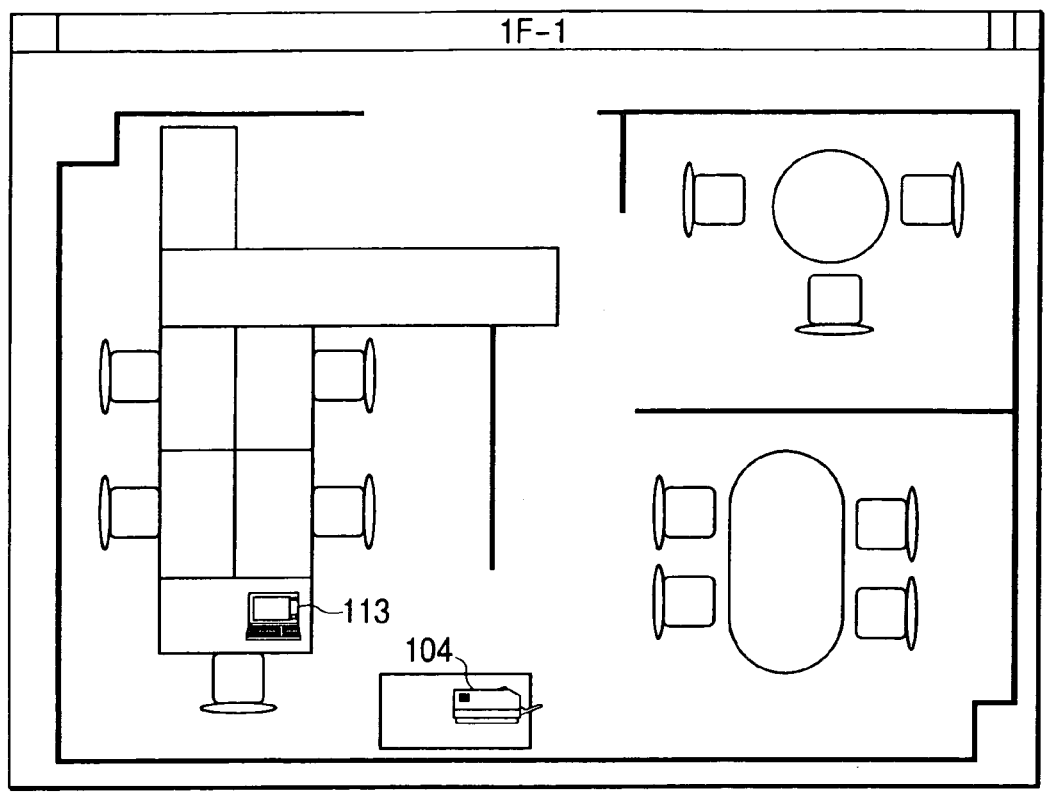
FIG. 7 is a diagram showing locations of respective devices in a 1F 1-1 block.

Referring to FIG. 7, there is shown a location map in the 1-1 block on 1F. A PC 113 and a monochrome printer 104 are arranged in a layout as shown in FIG. 7.

Figure 8:
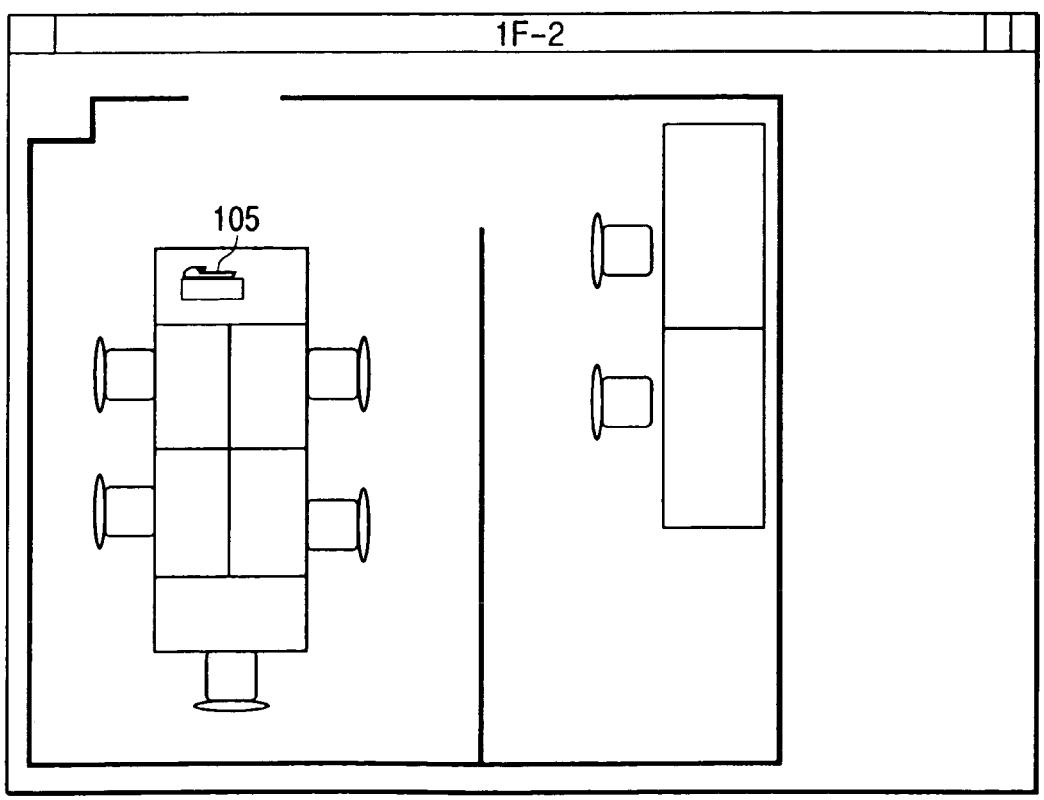
FIG. 8 is a diagram showing locations of respective devices in a 1F 1-2 block.

Referring to FIG. 8, there is shown a location map in the 1-2 block on 1F. It is understood that a scanner 105 is arranged in a layout as shown in FIG. 8 and it is displayed on a display screen of the client unit of the user.

Subsequently, first to fifth embodiments will be described below regarding a system for searching for a device on the basis of this hierarchical location information.

In the first embodiment, a description will be made for a system for understandably notifying the user of event information on a job issued to a device by a client unit together with location information of the device.

While a client unit 111 has a layout bit map for representing a location of a device which has been found in a description of the first embodiment, a server unit 112 has a layout bit map in a description of the second embodiment.

Furthermore, while a layout bit map is stored only when the layout bit map corresponds to a block (BL) class in the descriptions of the first and second embodiments, layout bit maps are stored so as to correspond to respective classes of hierarchical location information and they are reflected on a search result display of the client unit 111 in the third embodiment.

In the fourth and fifth embodiments, a description is made for a system for understandably notifying the user of the location of the device on the network and notifying the user of status of the device. At this point, the fourth embodiment is a system for obtaining the device status by polling from the device and the fifth embodiment is a system for obtaining the device status by an event notice from the device.

First Embodiment

In the first embodiment, a description will be made for a system for understandably notifying a user of event information on a job issued to a device by a client unit together with location information of the device.

In this system, a layout bit map for representing a device location is stored in the client unit 111.

First, a server unit 112 describes a configuration for managing attribute information of respective devices on the network.

Referring to FIG. 9, there is shown an example of a data structure of a database for the server unit 112 to manage attribute information of the devices on the network.

In this diagram, each column is equivalent to single data related to each registered device, that is, tuple, while each row is equivalent to attributes for each tuple.

In a database 800 in this diagram, hierarchical location information 802 to 810 and other attributes 811 and 812 are stored so as to correspond to respective devices. As examples of other attribute information, there are shown an attribute 811 indicating a presence or an absence of a color input-output function and an IP address 812 under management. In addition, it is also possible to register an attribute which a device generally has such as an attribute indicating a presence or an absence of a staple function or an attribute indicating a presence or an absence of a double-sided printing function.

Referring to FIG. 10, there is shown a diagram of an example of a data structure of device registration data used for registering the device on the database 800 managed by the server unit 112. Device registration data 900 includes location information TAG 901 (902 to 911) in which hierarchical location information of the device is set and device attribute information TAG 912 (913 to 914) in which attribute information of the device is set. Each device transmits its own device registration data 900 to the server unit 112 after it is turned on.

The device operation of transmitting its own device registration data 900 can be executed according to an occurrence of a change in an item of the device registration data 900 or according to a plug-in of the device with the network, or it can be executed regularly.

In addition, it is also possible for the device to transmit the device registration data 900 according to a query from the server unit.

The server unit registers received information on the device into the database 800 according to a reception of the device registration data 900 from the device.

Referring to FIG. 10, there is shown device registration data on a device LBP 1110. If hierarchical location information has not been registered yet in the LBP 1110, the data is transmitted to the server unit 112 in such a condition that data is not set or meaningless data is set regarding 903 and 904 to 911.

Figure 11:
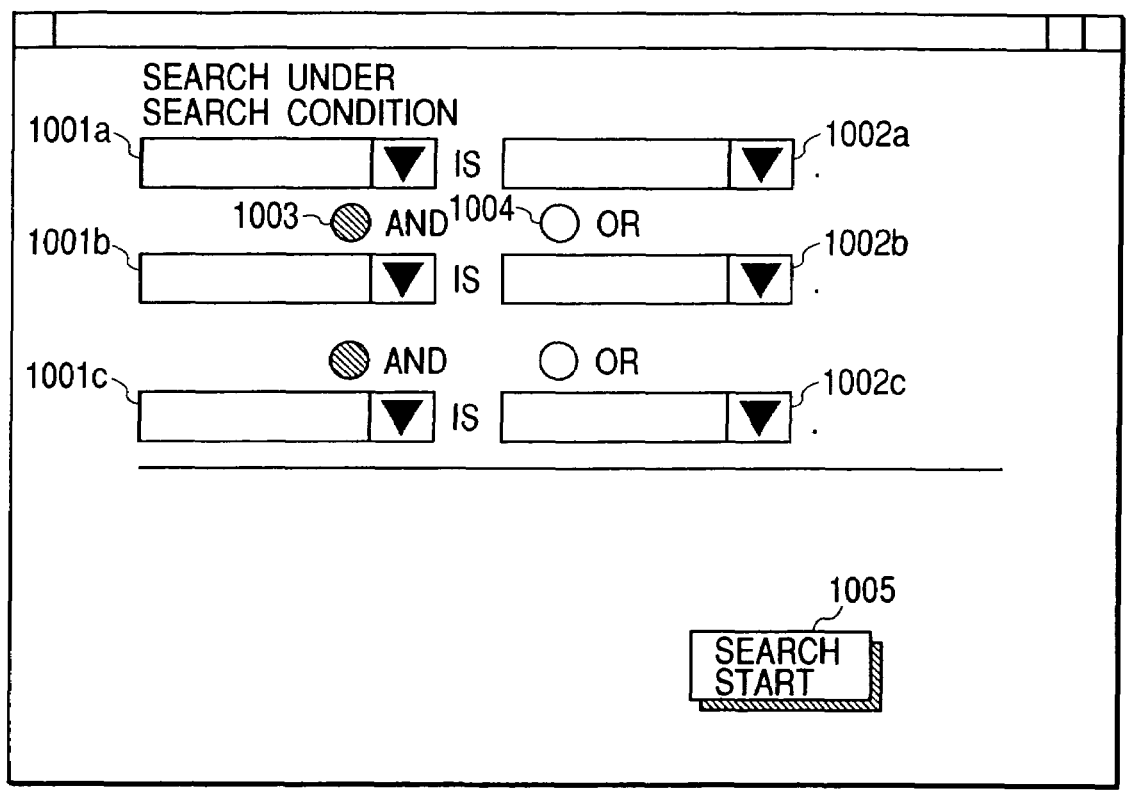
FIG. 11 is a diagram showing a device search input screen.
Figure 16:
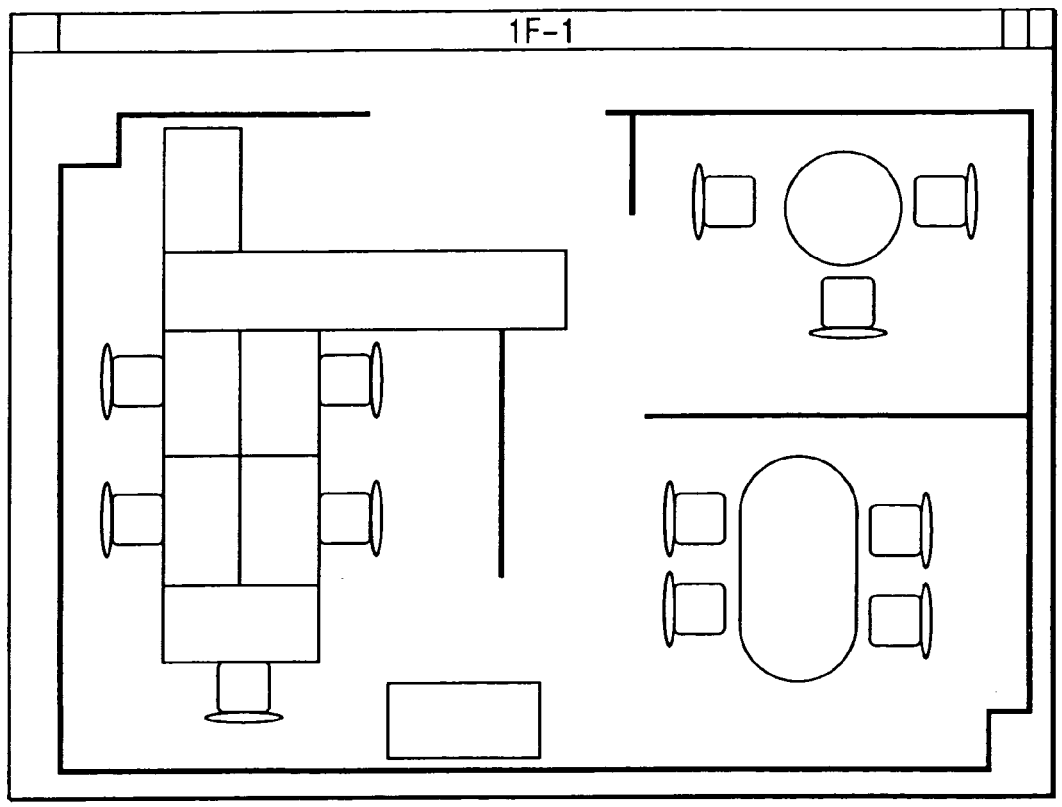
FIG. 16 is a diagram showing a layout bit map managed by a client unit.
Figure 17:
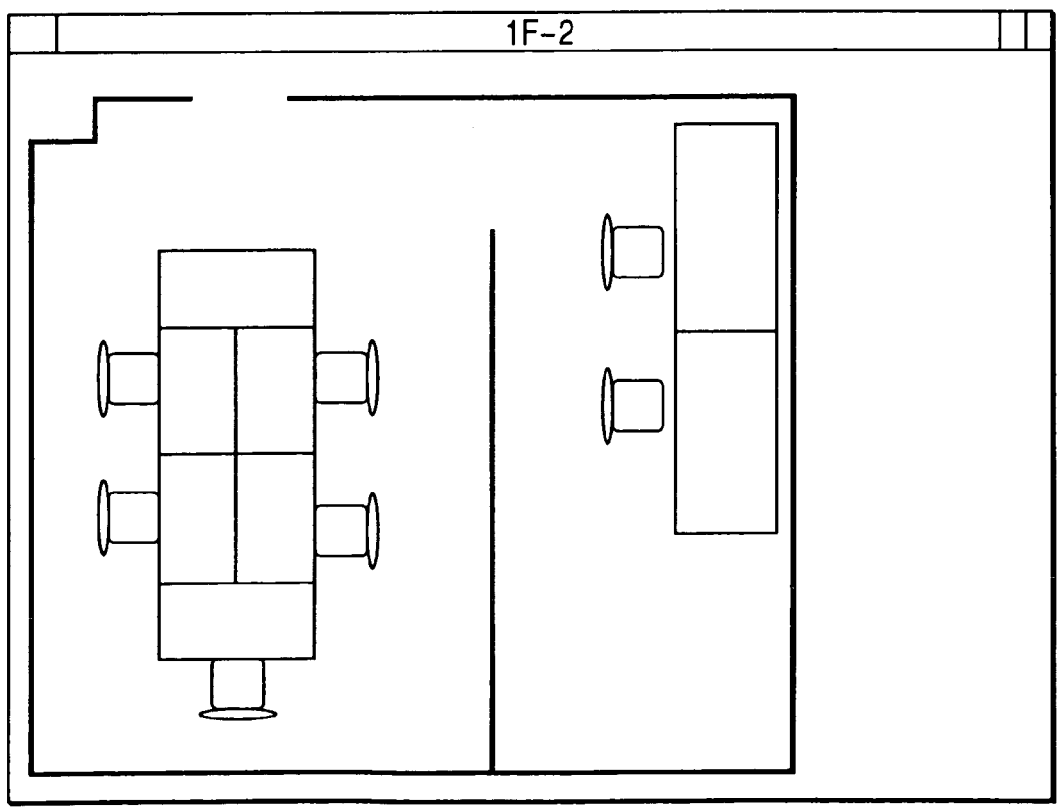
FIG. 17 is a diagram showing a layout bit map managed by a client unit.

Referring to FIG. 11, there is shown a search condition input screen for searching for a device from the client unit PC 111. In FIG. 11, entries for the search are inputted to 1001*a*, 1001*b*, and 1001*c*. On this input screen, an item can be selected out of a pull-down menu. In 1002*a*, 1002*b*, and 1002*c*, attribute information corresponding to respective entries are inputted.

For example, if an entry is selected as a device, one of a printer, an MFP, a scanner is displayed as attribute information on the pull-down menu, so that the user can select required attribute information out of the menu.

A search condition is inputted by using input buttons 1003 and 1004. The input button 1003 is used for AND for a condition and the input button 1004 is used for OR for a condition for a search. The user inputs the search condition and then executes the search by using a search start button.

Referring to FIG. 12, there is shown a diagram of an example of a search input. In this example, a device terminal equipment is a printer as attribute information and a search is executed for a device capable of color printing. Furthermore, as hierarchical location information, Floor is inputted to 1001*c* and 2F is inputted to 1002*c*, for example, for a search for a printer installed on the second floor.

In addition, when searching for a device with specifying a further detailed location on the second floor, a printer installed in block 2-1 can be searched for by inputting Block to 1001*c* and 2-1 to 1002*c* before executing the search operation, for example.

Referring to FIG. 13, there is shown a diagram representing a search condition of the above search example. It indicates a condition of a printer as a device terminal equipment (DV) capable of color printing.

At this point, it is necessary to describe how the server unit which has received the search condition formula shown in FIG. 13 evaluates the formula "FL=2F." It is because the location condition "2F" is satisfied not only by a device installed on 2F of the "AA building of Tokyo branch" to be searched for and requested by the user, but by a device installed on 2F of the "YY building of Osaka branch." Therefore, the device of the "YY building of Osaka branch" which is not requested by the user is also hit as a result of the search, by which data which is extremely hard to understand for the user is outputted as a search result.

To avoid this status, the server unit 112 needs to have a mechanism in which a higher class than the floor class (FL) is automatically specified.

As an example of the mechanism, there is a method of making the server unit store its own hierarchical location information to apply the hierarchical location information of the server unit regarding the search conditions of the classes higher than the floor class (FL). According to this method, when a search request is issued under the condition "FL=2F" to the server unit installed in the "AA building of Tokyo branch," only the device on the second floor of the AA building can be treated as an object to be searched for.

If a device installed on the second floor of the "YY building of Osaka branchÓ is required to be searched for, a search request shall be issued under the "FL=2F" condition to the server unit installed in the "YY building of Osaka branch."

In the example shown in FIG. 12, while the specification is limited to be started at the specified class if a single class only is specified, it is also possible to apply the "full-path specification" for specifying the highest class (C) to a specified class.

For a search condition formula shown in FIG. 13 for this specification, the full-path specification from the highest class (for example, C=JP, O=ABC, BR=Tokyo branch, etc.) is applied.

By using this full-path specification, a device installed on the second floor of the "YY building of Osaka branch" can be searched for by the server unit installed in the "AA building of Tokyo branch."

Referring to FIG. 14, there is shown an example of a search result obtained when the server unit 112 has returned a device matching the search condition shown in FIG. 13 to the client PC 111.

The server unit 112 searches the database 800 (FIG. 9) on the basis of the search condition in FIG. 13 received from the client unit 111 and returns matching device information as a search result 1300 to the client unit 111.

As a search result 1300, are set hierarchical location information 1301 to 1310 and device attribute information 1311 to 1312. If there are a plurality of devices matching the search condition, hierarchical location information 1301 to 1310 and device attribute information 1311 to 1312 of a plurality of devices are set as a search result 1300.

A device matching the search condition shown in FIG. 13 is an LBP 1110 only, and therefore only the information shown in FIG. 14 is returned to the client unit 111.

Referring to FIG. 15, there is shown a correspondence list between block classes and layout bit maps of the hierarchical location information owned by the client unit 111.

By using this correspondence list, the client unit 111 can specify a layout bit map on the basis of the hierarchical location information.

In this embodiment, there are layout bit maps shown in FIGS. 16, 17, 18, and 19 corresponding to blocks 1-1, 1-2, 2-1, and 2-2, respectively. For other blocks, a layout bit map shown in FIG. 20 is displayed.

FIGS. 15 to 19 show layout bit map diagrams corresponding to respective block classes. In this embodiment, information indicating a device which has been found is displayed with being superposed on the layout bit map, so as to visually indicate which position in which block of which floor the device requested to be searched for is located in.

Figure 20:
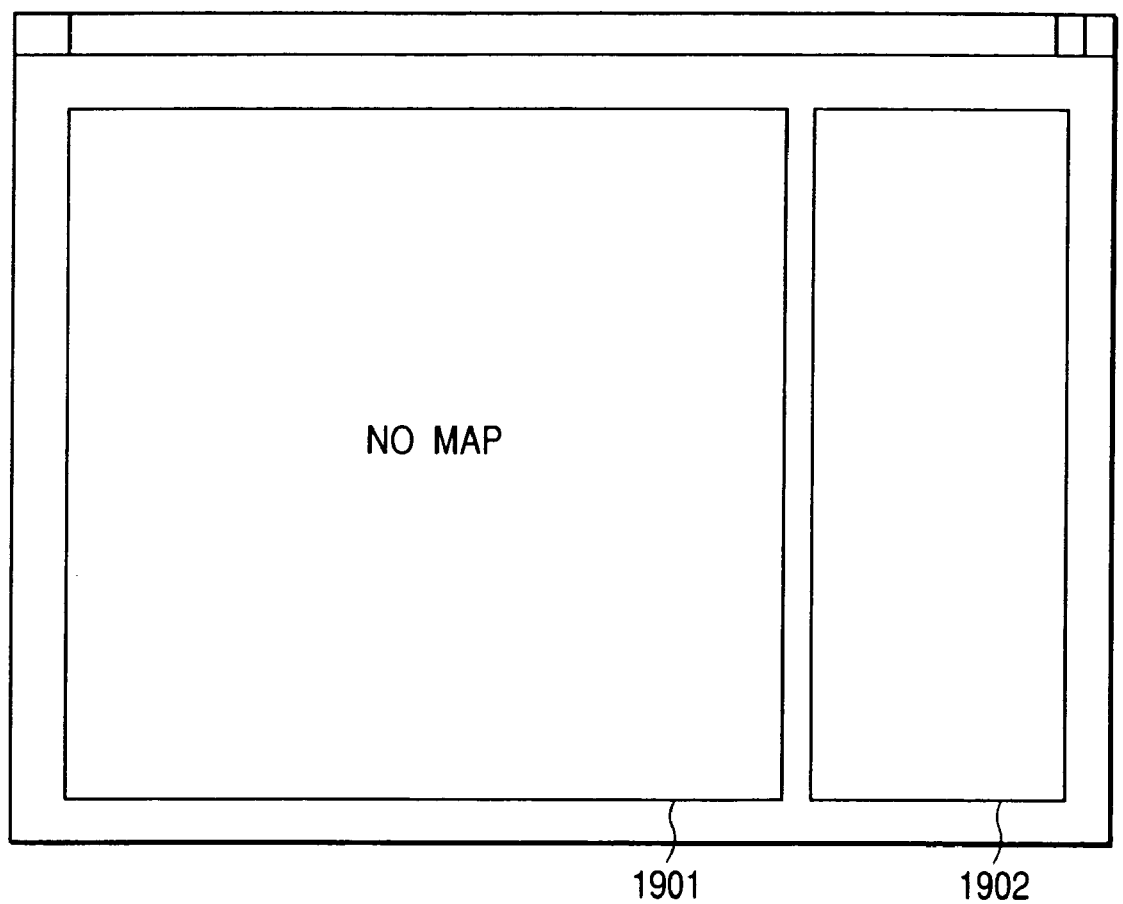
FIG. 20 is a diagram showing a layout bit map managed by a client unit.

Referring to FIG. 20, there is shown a layout bit map displayed when a device does not have hierarchical location information or when there is no matching layout bit map in the client unit (hereinafter, referred to as unknown MAP"). In FIG. 20, an area 1901 is used for indicating there is no layout bit map and an area 1902 is used for displaying a device having no hierarchical location information or having no matching hierarchical location information.

Referring to FIG. 21, there are shown device icons for representing respective devices stored in the client unit 111.

These device icons are associated with respective device names (NM) in a one-to-one correspondence, except that a device icon indicating an "unknown" device for an unknown device name.

Figure 22:
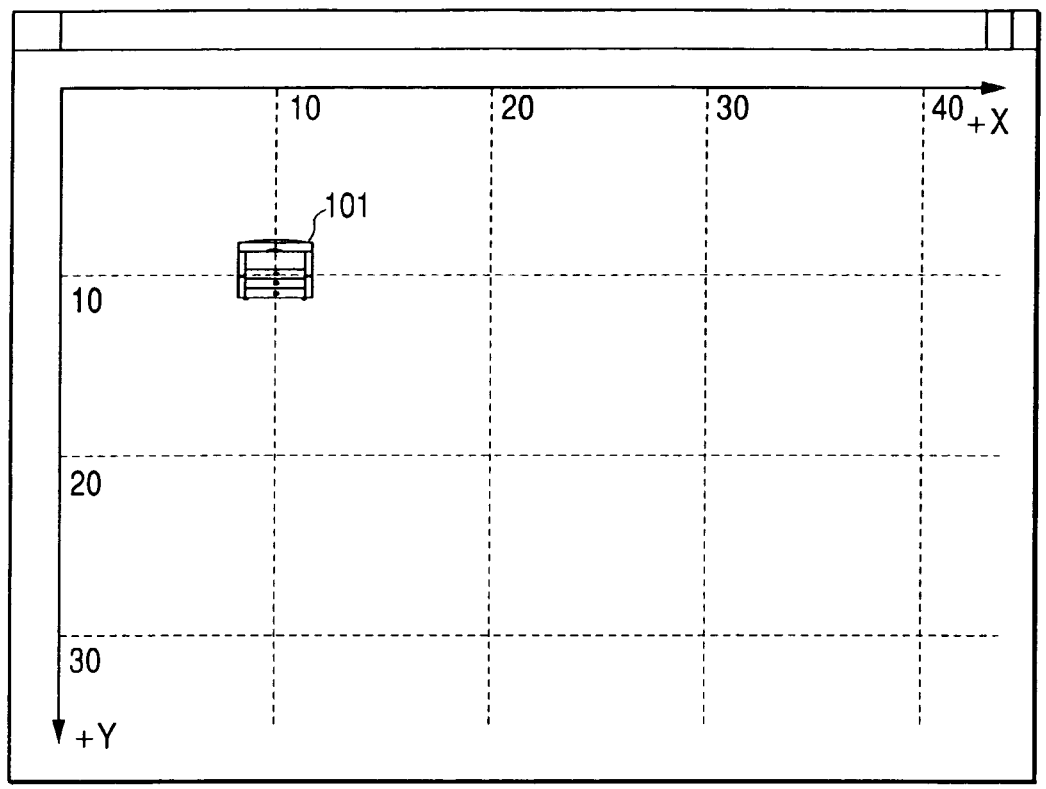
FIG. 22 is a diagram showing a location of a device icon.

Referring to FIG. 22, there is shown a mechanism in which the client unit 111 displays a device icon on a layout bit map.

The client unit extracts hierarchical location information and device attribute information from a search result obtained from the server unit 112 and selects a layout bit map and a device icon corresponding to each.

Coordinate information of the layout bit map selected on the basis of the obtained hierarchical location information can be obtained, and therefore a device icon 2002 indicating a color printer 101 (LBP 1110) is displayed with being superposed on the layout bit map at coordinates "10X+10Y" of the selected layout bit map.

By displaying a device icon with being superposed on the layout bit map at the corresponding coordinates in this manner, the location of the device requested to be searched for can be displayed understandably for a user.

Figure 23:
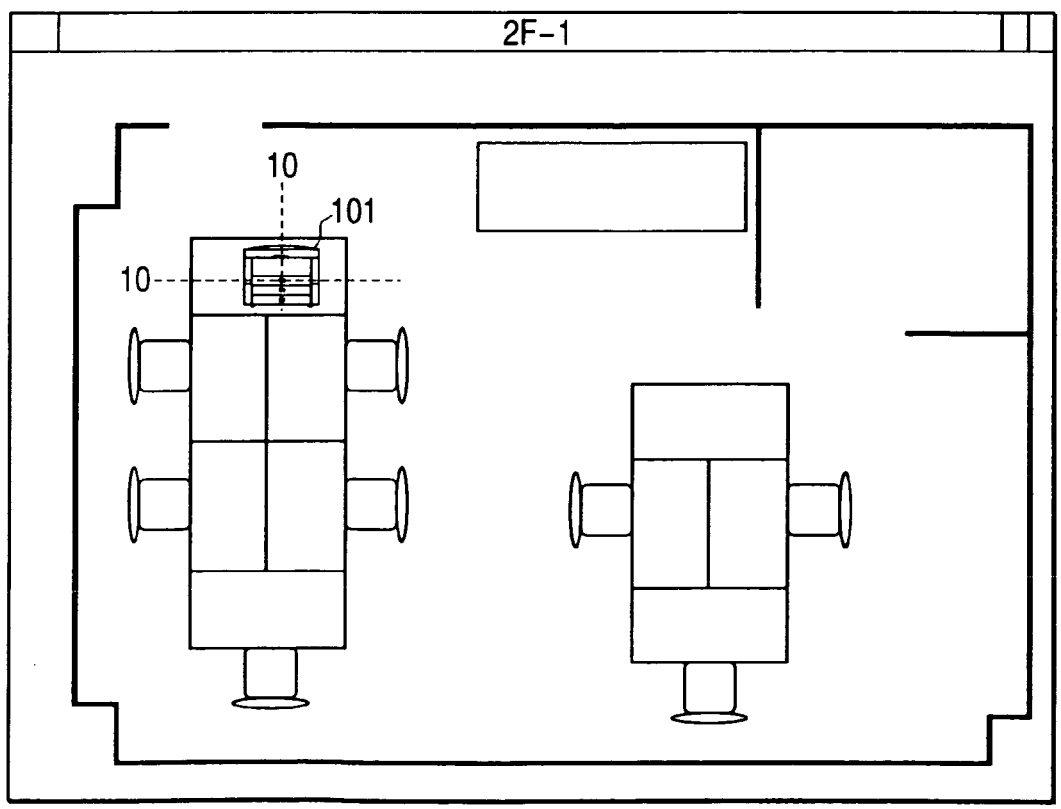
FIG. 23 is a diagram showing a device search result.

Referring to FIG. 23, there is shown an example of a bit map displayed on the client unit 111 as a result of the search. According to this display, it is understood that a color-outputtable printer 101 is located around a table near an entrance of the 2-1 block on 2F.

Figure 24:
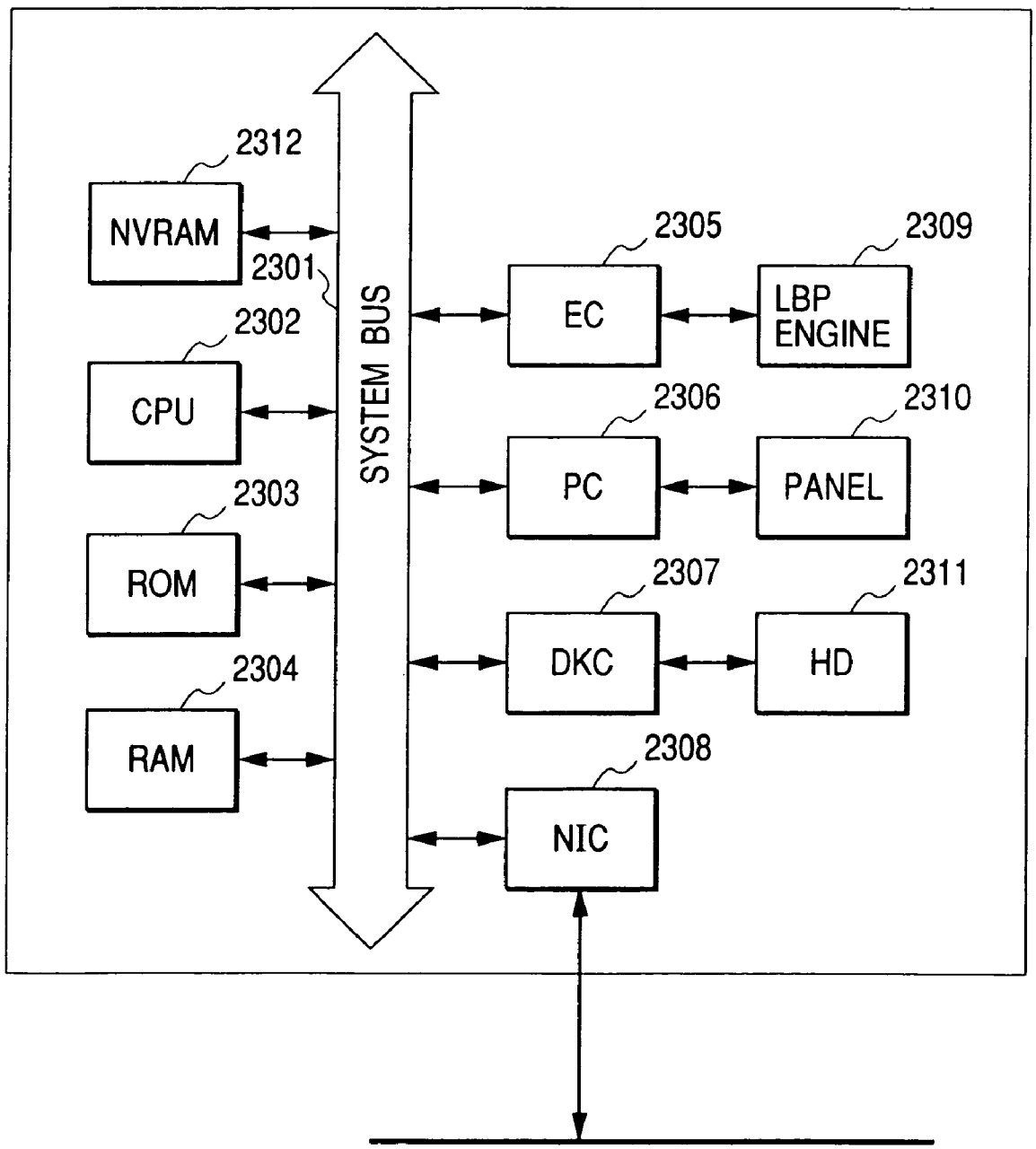
FIG. 24 is a diagram showing an internal configuration of devices.

Referring to FIG. 24, there is shown a block diagram of an internal configuration of the color LBP 1110 in this embodiment. As shown in FIG. 24, this printer 101 has a system bus 2301 connected to a CPU 2302 for processing a program, a ROM 2303 in which the program is stored, and a RAM 2304 which serves as a work area or a buffer area of the program.

Reference numeral 2305 designates an LBP engine controller, and an engine 2309 is connected to the system bus via the controller 2305. A panel controller 2306 controls an output or input to or from a panel to manage the panel 2310.

The color LBP 1110 in this embodiment has a hard disk (HD) 2211, by which printing data can be temporarily spooled in the disk. A disk controller 2307 controls the HD 2211. Via a network interface controller 2308, the printer is connected to a network.

Nonvolatile RAM (NVRAM) 2312 retains data even if the printer 101 is turned off. In this embodiment, hierarchical location information and attribute information are stored in this NVRAM.

FIGS. 25 to 29 are flowcharts of assistance in explaining processing procedures. This embodiment is described in detail below by using these flowcharts.

Figure 29:
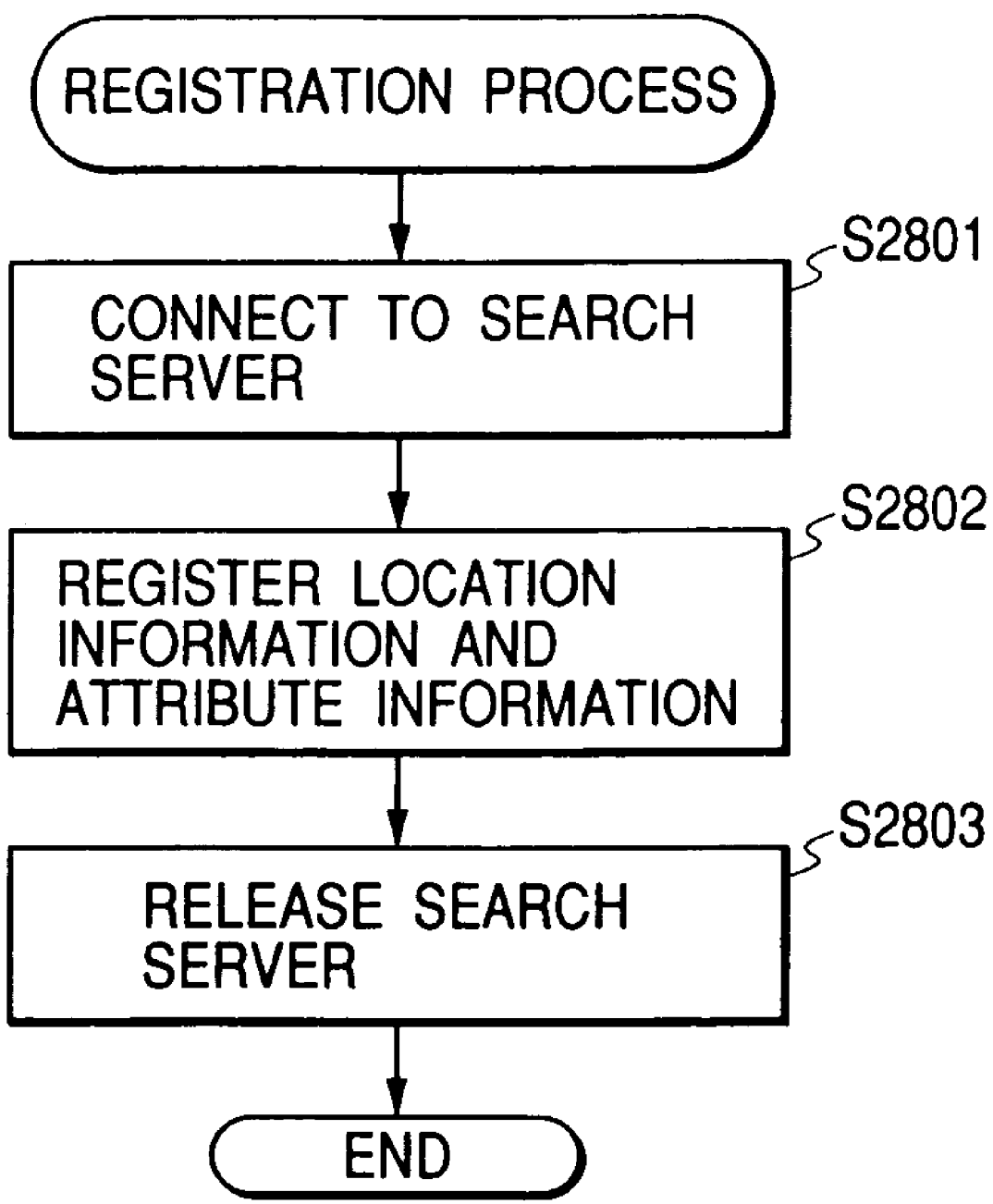
FIG. 29 is a flowchart showing a registration process.

First, registration process of hierarchical location information of a device is described by using the flowchart in FIG. 29. As an example, the printer 101 (LBP 1110) is explained here.

The LBP 1110 retains hierarchical location information and attribute information in the nonvolatile RAM (2312) in the device. The CPU 2302 of the LBP 1110 is connected to the server unit 112 when it is turned on (step S2801). After the connection, it reads the hierarchical location information and the attribute information from the RAM (2312) of the LBP 1110 and registers them on the server unit 112 in a format as shown in FIG. 10 (step S2802).

After the registration, the CPU 2302 of the LBP 1110 releases the connection with the server unit 112 (step S2803). In this procedure, respective devices register their own hierarchical location information and attribute information on the server unit 112 after they are turned on.

Figure 25:
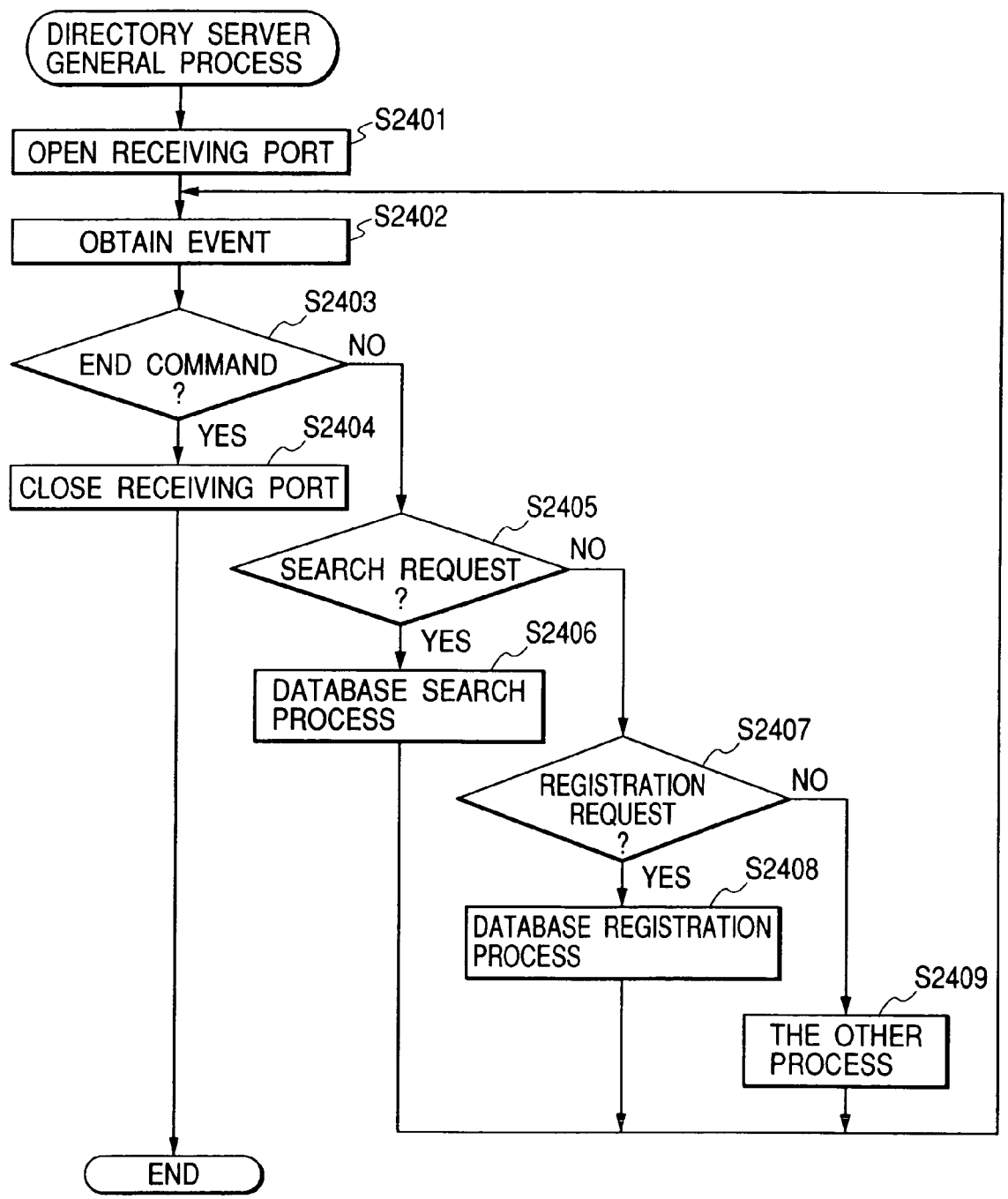
FIG. 25 is a flowchart showing a general process of a server unit.

Next, processes of the server unit 112 are described by using the flowchart in FIG. 25. The server unit 112 comprises an event-driven program and analyzes an event at an occurrence of the event to execute a corresponding process.

The server unit 112 opens a receiving port first when it is turned on (step S2401). Next, it obtains an event (step S2402) and judges whether or not the obtained event is an end command (step S2403). If the obtained event is the end command as a result of this judgment, the server unit closes the receiving port (step S2404) and terminates the process.

On the other hand, unless the event is the end command as a result of the judgment in step S2403, the server unit judges whether or not it is a search request (step S2405). If it is a search request, a database search process is performed in step S2406.

Unless the event is a search request as a result of the judgment in step S2405, the server unit judges whether or not it is a database registration request in step S2407. If it is the registration request as a result of this judgment, the received data is registered on the table 800 shown in FIG. 9 (step S2408). This registered data is retained in HD 211. In addition, if the event is another type of request as a result of the judgment in step S2407, other processes are performed (step S2409).

Figure 26:
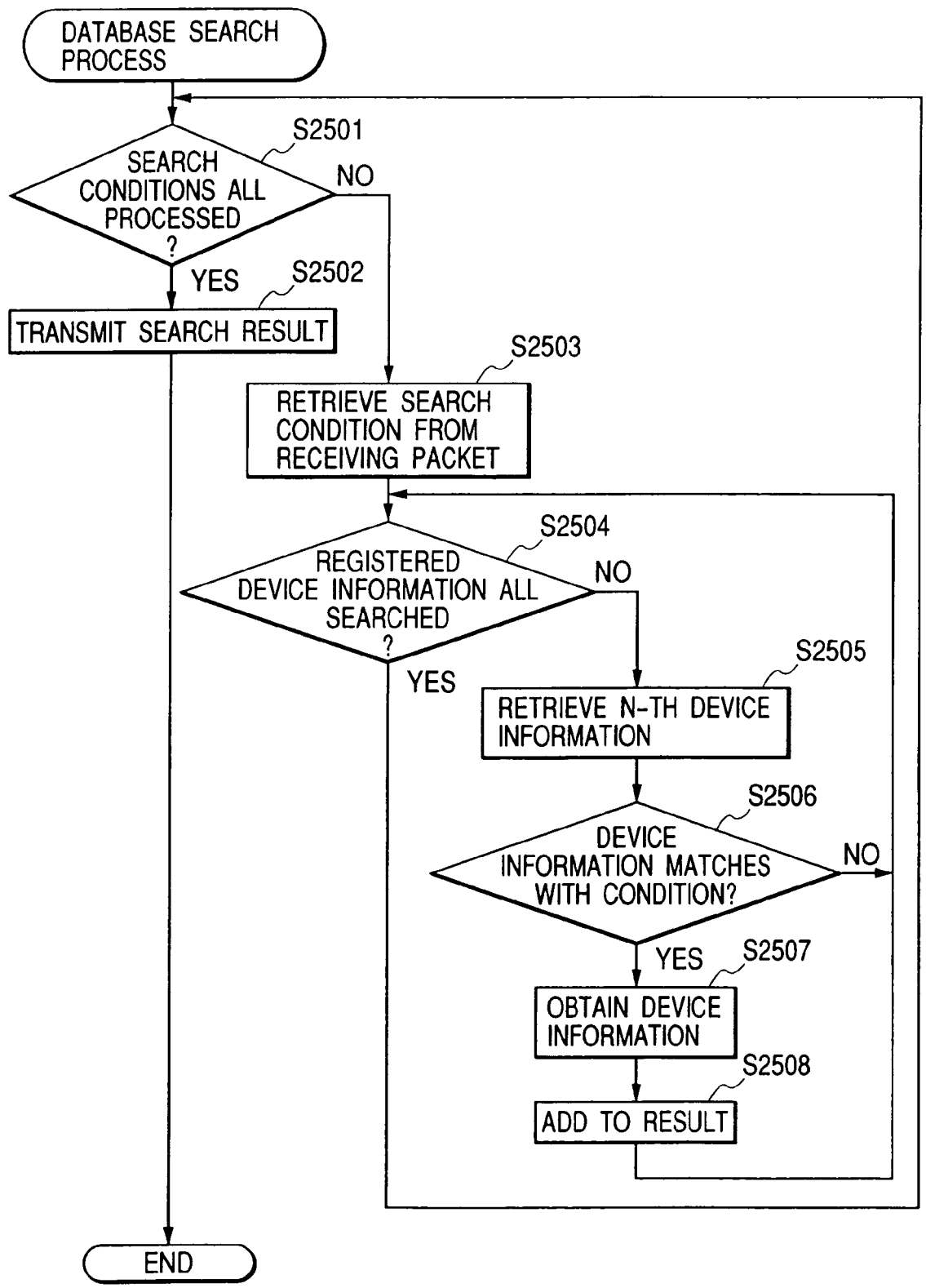
FIG. 26 is a flowchart showing a search process of a database.

Subsequently, a data search process executed by the server unit is described in detail below by using FIG. 26.

In the search process, the server unit judges whether or not all the search conditions are processed in step S2501 in the search process. Until all of the search conditions are completed as a result of this judgment, this process is repeated.

If all the search conditions in the receiving packet are completed to be searched for in step S2501, the result is transmitted to the client unit (step S2502).

Unless all of the search conditions are completed to be searched for, the server unit progresses to the step S2503 to retrieve a search condition from the receiving packet. Then, the server unit judges whether all of the registered device information on the table shown in FIG. 9 are completed to be searched for regarding the search conditions (step S2504).

If all of the registered device information is completed to be searched for as a result of this judgment, the control returns to S2501 to retrieve the next search condition.

Unless all of the registered device information is searched for as a result of a judgment in step S2504, the server unit progresses to step S2505 to retrieve the nth device information from the HD 211. Then, it judges whether or not the retrieved device information matches the condition (step S2506).

If the information matches the condition as a result of this judgment, the device information is obtained (step S2507) and added to the result (step S2508).

On the other hand, unless it matches the condition as a result of the judgment in step S2506, the control returns to step S2504 to execute processing of the next device terminal equipment. In this manner, all of the devices on the table 800 shown in FIG. 9 are searched for and then the result is transmitted to the client unit.

Subsequently, a general process in the client unit 111 is described below.

The client unit 111, which comprises an event-driven program, analyzes an event at an occurrence of the event and executes a corresponding process.

Figure 27:
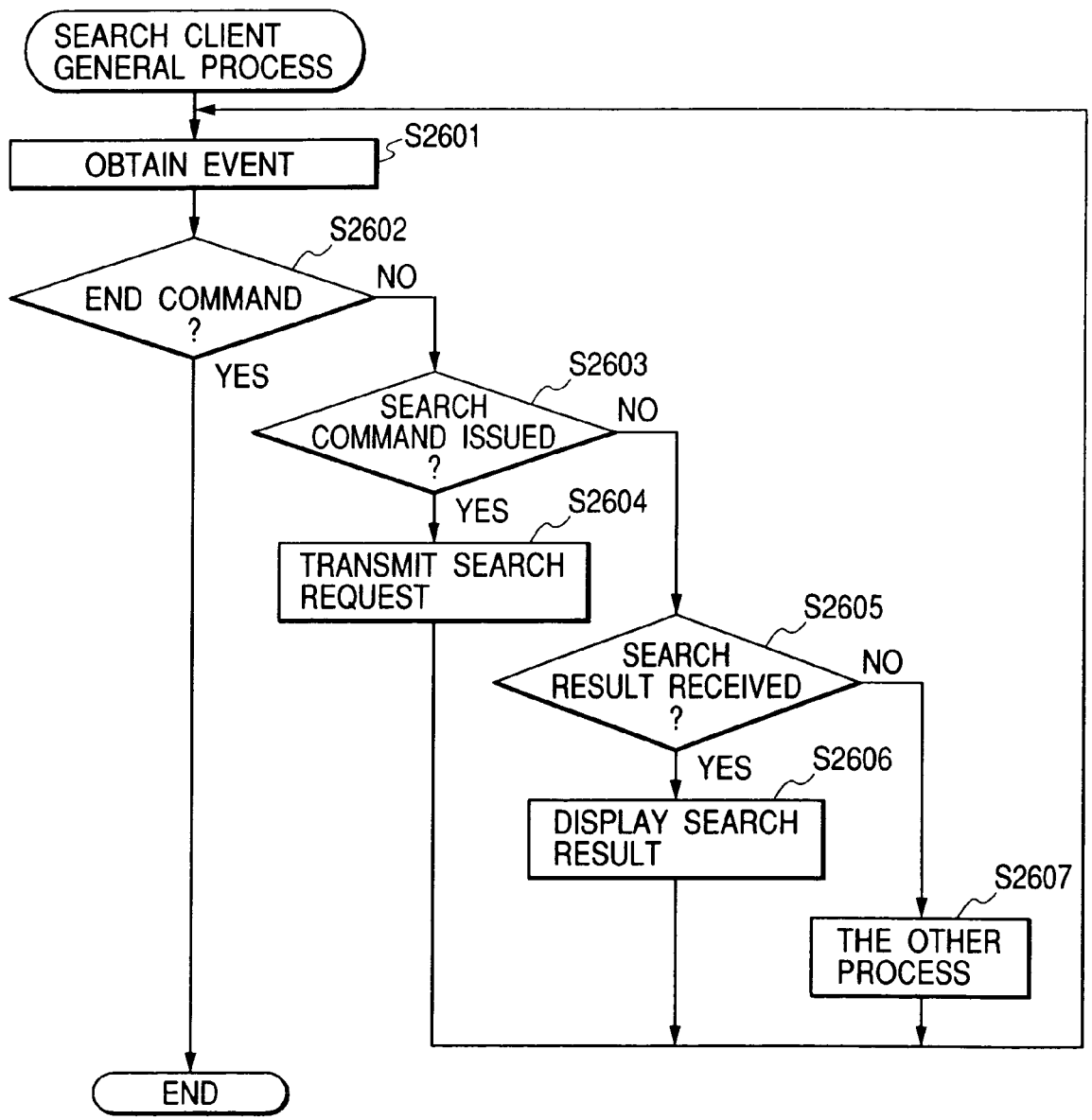
FIG. 27 is a flowchart showing a general process of a client unit.

As shown in the flowchart shown in FIG. 27, the client unit 111 obtains an event in the first step S2601. If the client unit receives an event of an end command at this point, the process is terminated directly (step S2602).

In the client unit 111, a user inputs a search condition from a search condition input screen as shown in FIG. 11. A user's click on the search start button 1005 causes the event.

If a search command is requested to be issued in step S2603, the client terminal equipment 111 transmits the search request to the server unit 112 (step S2604).

At this time, the search condition formula shown in FIGS. 12 and 13 is used for a query to the server terminal equipment. By storing this search condition formula in the HD 211, this condition formula can be used for the next search, by which a search condition re-input by a user can be omitted.

The client unit 111 enters a wait state for a search result from the server unit and makes a judgment when receiving the event in step S2605. If the search result is received as shown in FIG. 14 in the judgment in step S2605, the search result is displayed (step S2606). For other events, other processes are executed (step S2607).

Figure 28:
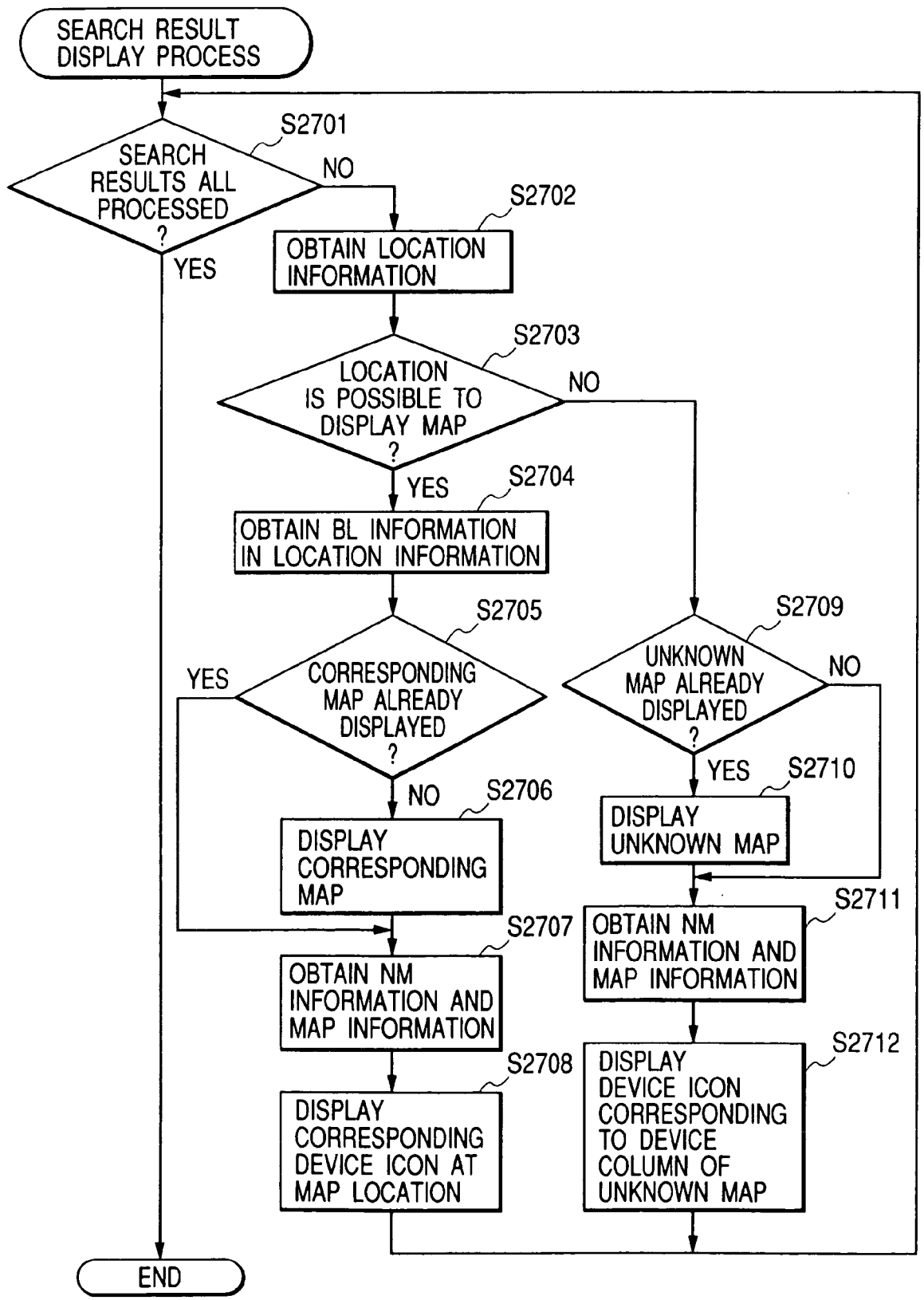
FIG. 28 is a flowchart showing a search result display process.

Next, the search result display process is described in further detail by referring to the flowchart in FIG. 28.

In the first step S2701, it is judged whether or not all of the search result process is completed. If all of the process is completed as this judgment, the process is terminated.

On the other hand, unless all of the process is completed as the judgment in step S2701, the control progresses to step S2702 to obtain hierarchical location information from the received search result. Furthermore, it is judged whether or not the client unit can display a map on the basis of the obtained hierarchical location information (step S2703).

In this embodiment, hierarchical location information indicating that a device can be displayed includes the information designated by the reference numeral 1401 in FIG. 15. If the hierarchical location information does not include this, it is confirmed whether or not "unknown MAP" has been already displayed (step S2709) and an unknown device shown in FIG. 20 is displayed (step S2710).

Furthermore, NM information is obtained from the hierarchical location information (step S2711) and a device icon corresponding to NM is displayed in an area designated by the reference numeral 1902 in FIG. 20. In this case, a device terminal is not normally displayed. In other words, a device is displayed here with its hierarchical location information being not registered.

On the other hand, if the device terminal is judged to be able to display a map in step S2703, BL information in the hierarchical location information is obtained (step S2704).

The client unit 111 attempts to display a required layout bit map by comparing the BL information with the BL information table shown in FIG. 15.

At this point, it is judged whether or not the corresponding layout bit map has already been displayed (step S2705). If it is not displayed yet as a result of this judgment, the corresponding bit map is displayed (step S2706). Then, the NM information and the map information are obtained from the hierarchical location information (step S2707).

If the layout bit map has already been displayed as a result of the judgment in step S2705, the control progresses to step S2707. Then, a corresponding device icon is read from the table in FIG. 21 on the basis of the NM information. In addition, it is determined where the device icon is displayed on the basis of the map information.

In this embodiment, the result shown in FIG. 14 is returned as a search result from the server unit 112, which indicates that NM is an LBP 1110 and a location where its device icon is displayed is "10X+10Y," and therefore the device icon is displayed in the location shown in FIG. 22 (step S2708). This device icon is displayed so as to be superposed on the layout map, by which a search result as shown in FIG. 23 is displayed on the display of the client unit 111.

By the above processes, the layout bit maps as shown in FIGS. 5 to 8 are displayed on the display of the client unit 111 and therefore a user obtains detailed location information of devices as a search result.

Afterwards, the user of the client unit 111 selects a desired device out of a plurality of devices as a search result and ten transmits a job to the selected device. For example, if the device is a printer a printing job is transmitted, or if the device is a facsimile a transmission job or the like is transmitted.

Figure 31:
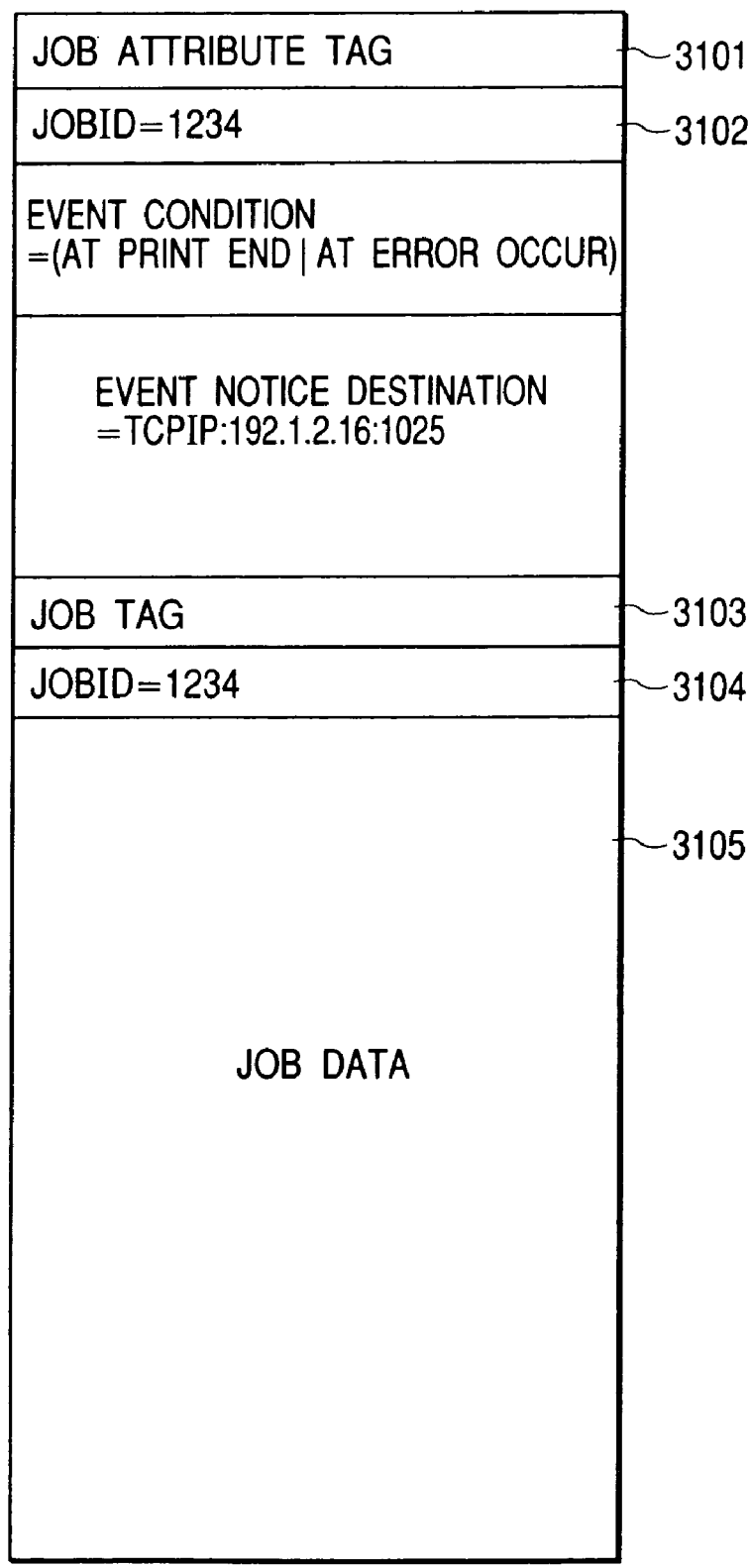
FIG. 31 is a diagram showing an example of printing job information issued by a client.

Referring to FIG. 31, there is shown an example of printing job information issued by a client, and reference numeral 3101 designates a job characteristic tag indicating that the subsequent information is job attribute information. Printing job information of 3102 to 3105 follows the tag.

Reference numeral 3102 designates a job ID used for specifying a job by a device to which the job is inputted or by the client unit 111, indicating "1234" as the job ID in the example shown in FIG. 31. Referring to FIG. 32, there is shown a job management table for managing jobs received by the device. On the job management table, an event condition to be transmitted to the client and a network address of the notice destination are stored with being associated with each other for each job. The device stores the job on the job storage management table on the basis of the information described in the received job when receiving the printing job shown in FIG. 31. Then, the device executes the job and notifies the client unit of an event when detecting an occurrence of an event to be notified the client unit of.

Referring to FIG. 33, there is shown an example of a format of an event notice to be transmitted to the client unit from the device. This event notice format 3301 is used for an event notice to the client terminal equipment at "TCP/IP:192.1.2.16:1025" when the printing job terminates, having the hierarchical location information 3302 shown in FIG. 14 being added.

Figure 34:
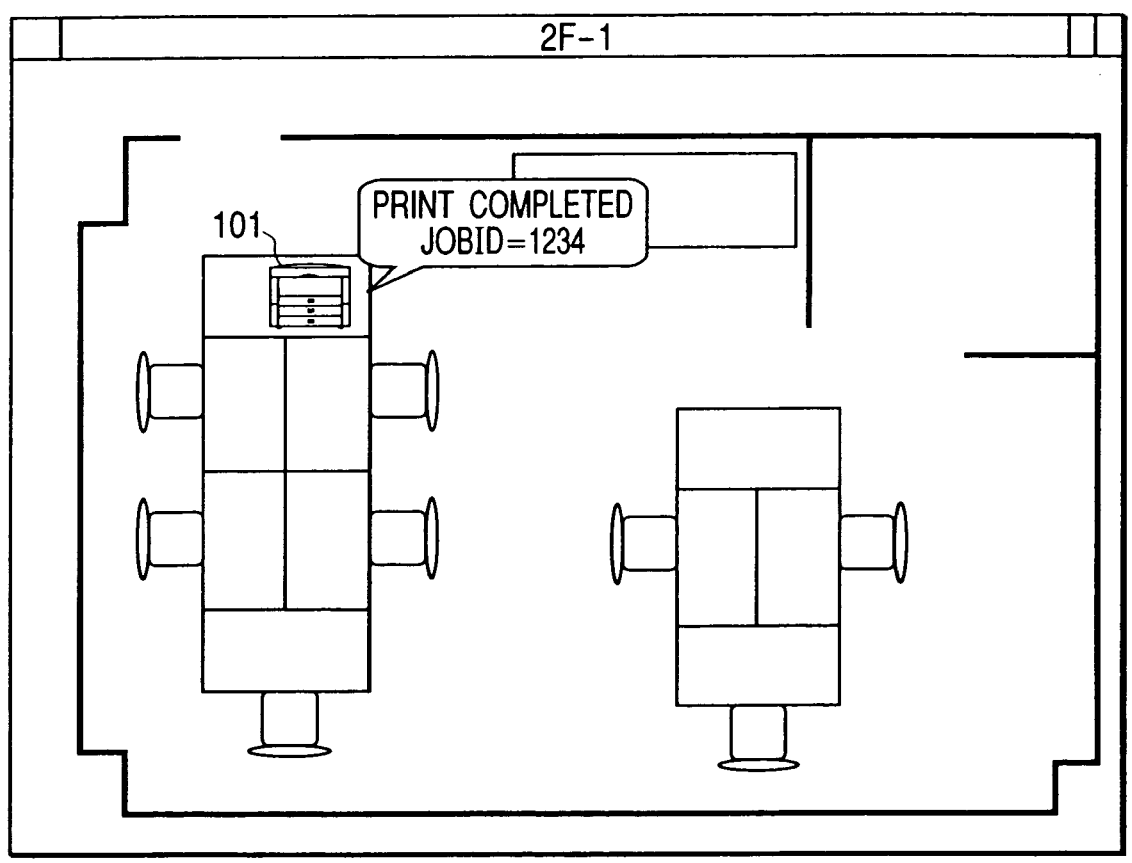
FIG. 34 is a diagram showing an example of a display appearing when receiving a print end event.

Referring to FIG. 34, there is shown a diagram of a sample display on the display unit 27 of the client unit when the job of "JOB ID=1234" terminates, giving an example of representing that the printing is completed by means of character information.

Figure 35:
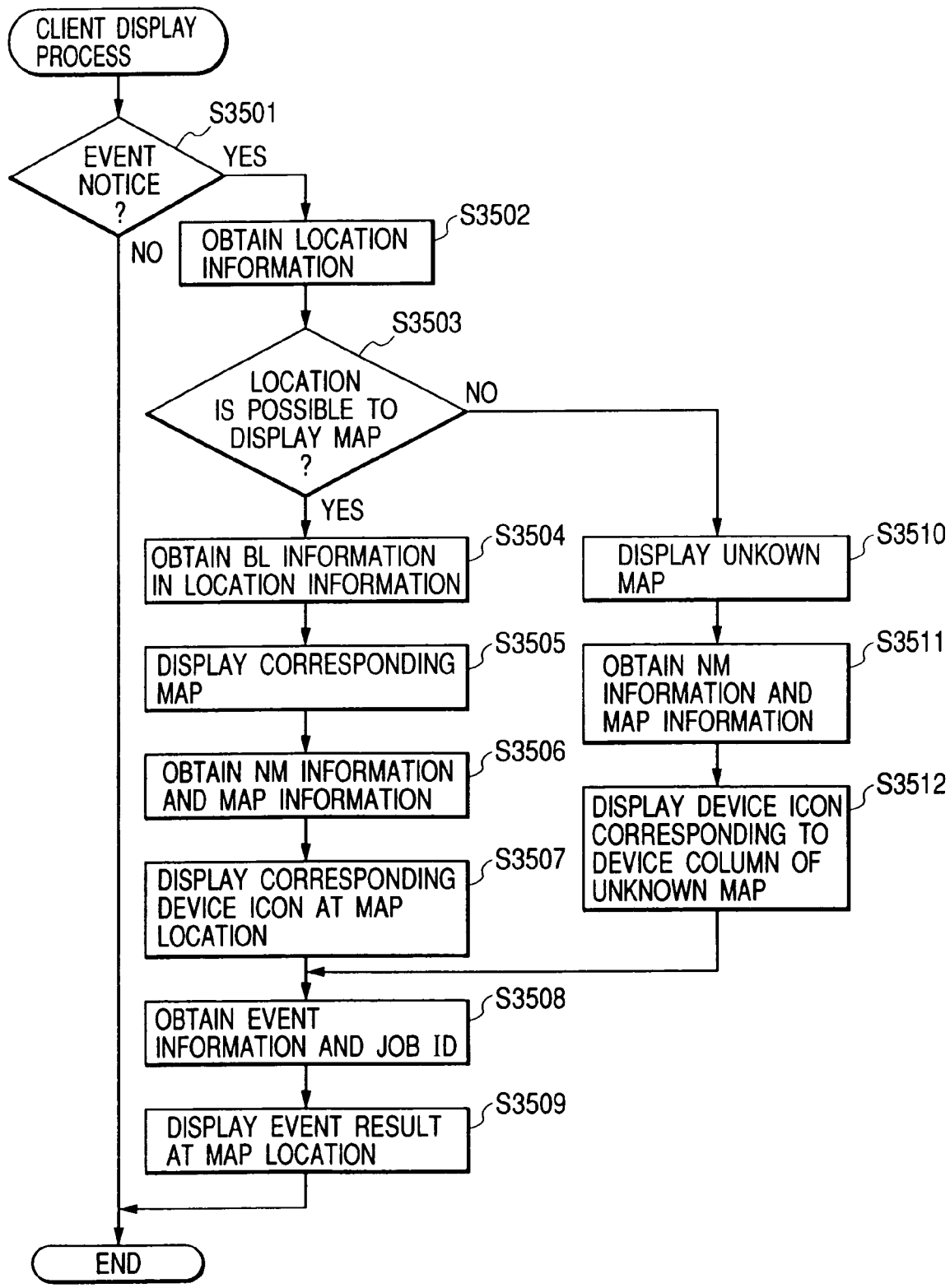
FIG. 35 is a flowchart showing a processing procedure at receiving a client event.

Referring to FIG. 35, there is shown a flowchart of a processing procedure up to a display process. As shown in FIG. 35, after a start of an event notice receiving process, it is judged whether or not input information is an event notice in the first step S3501. If the input information is not an event notice as a result of this judgment, the process is terminated.

If the input information is an event notice, the control progresses to step S3502 and location information (hierarchical location information) is obtained from the received event information 3301. Then, it is judged whether or not the client unit can display a layout bit map on the basis of the obtained hierarchical location information (step S3503).

In this embodiment, the hierarchical location information indicating that the device can be displayed includes the information designated by the reference numeral 1401 in FIG. 15. If the hierarchical location information does not include this, an unknown device shown in FIG. 20 is displayed (step S3510).

Furthermore, NM information is obtained from the hierarchical location information (step S3511) and a device icon corresponding to NM is displayed in an area designated by the reference numeral 1902 shown in FIG. 20 (step S3512). In this case, a device terminal is not normally displayed. In other words, a device is displayed here with its hierarchical location information being not registered.

On the other hand, if the device terminal is judged to be able to display a layout bit map in step S3503, BL information in the hierarchical location information is obtained (step S3504). The client terminal equipment 111 displays a required layout bit map by comparing the obtained BL information with the BL information table shown in FIG. 15 (step S3505).

By executing the above process, the printing is completed in this example as shown in FIG. 34. Therefore, it is possible to display the information on the event which has occurred understandably for a user.

Next, NM information and map information are obtained from the hierarchical location information (step S3506). In this embodiment, NM is an LBP 1110 and its device icon is displayed in a location shown in FIG. 22 since the device terminal is located at "10X+10Y" (step S3509). This device icon is displayed so as to be superposed on the above layout map, by which the device which has issued the event notice can be displayed as shown in FIG. 23.

Figure 36:
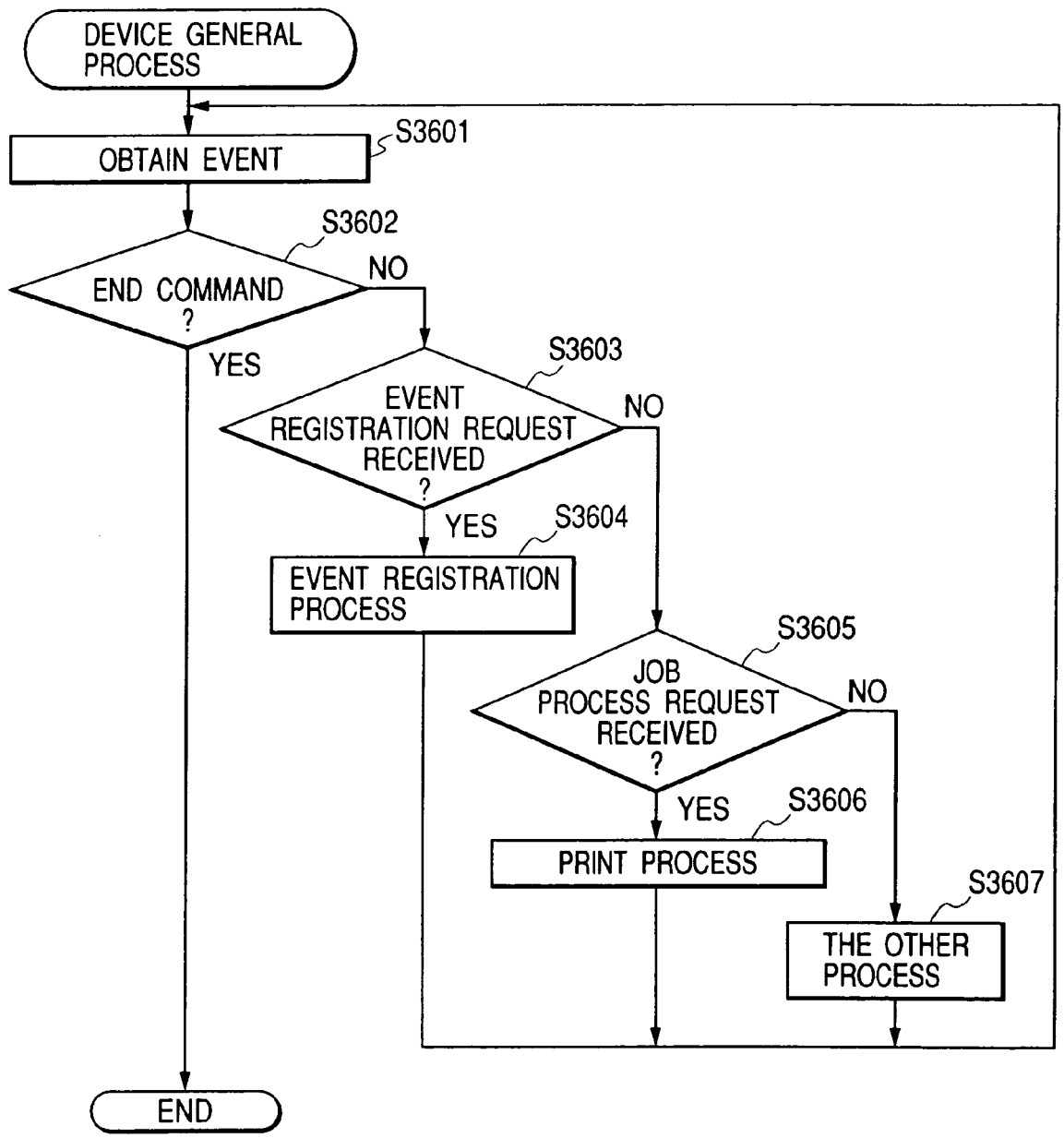
FIG. 36 is a flowchart showing a general process of a device.

Referring to FIG. 36, there is shown a flowchart of a general process of the device. In the first step S3601, an event is obtained. Subsequently, it is judged whether or not the obtained event is an end command event (step S3602). If the above received event is an end command as a result of this judgment, the process terminates directly.

On the other hand, unless the received event is an end command as a result of the judgment in step S3602, the control progresses to step S3603 to judge whether or not it is an event registration request. If it is so as a result of this judgment, the control progresses to step S3604 for an execution of an event registration process.

On the other hand, unless the event is an event registration request as a result of the judgment in step S3603, the control progresses from step S3603 to step S3605 to judge whether or not a job process request is received. If a job (printing job) process request is received as a result of this judgment, the control progresses to step S3606 to execute a printing process. Unless the received event is a job process request as a result of a judgment in step S3605, the control progresses to step S3607 for an execution of other processes.

Referring to FIG. 37, there is shown a flowchart of a processing procedure at an occurrence of an event of the device. As shown in FIG. 37, at an occurrence of an event it is judged whether or not it is a job-related event (step S3701).

Next, the control progresses to step S3700 to determine a notice condition of a corresponding "JOB ID." On the basis of a result of this judgment, it is judged whether or not the condition is satisfied in step S3700. If the condition is satisfied, the control progresses to step S3703 to obtain hierarchical location information.

Next, the control progresses to step S3704 to generate a notice packet and the generated notice packet is reported to a specified address (step S3705). Subsequently in step S3706, whether or not the job is completed is judged. If it is completed, the control progresses to step S3707 to delete the "JOB ID" entry from the job management table (shown in FIG. 32).

According to the first embodiment in this manner, event information on a job issued by a user can be understandably transmitted to the user in addition to a device location where the event has occurred.

Second Embodiment

While the client unit 111 retains a layout bit map for representing a location of a device which has been found in the first embodiment, a second embodiment is described in a condition in which a server unit 112 retains a layout bit map.

Since the second embodiment is based on the first embodiment, different portions from those of the first embodiment will be mainly described below.

In the second embodiment, layout bit maps shown in FIGS. 16 to 20, a correspondence table between the hierarchical location information and the layout bit maps shown in FIG. 15, and the device icon information shown in FIG. 21 are stored in a hard disk of the server unit 112.

First, an operation of the client unit 111 is described with focusing on different portions from those of the first embodiment.

Figure 50:
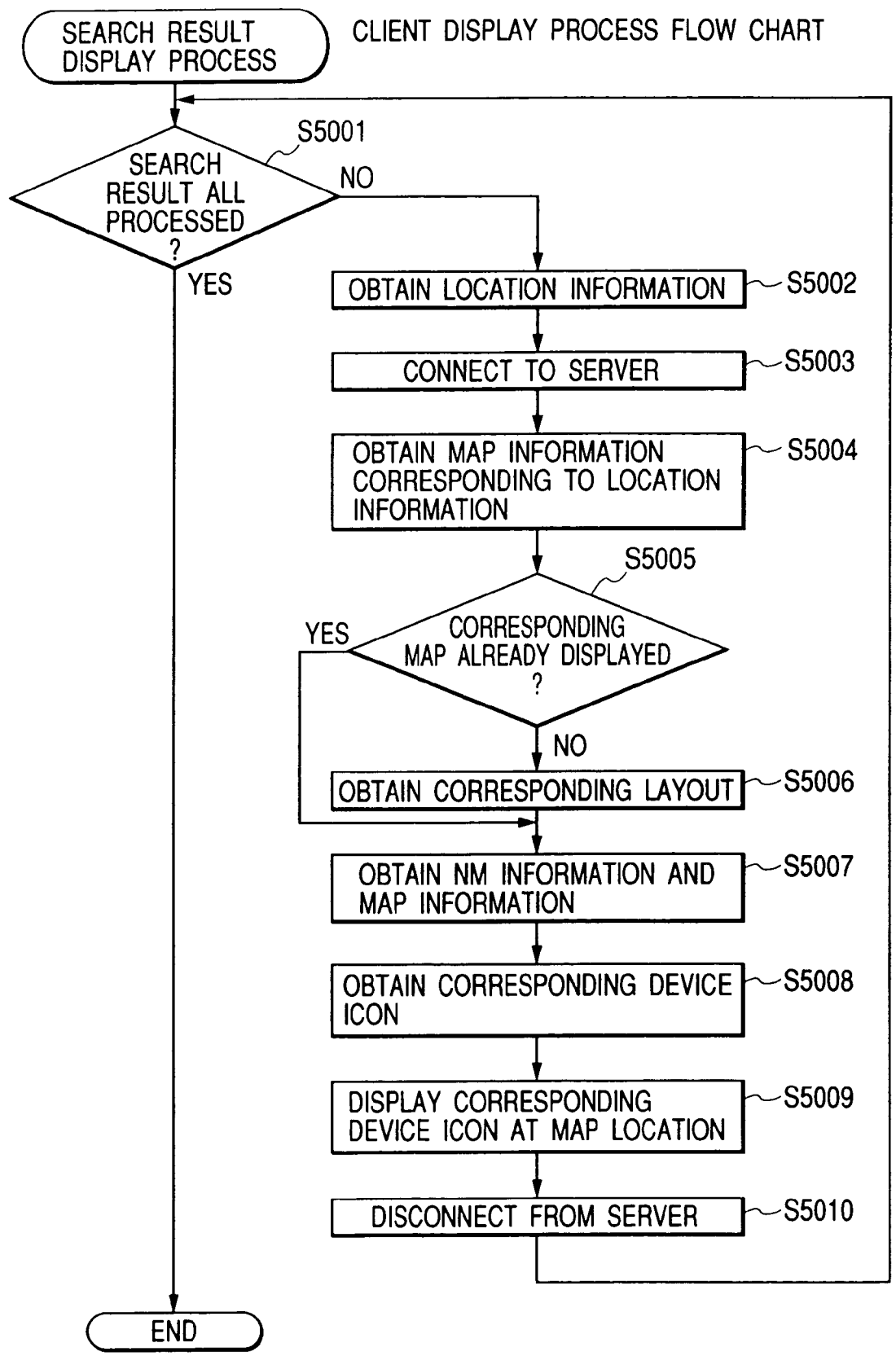
FIGS. 50 and 51 are flowcharts showing processes of a client unit according to a second embodiment.

Referring to FIG. 50, there is shown a flowchart of a search result display process of the client unit 111.

In the first step S5001, it is judged whether or not all of the search result is completed to be processed. If it is judged that all of the process is completed as a result of this judgment, the process is terminated.

On the other hand, unless all of the process is completed as a result of the judgment in step S5001, the control progresses to step S5002 to obtain hierarchical location information from the received search result. Subsequently a connection is made to the server unit (step S5003) to obtain map information corresponding to the obtained hierarchical location information (step S5004).

Next, it is judged whether or not the map corresponding to the hierarchical location information has already been displayed (step S5005). If it has not been displayed yet as a result of this judgment, the corresponding layout map is obtained.

Furthermore, NM information and map information are obtained from the hierarchical location information (step S5007) to obtain a device icon corresponding to the obtained NM information and map information (step S5008). Next, the obtained device icon is displayed at a predetermined position on the map (step S5009), before a disconnection with the server unit (step S5010).

Figure 51:
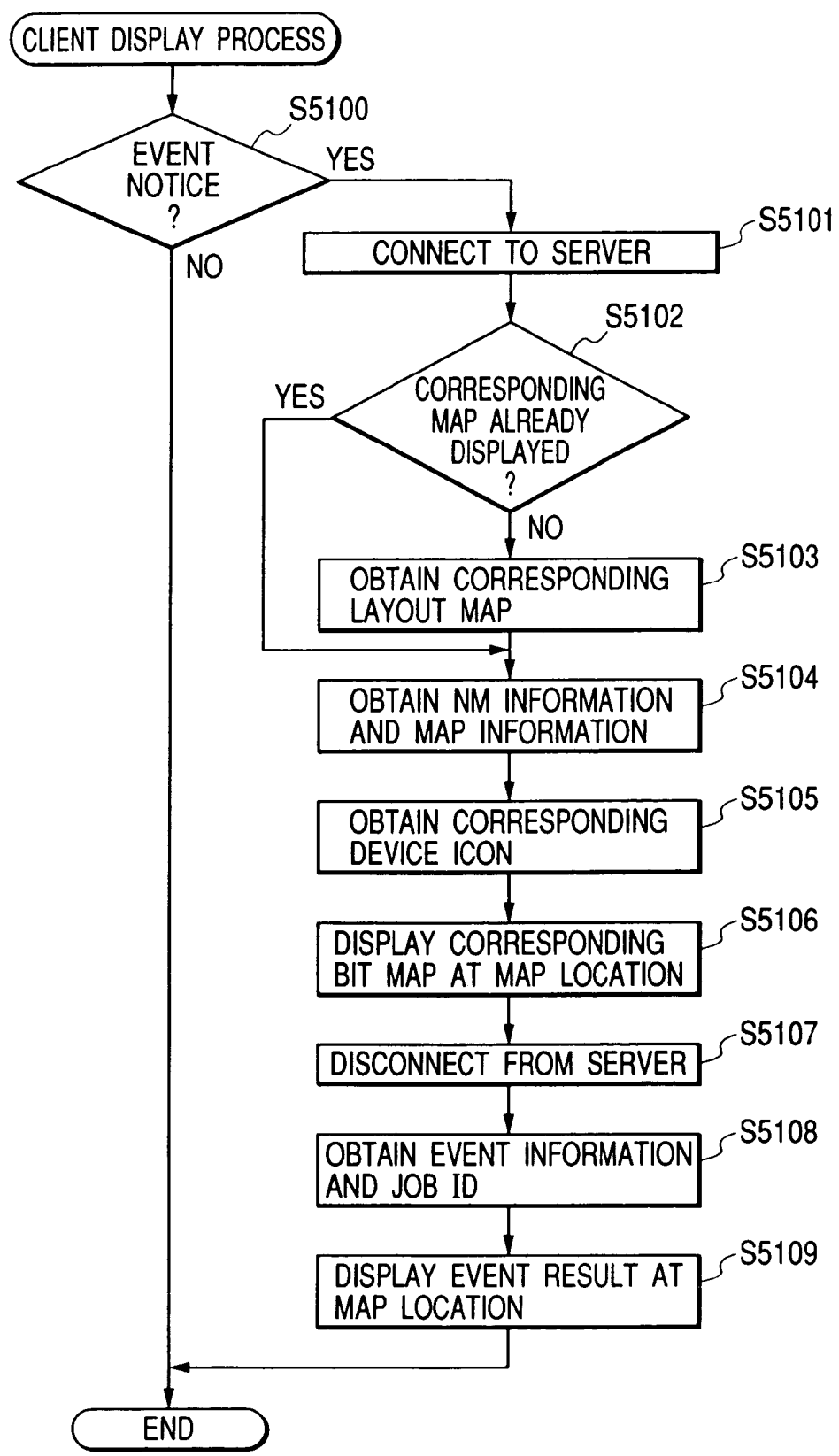

Referring to FIG. 51, there is shown a flowchart of a display process on the basis of an event notice received from the device by the client unit.

First, after the event notice receiving process is started, it is judged whether or not the input information is an event notice in step S5100. Unless the input information is an event notice as a result of this judgment, the process is terminated.

If the input information is an event notice, the control progresses to step S5101 for a connection with the server unit. Next, it is judged whether or not the corresponding map has already been displayed; if the map is judged not to have been displayed yet, a corresponding layout bit map is obtained from the server unit (step S5103).

Furthermore, NM information is obtained from the hierarchical location information (step S5104) and then the corresponding device icon is obtained (step S5105). Next, on the basis of the obtained information, a device icon is displayed on the layout map based on the received coordinate information (step S5106).

Subsequently, the client unit is disconnected from the server unit (step S5107) and event information and a job ID are obtained. After that, by displaying the obtained event information and the job ID, a display as shown in FIG. 34 is achieved.

Next, different portions from those of the first embodiment will be described regarding an operation of the server unit 112.

Figure 52:
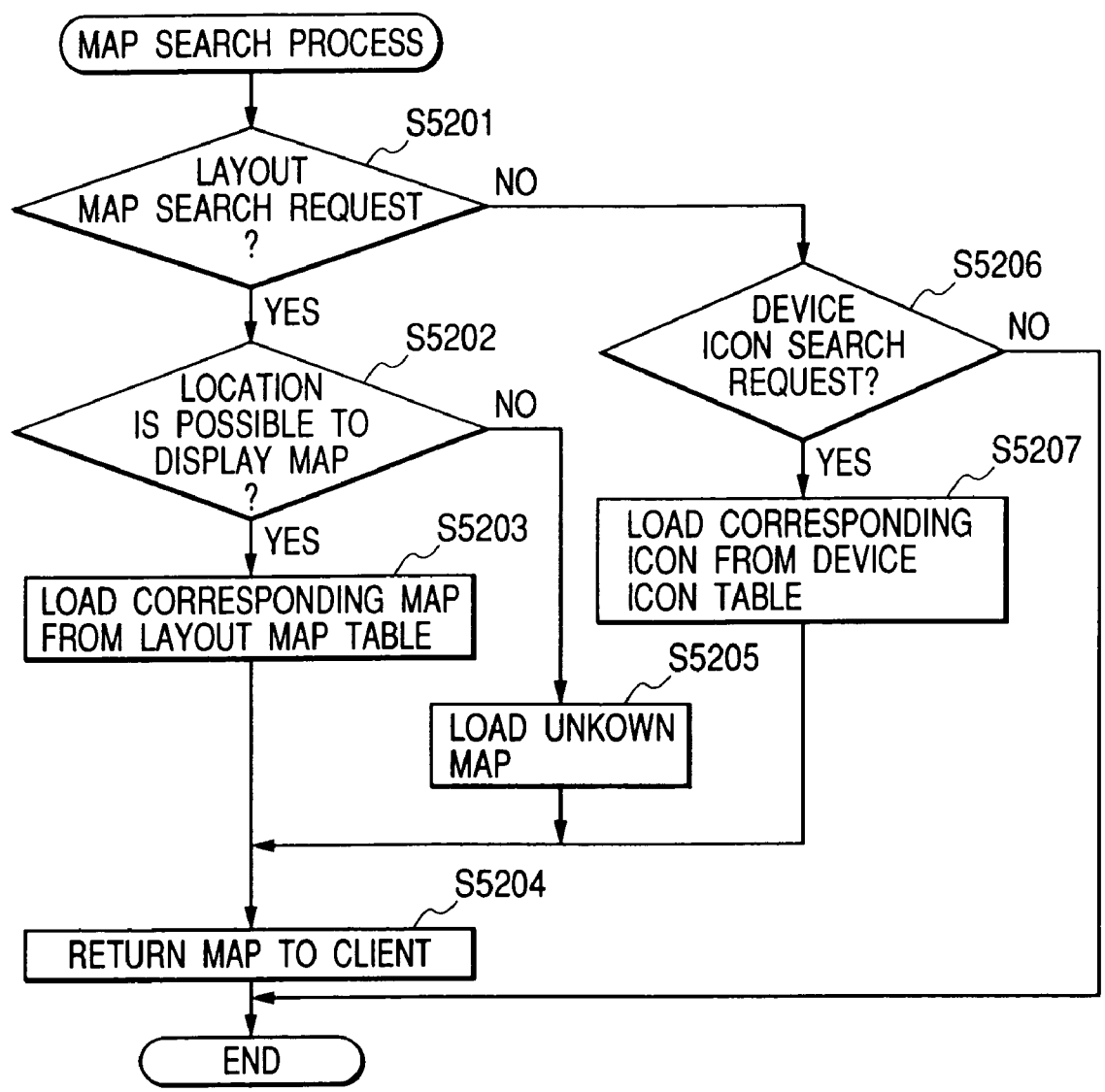
FIG. 52 is a flowchart showing a process of a server unit according to the second embodiment.

Referring to FIG. 52, there is shown a flowchart of a search process of a layout bit map in the server unit 112.

First, in the first step S5201, it is judged whether or not a search request is one for a layout map.

If it is a layout map search request as a result of this judgment, the control progresses to step S5202 to judge whether or not the hierarchical location information received from the client unit 111 indicates that the device can be displayed on the map. If it can be displayed as a result of this judgment, a layout bit map is loaded from the correspondence table shown in FIG. 15 in step S5203. Then, the obtained map is returned to the client unit 111 and the process is terminated.

On the other hand, if the device cannot be displayed on the map as a result of this judgment in the step S5202, the control progresses to step S5205 to display an unknown map icon shown in FIG. 21 is displayed.

In addition, unless the search request is one for a layout map as a result of the judgment in the step S5201, the control progresses to step S5206 to judge whether or not it is a device icon search request.

If it is a device bit map search request as a result of this judgment, the control progresses to step S5207 to load a corresponding device icon from the table shown in FIG. 21 and then it is returned to the client unit 111 (step S5204).

The layout bit map is retained in the client unit in the first embodiment, and therefore there is an effect that the server unit need not transfer the layout bit map to the client unit when a search result is displayed on the client unit, thereby reducing the processes and time for the display and thereby decreasing the traffic of the network system.

On the other hand, the server unit retains layout bit maps in the second embodiment, and therefore there are effects that map information can be unitarily managed by the server unit, that map information need not be stored for each client unit so as to facilitate updating and other maintenance, and that a load on a memory resource of a client can be reduced.

Accordingly, taking into consideration a network load or a client ability, the first or second embodiment shall be adopted appropriately.

Third Embodiment

While only layout bit maps corresponding to a block (BL) class are stored in the first and second embodiments, a description will be made for a case in which layout bit maps corresponding to respective classes of the hierarchical location information are stored to be reflected on a search result display of a client unit 111 in a third embodiment.

While only layout bit maps corresponding to a block (BL) class are stored in the first and second embodiments, a description will be made for a case in which layout bit maps corresponding to respective classes of the hierarchical location information are stored to be reflected on a search result display of a client unit 111 in a third embodiment.

According to the third embodiment, it is possible to display a device which has been searched for on a layout bit map of a class according to a user's preference from rough location information such as a building level to detailed location information such as a block on a floor.

While the client unit 111 retains layout bit maps in the description of the third embodiment in the same manner as for the first embodiment, a server unit 112 can retain layout bit maps in the same manner as for the second embodiment.

A general process of the third embodiment will be described below.

Referring to FIG. 38, there are shown lists of maps corresponding to respective classes for a search. A lower half of FIG. 38 is a list corresponding to FIG. 15. In this embodiment, a device bit map is displayed on the basis of attribute information of a class immediately under a class of the attribute to be searched for. For information about a hierarchical relationship, see FIG. 4.

For example, if all of the devices are searched for in the AA building as BU, an attribute FL (See FIG. 4) immediately under it is displayed as location information for displaying the devices on a layout map. By using a flowchart, some examples are described below.

To search for all of the devices in ABC Trading Co., Ltd., a user selects a company name (O) out of the pull-down menu in 1001a on the input screen shown in FIG. 11, inputs ABC Trading Co., Ltd. into 1002a as its attribute value, and then executes a search start in 1005.

A client obtains a search result from the server in a procedure described in the above embodiment. Then, the client displays a device bit map on the layout bit map on the basis of the search result obtained from the server.

Figure 39:
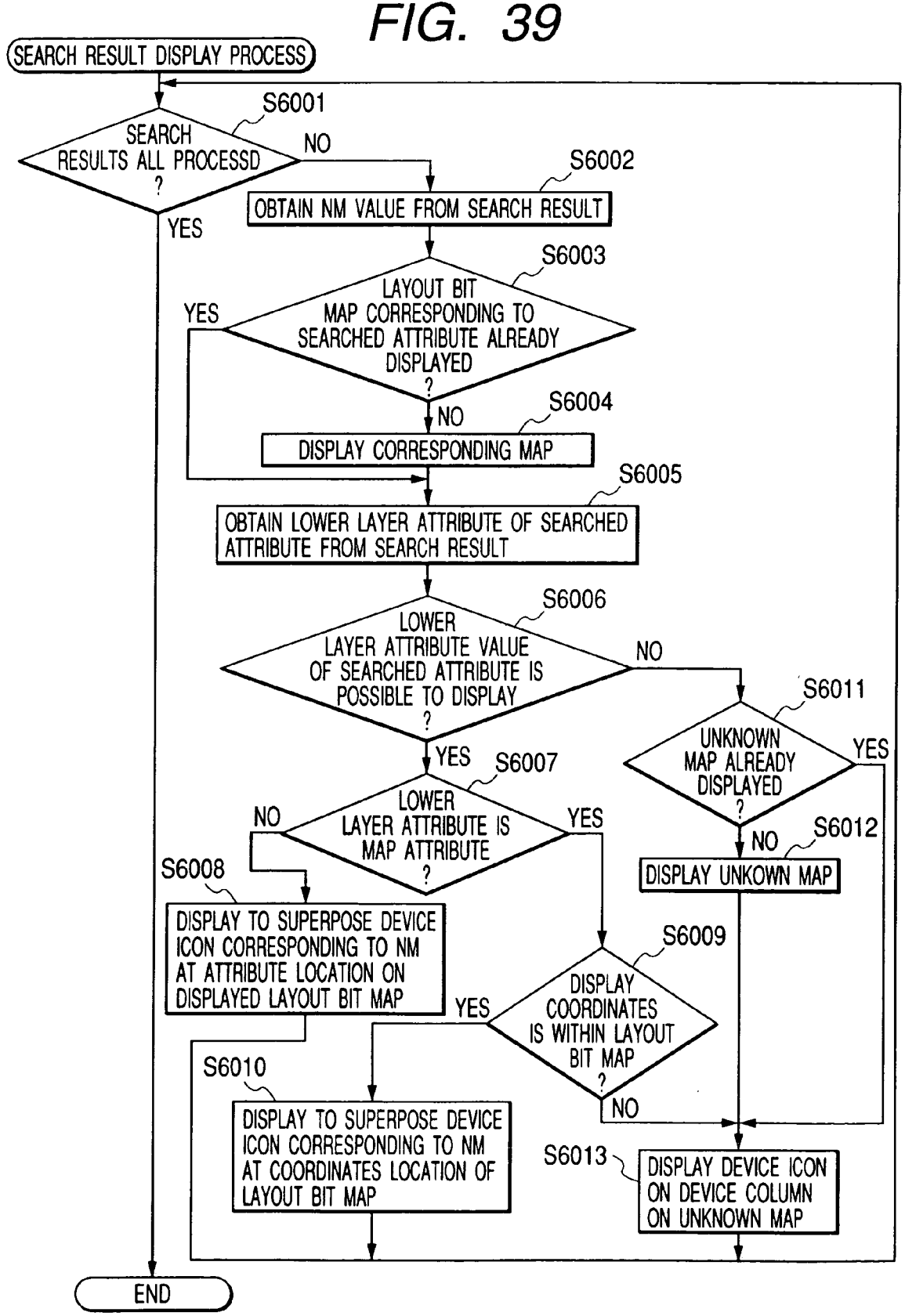
FIG. 39 is a flowchart showing a process of a client unit according to the third embodiment.

A display process of the client at this point is as shown in the flowchart in FIG. 39.

In other words, after starting the process, it is judged whether or not all of the display of the search result is completed in the first step S6001 and the display process is repeated until the process is completed.

Unless the process for the search result is not completed as a result of the judgment in step S6001, an attribute NM is obtained from the search result in step S6002. This process is executed for displaying device icons in steps S6008, S6010, and S6013.

Next, it is judged whether or not a layout bit map corresponding to an attribute of a condition searched for in step S6003 has already been displayed. In this example, the search process has been executed with the attribute value "ABC Trading Co., Ltd." as the attribute O, and therefore, devices as a search result are displayed on the layout bit map shown in FIG. 40 from the MAP correspondence list (shown in FIG. 38). It is judged whether or not the layout bit map in FIG. 40 has already been displayed. If the layout bit map has not been displayed yet as a result of this judgment, it is displayed in step S6004 and then the control progresses to a process in step S6005.

Figure 40:
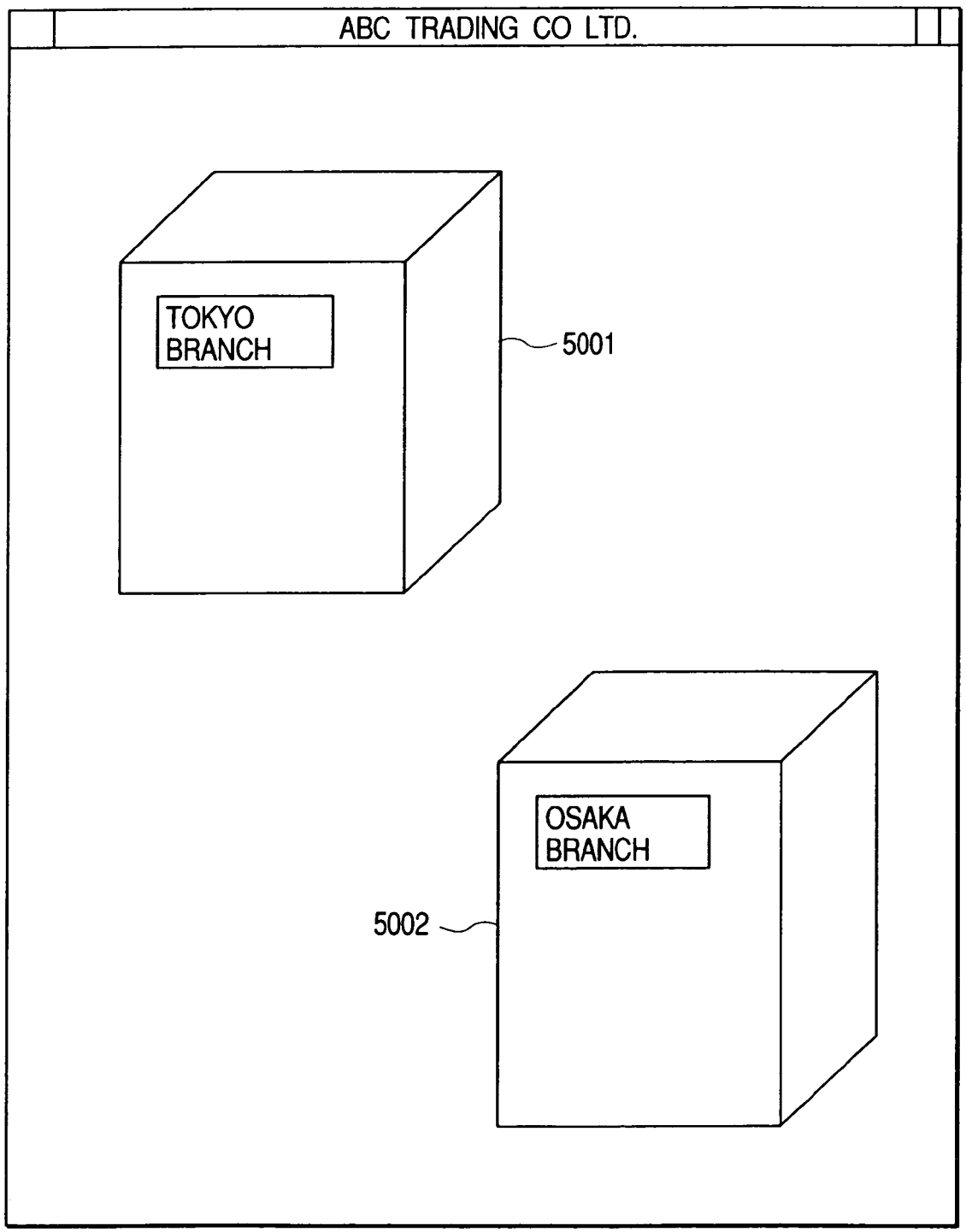
FIGS. 40, 41, 42, 43, 44, 45, 46, 47, 48 and 49 are examples of layout bit maps prepared for each class in the third embodiment.

If the layout bit map in FIG. 40 has already been displayed as a result of the judgment in step S6003, an attribute and its attribute value of a lower class under the attribute which has been searched for are obtained from the search result in the process in step S6005. It is judged whether or not the obtained attribute value is within a range of attribute values which allow a device to be displayed in step S6006. If it is out of the range of the attribute values or any attribute value is not inputted, the device cannot be displayed and therefore the control progresses to step S6011.

In step S6011, it is judged whether or not an unknown map has already been displayed. If it is not displayed yet, the unknown map is displayed in step S6012 and a device icon corresponding to an NM value obtained in step S6002 is displayed in a device column of the unknown map (step S6013).

Figure 41:
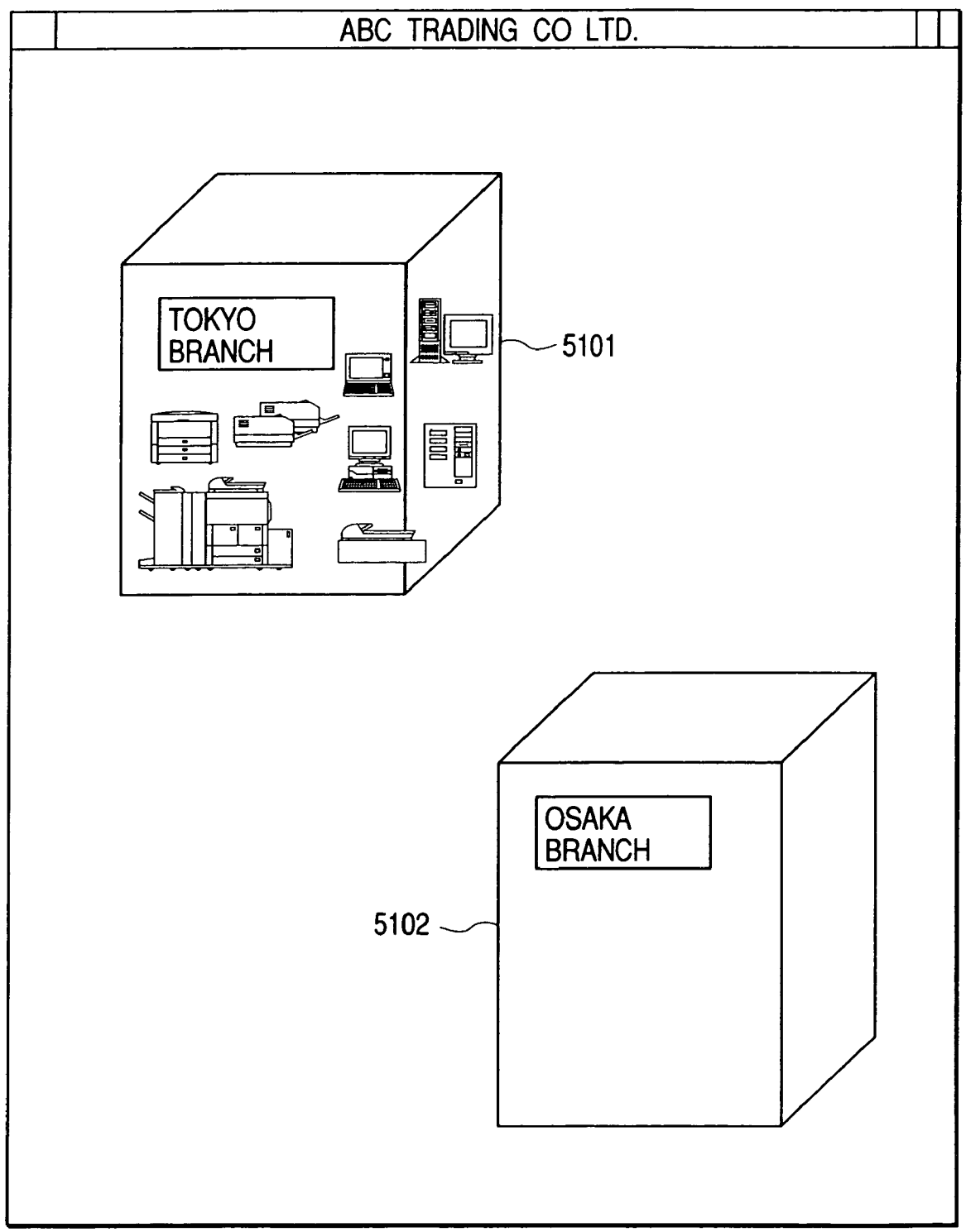

On the other hand, if the attribute value is within the range of the attribute values which allow a device to be displayed as a result of the judgment in step S6006, it is judged whether or not a lower-class attribute is a map attribute (step S6007). Unless it is a map attribute as a result of this judgment, the control progresses to step S6008 to display and superpose a device icon corresponding to the NM value obtained in step S6002 in the attribute location on the displayed layout bit map. In this case, the attribute value of the class BR under the class (O) in the hierarchical location information corresponds to "Tokyo branch" (shown in FIG. 4) and therefore respective devices are displayed in locations of the Tokyo branch 5001. This results in a display as shown in FIG. 41.

To search for the locations of the devices in more detail, a user selects the block name (BL) out of the pull-down menu in 1001*a* on the input screen shown in FIG. 11, selects 2-1 as its attribute value 1002*a*, and then executes a search start in 1005.

The client obtains a search result from the server in the procedure described in the above embodiment. The client displays a device bit map on the layout bit map on the basis of the search result obtained from the server. The processing flow shown in FIG. 39 is executed in the same manner, too. In this condition, lower-class attribute information is map information in the step S6007, and therefore the control progresses to step S6009.

In the step S6009, it is judged whether or not the coordinate range is within a range of the layout bit map. If it is so, a device icon corresponding to the NM value obtained in the step S6002 is displayed in the coordinate location so as to be superposed on the displayed layout bit map in step S6010.

Figure 18:
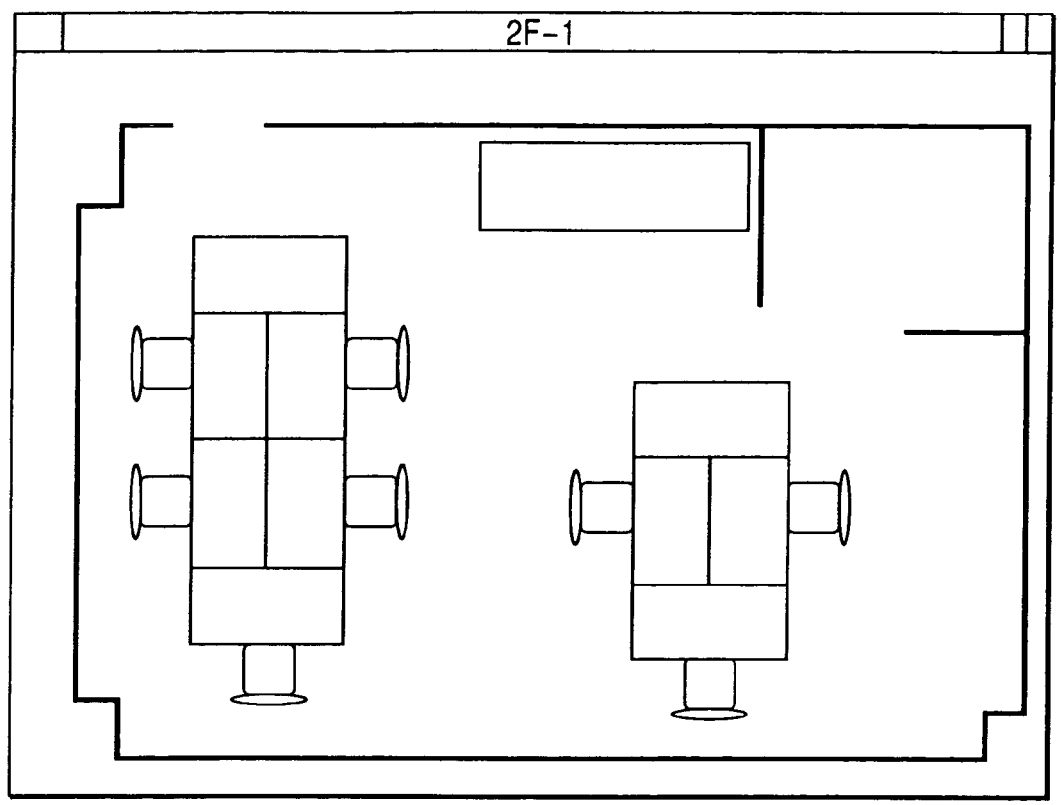
FIG. 18 is a diagram showing a layout bit map managed by a client unit.
Figure 19:
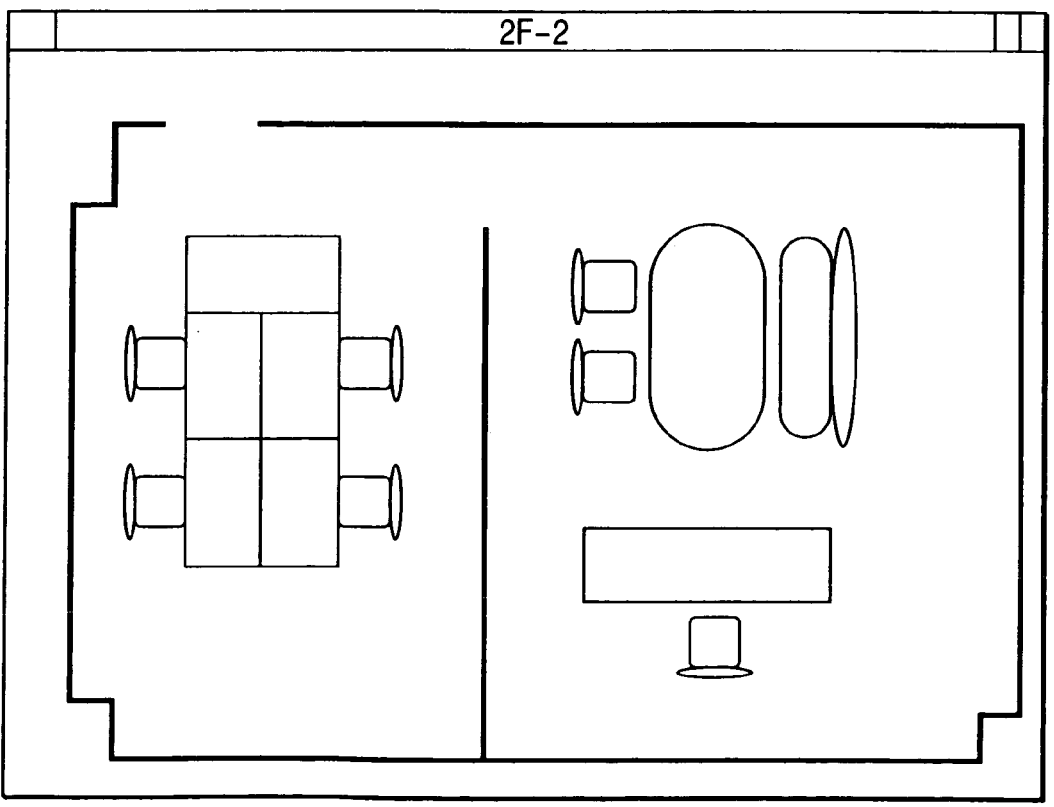
FIG. 19 is a diagram showing a layout bit map managed by a client unit.

In this case, the search process has been executed with the attribute BL and the attribute value 2-1, and therefore the devices as a search result are displayed on the layout bit map shown in FIG. 18 from the map correspondence list (shown in FIG. 38).

Since it is a map belonging to the BL class in the hierarchical location information (as shown in FIG. 4), respective devices as a search result are displayed at coordinates on the layout. As a result, a display as shown in FIG. 5 is obtained.

Subsequently other layout bit map diagrams of respective classes will be described below.

As described above, FIG. 40 shows a layout bit map for searching for devices with the attribute value "ABC Trading Co., Ltd." for the attribute O. Devices having the lower-class attribute BR of "Tokyo branch" under the attribute O are displayed in 5001, while devices having the lower-class attribute BR of "Osaka branch" are displayed in 5002.

Referring to FIG. 41, there is shown a result display appearing after all of the devices are searched for with the attribute value "ABC Trading Co., Ltd." for the attribute O.

Figure 42:
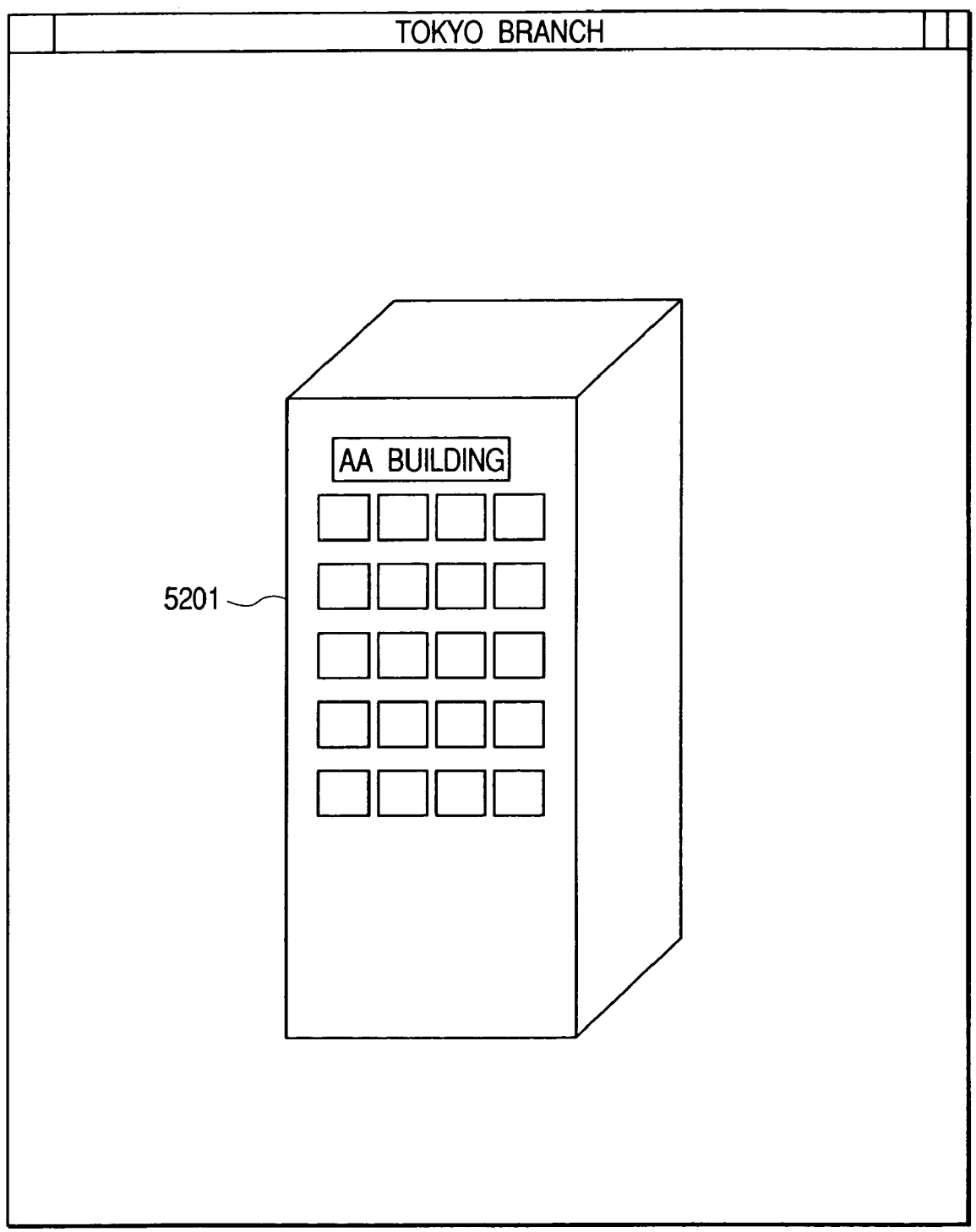

Referring to FIG. 42, there is shown a layout bit map for searching for devices with the attribute value "Tokyo branch" for the attribute BR. Although a lower-class attribute of the attribute value BR is OP, which indicates that there is an option as further detailed information under it. Devices whose attribute BU is the AA building are displayed in 5201.

Figure 43:
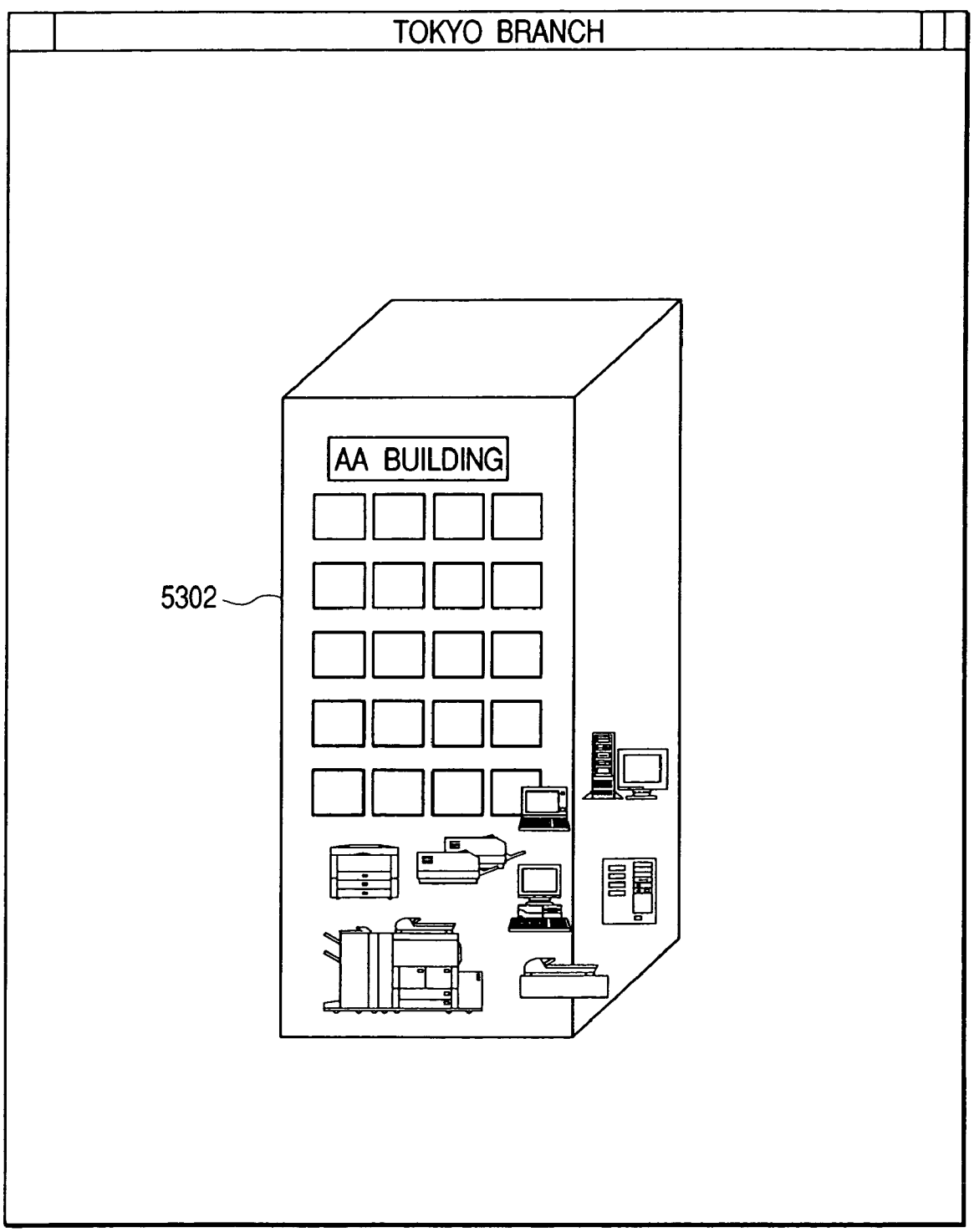

Referring to FIG. 43, there is shown a search result display in a building 5302 after all the devices have been searched for with the attribute value "Tokyo branch" for the attribute BR.

Figure 44:
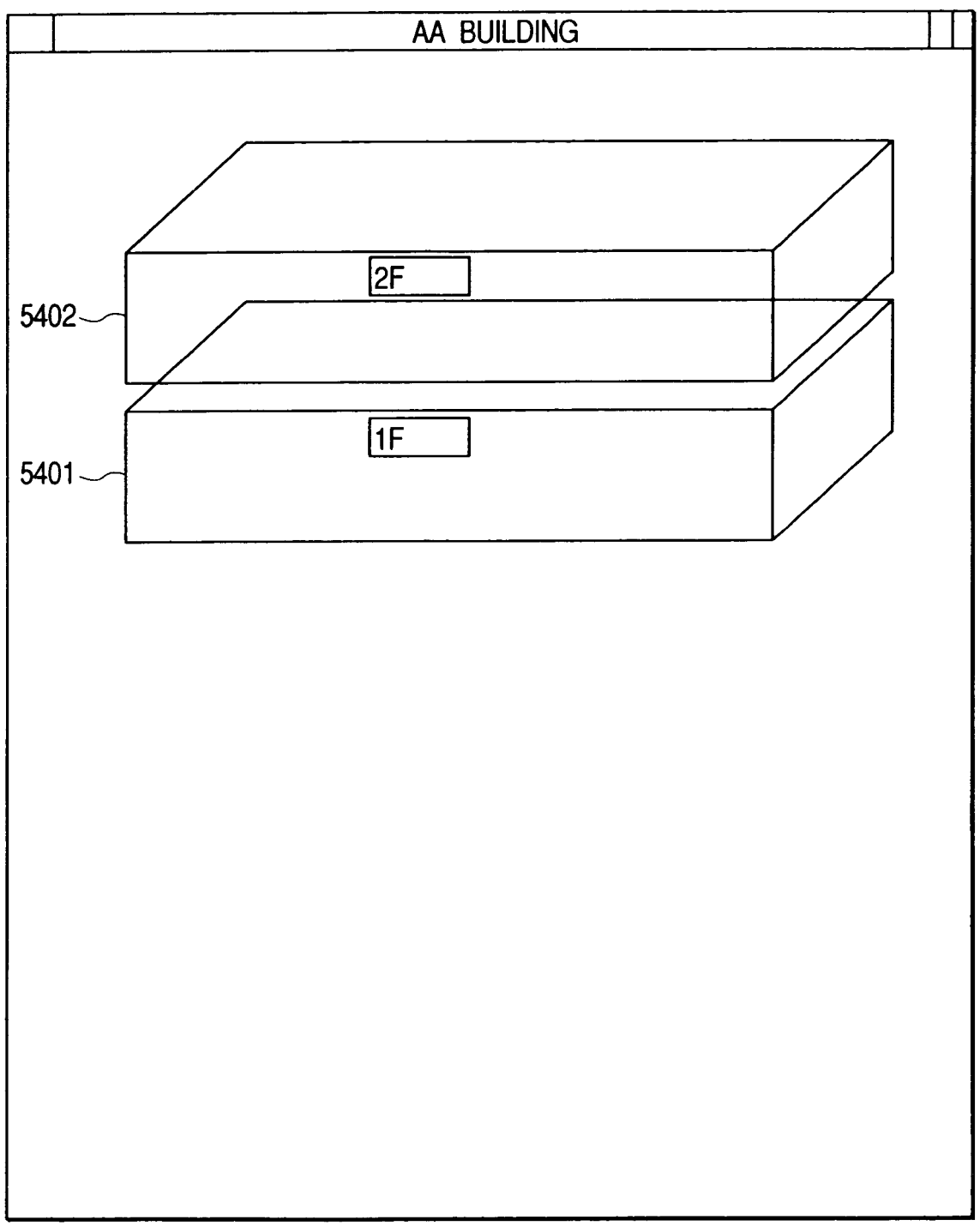

Referring to FIG. 44, there is shown a layout bit map for searching for devices with the attribute value "AA building" for the attribute BU. Devices having the lower-class attribute FL of "2F" under the attribute BU are displayed on a bit map 5402, while devices having the lower-class attribute FL of "1F" are displayed on a bit map 5401.

Figure 45:
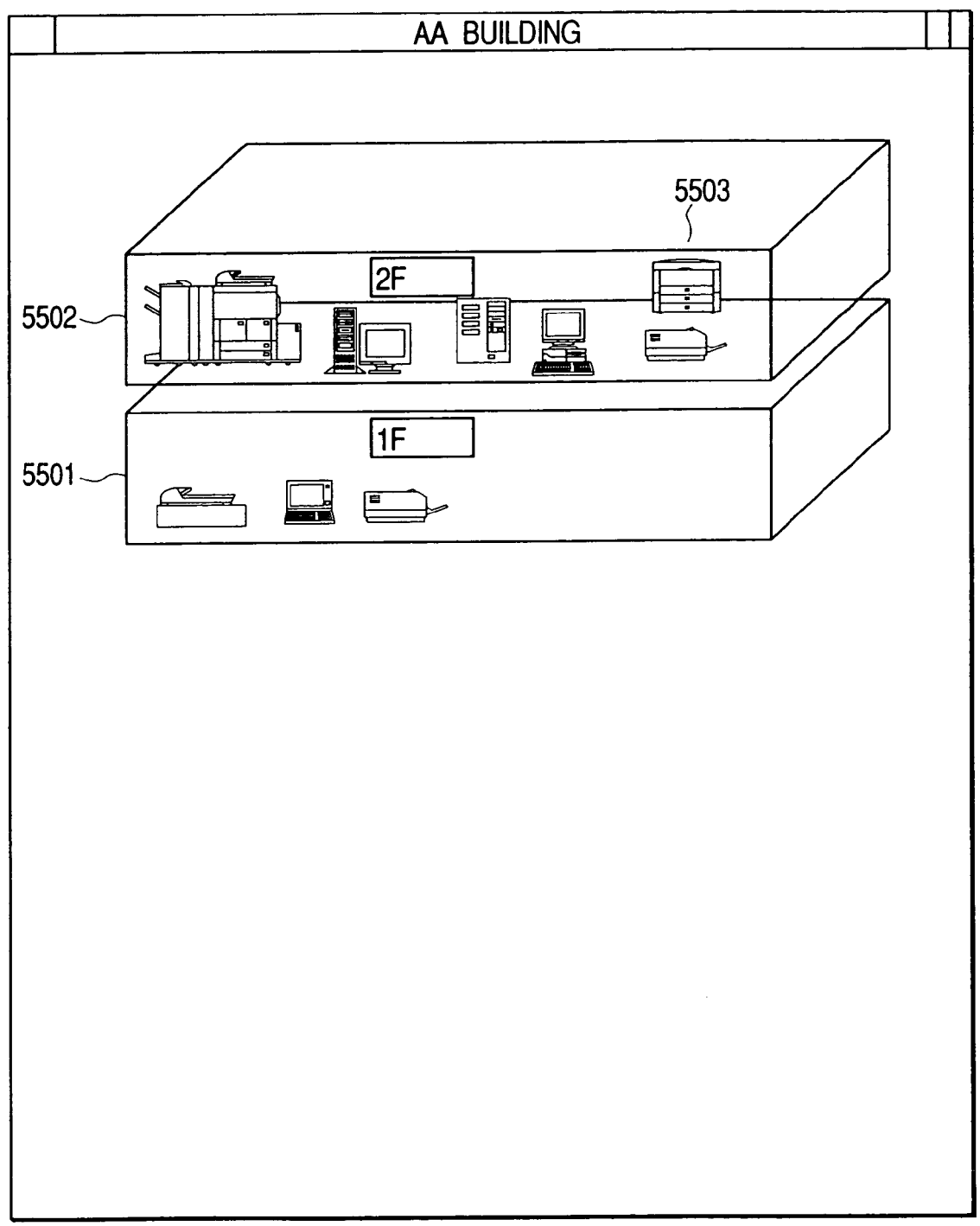

Referring to FIG. 45, there is shown a result display appearing after all of the devices are searched for with the attribute value "AA building" for the attribute BU, displaying all of the devices existing on a bit map 5502 of 2F and those existing on a bit map 5501 of 1F.

Figure 46:
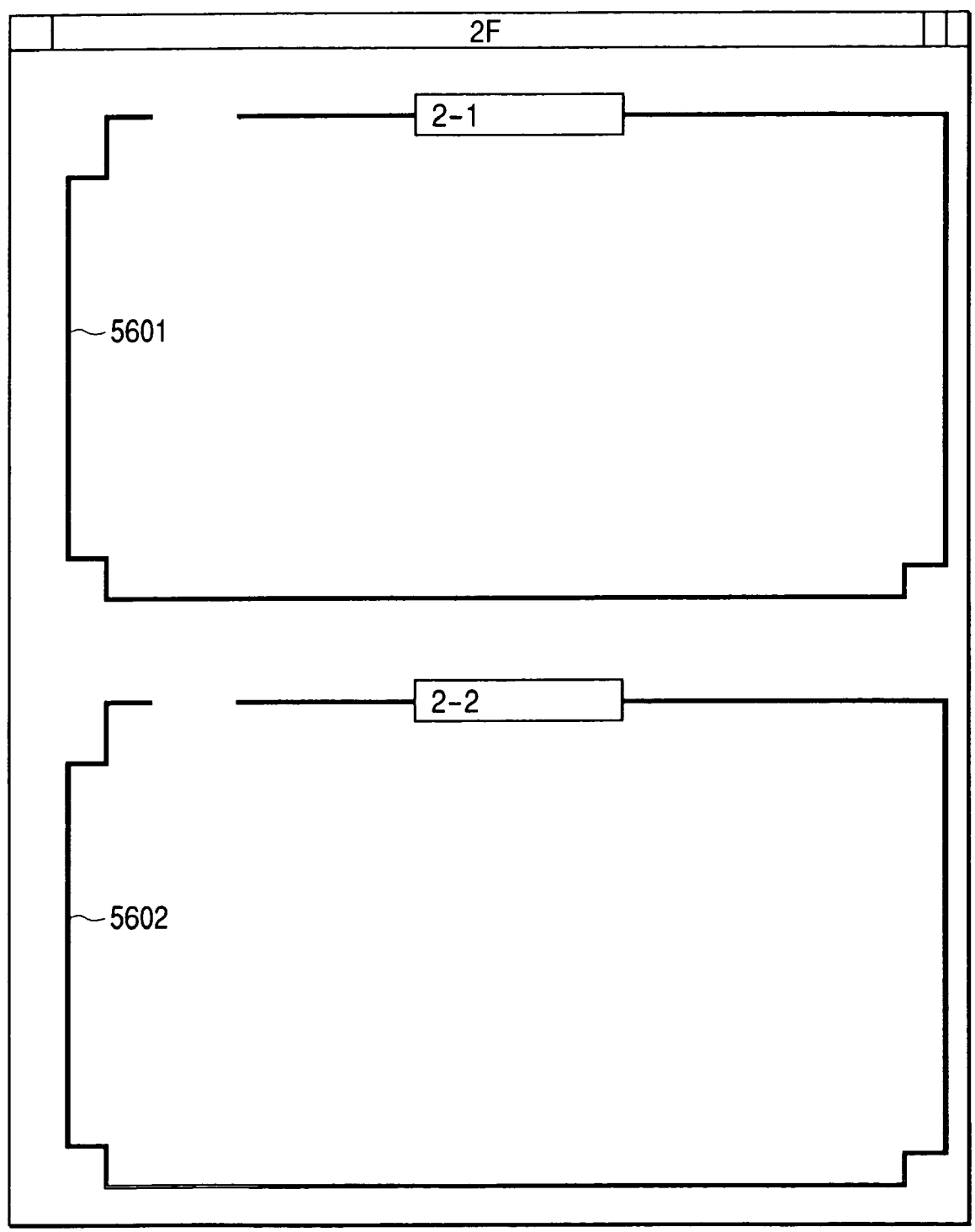

Referring to FIG. 46, there is shown a layout bit map for searching for devices with the attribute value of "2F" for the attribute FL. Devices having the lower-class attribute BL of "2-1" under the attribute FL are displayed on a bit map 5601, while devices having the lower-class attribute BL of "2-2" are displayed on a bit map 5602.

Figure 47:
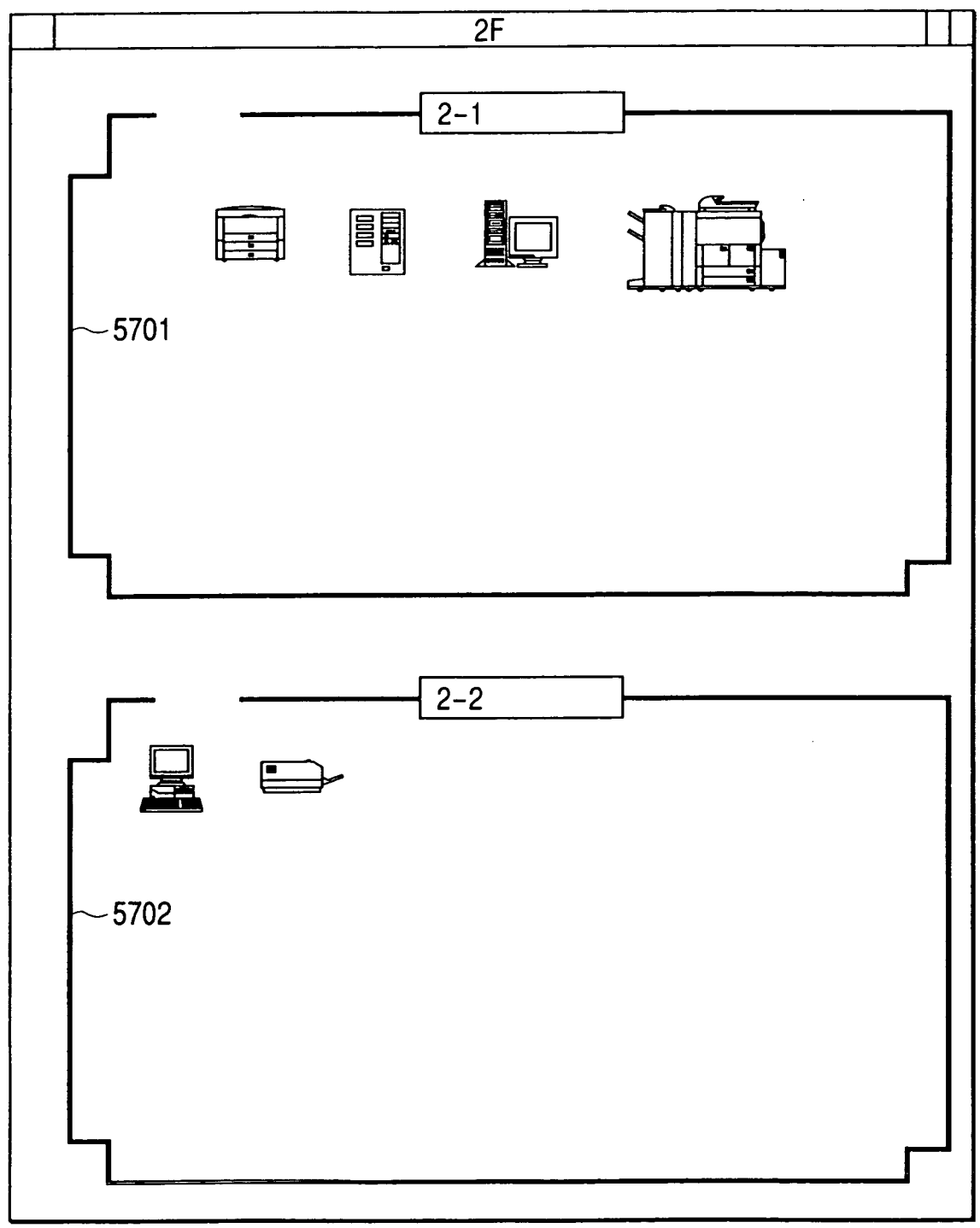

Referring to FIG. 47, there is shown a result display appearing after all of the devices are searched for with the attribute value "2F" for the attribute FL, displaying all of the devices existing on a bit map 5701 of 2F-1 and those existing on a bit map 5702 of 2F-2.

Figure 48:
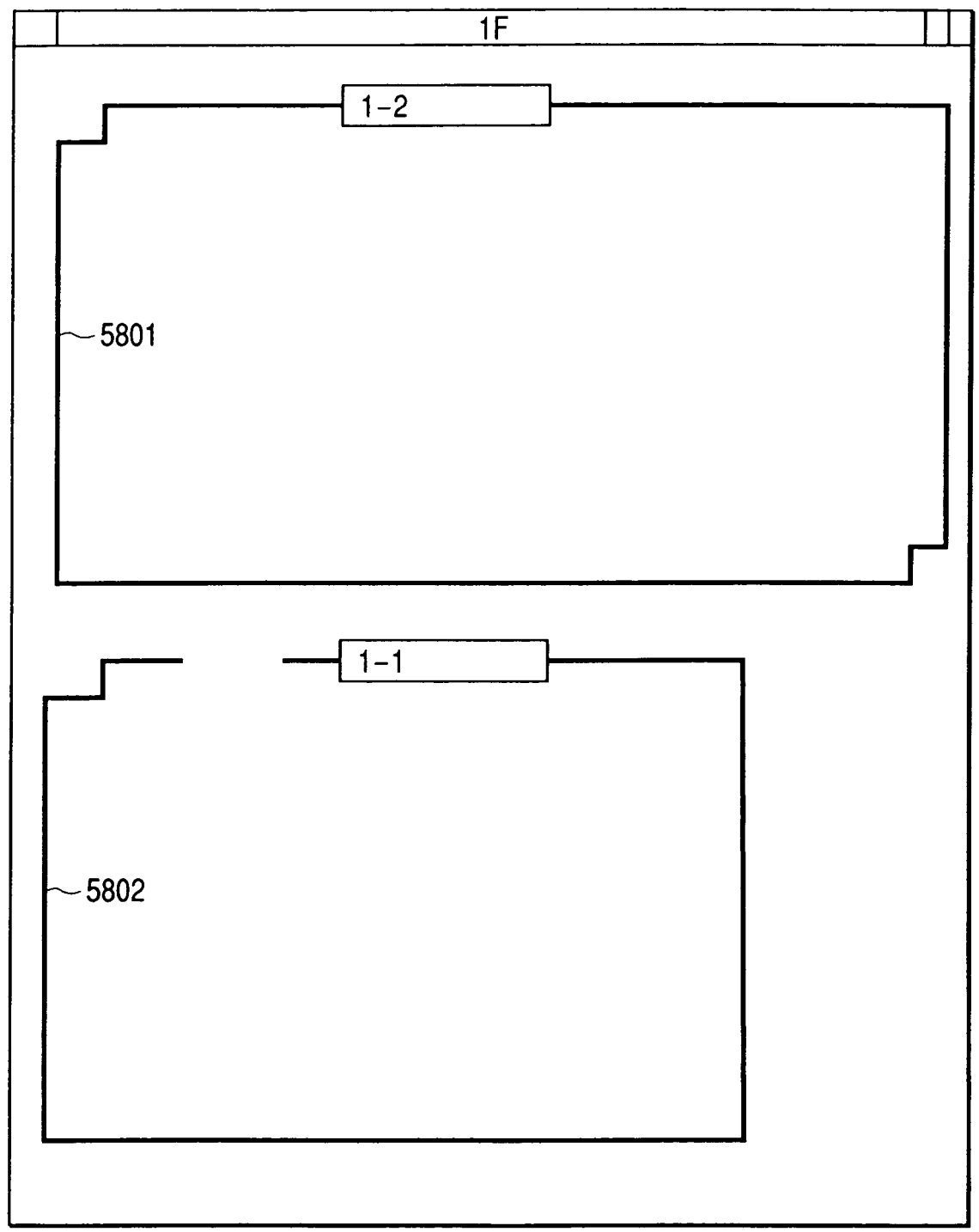
Figure 49:
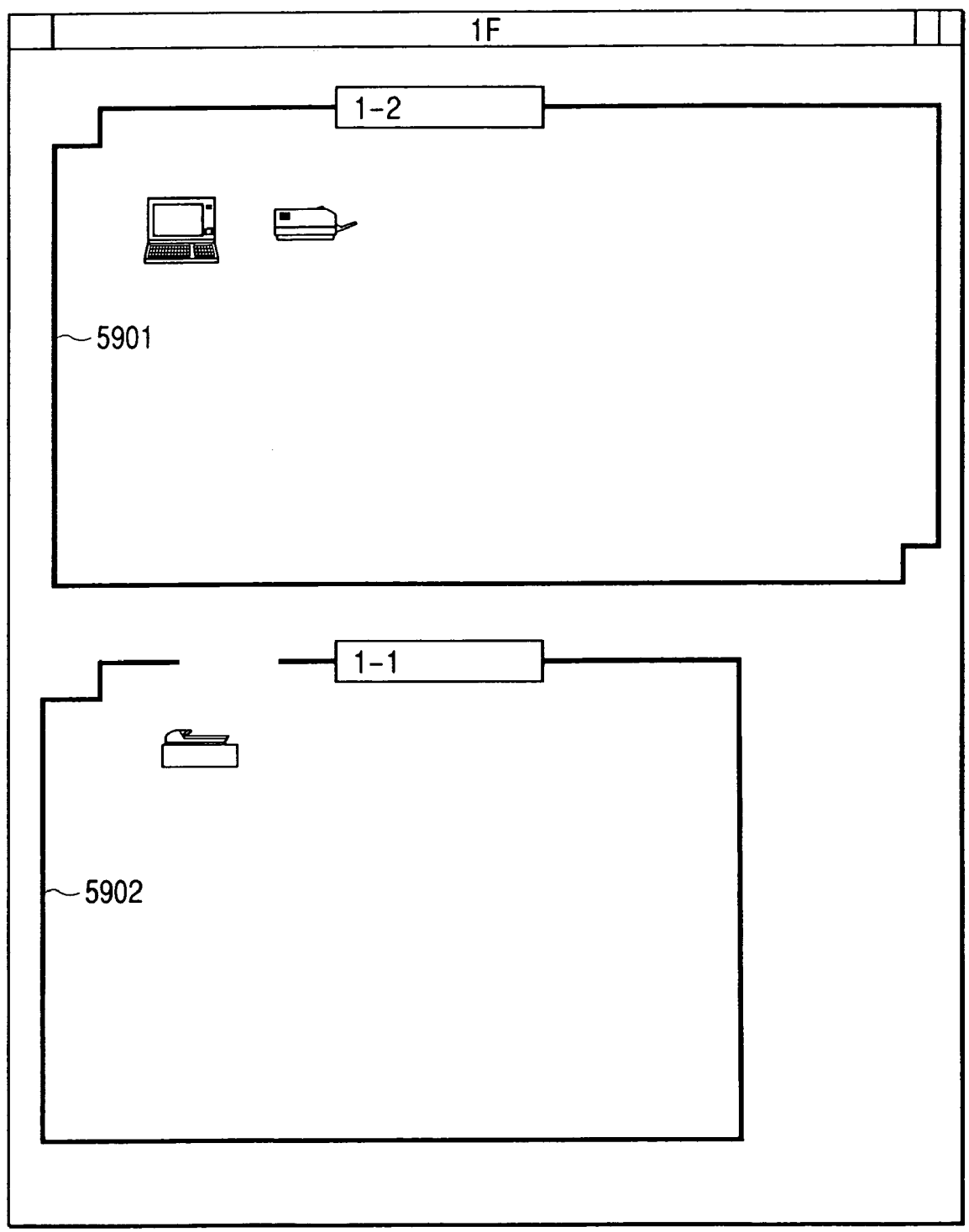

Referring to FIG. 48, there is shown a layout bit map for searching for devices with the attribute value of "1F" for the attribute FL. Referring to FIG. 49, there is shown a result display appearing after all of the devices are searched for with the attribute vale "1F" for the attribute FL. Devices having the lower-class attribute BL of "1-2" under the attribute FL are displayed on a bit map 5901, while devices having the lower-class attribute FL of "1-1" are displayed on a bit map 5902.

As set forth hereinabove, it becomes possible to search for and display devices according to a search request level of a user from a detailed display to a rough display for respective classes of the location information.

Fourth Embodiment

In a fourth embodiment, a description will be made for a system for understandably notifying a user of a location of a device on a network in addition to status of the device. In the fourth embodiment, the device status is obtained by polling from the device.

The fourth embodiment is based on the first embodiment and therefore portions different from those of the first embodiment are mainly described.

Referring to FIG. 53, there is shown a management table for managing device icon information of respective devices in a client unit 111. The device icon information comprises several types of icon information indicating status of each device. FIG. 53 shows PC and other icons in addition to device icons. The client unit 111 selects a device icon corresponding to status obtained from the device and displays it on a layout bit map.

In an example shown in FIG. 53, there is shown device icon information according to each status such as Ready, No Paper, or Paper Jammed for each device. Each device icon information is associated with each device name (NM) and a device icon indicating Unknown for an unknown device name.

Figure 54:
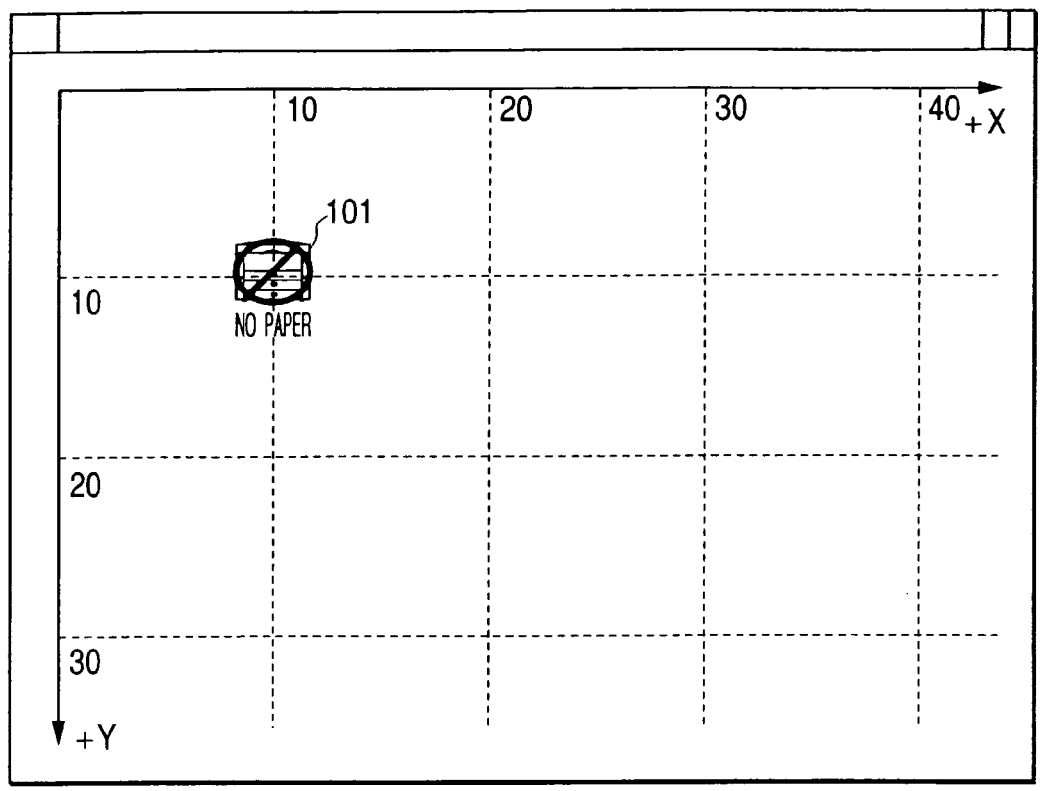
FIGS. 54 and 55 are sample displays of layout bit maps according to the fourth embodiment.

Referring to FIG. 54, there is shown a diagram indicating a location of a device icon displayed and superposed on a layout bit map. A printer 101 (LBP 1110) having location information of coordinate information "10X+10Y" is displayed in a form of a bit map icon corresponding to the current status at the position as shown in FIG. 54. In this example in FIG. 54, a device icon is displayed indicating that status of the printer 101 is "No Paper."

By displaying this bit map icon together with the layout bit map, the location of the device which has been searched for and the current status of the device can be displayed understandably for a user.

Figure 55:
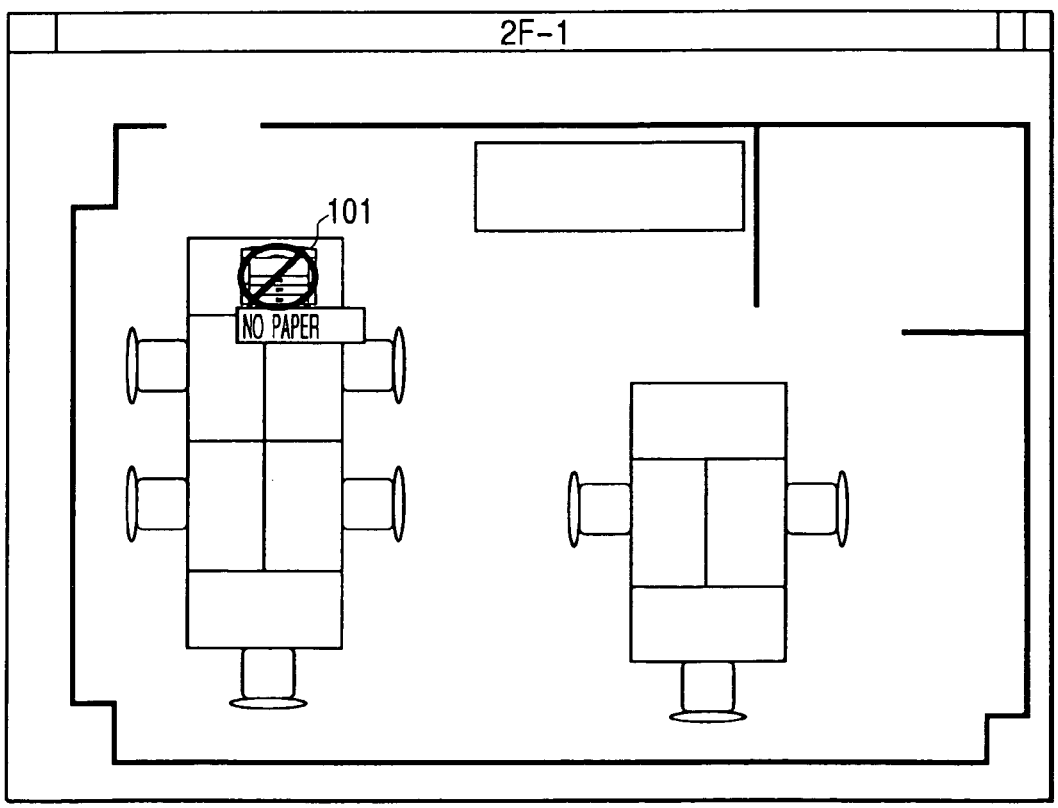

Referring to FIG. 55, there is shown a layout bit map displayed on the client unit 111 after obtaining the status of the device which has been searched for. From this display, it is visually understood that the printer (LBP 1110) capable of color input or output processing is located around a table near an entrance of the block 2-1 on the second floor. Furthermore, a user is concurrently informed that the color printer 101 is currently put in the No Paper status.

Figure 56:
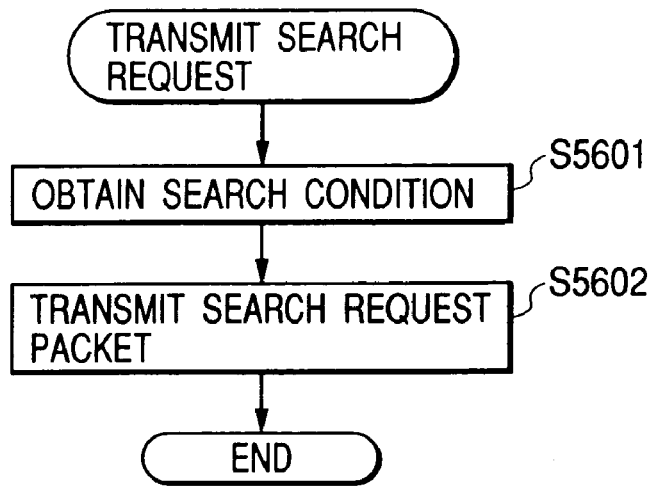
FIGS. 56, 57 and 58 are flowcharts showing processes of the client unit according to the fourth embodiment.

Referring to FIG. 56, there is shown a flowchart of a search request transmission process in the client unit 111. In the search request transmission process shown in FIG. 56, a search condition inputted from a search condition input screen as shown in FIG. 12 is obtained first and then converted into a format of the search condition formula shown in FIG. 13 (step S5601). Next, a search request packet including the converted search condition formula is generated and transmitted to a server unit 112 for making a query (step S5602).

By storing this search condition formula in the HD 211, this search condition formula can be used for the next search for a device under the same condition, by which a search condition re-input by a user can be omitted.

Figure 57:
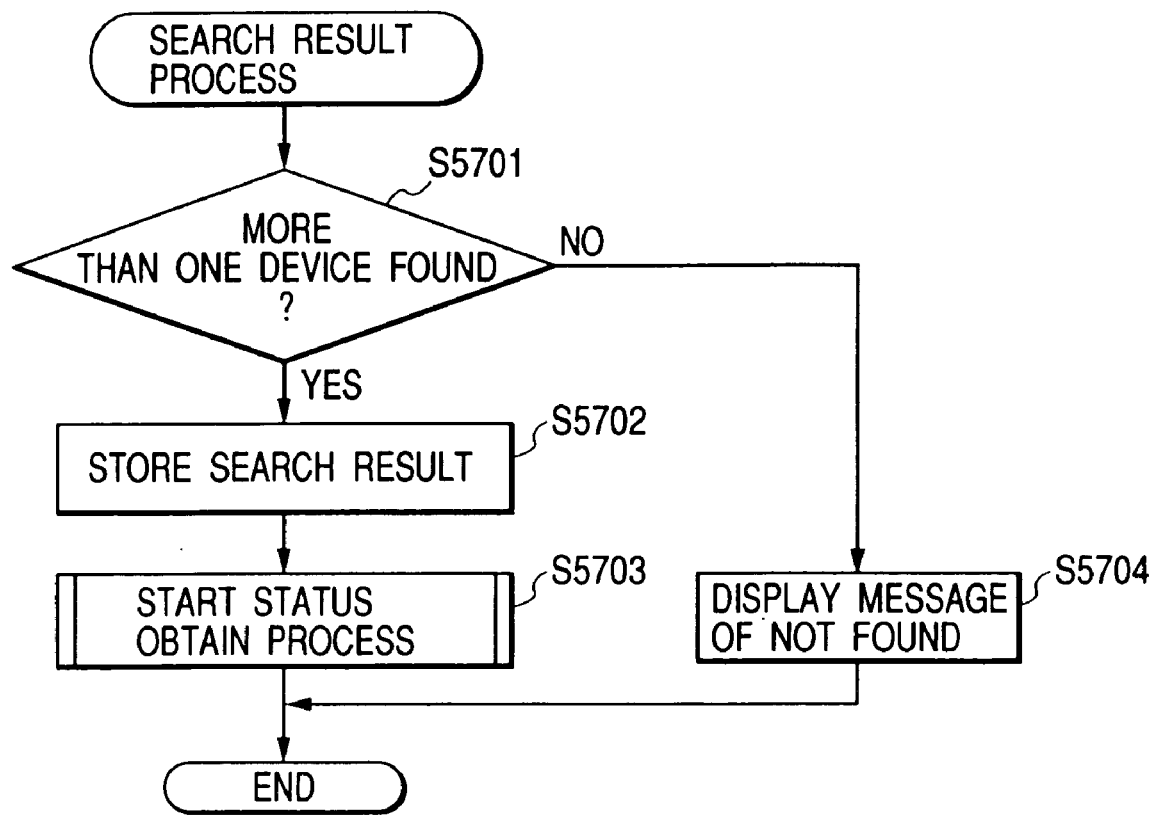

Next, referring to FIG. 57, there is shown a flowchart of a device search result process in the client unit 111.

In FIG. 57, it is judged whether or not one or more devices satisfying the search condition are found as a result of the device search (step S5701). If there is no device satisfying the search condition, the client unit displays a message (not shown) indicating that the specified device has not been found at all (step S5704) and terminates the process.

On the other hand, if it is judged that one or more devices are found in the above step S5701, the search result (location information and attribute information of the corresponding device) is stored in the hard disk 211. For example, if a search result as shown in FIG. 14 is obtained, it is stored in the hard disk 211. After that, a status obtain process described later is started (step S5703) and then the process is terminated.

Figure 58:
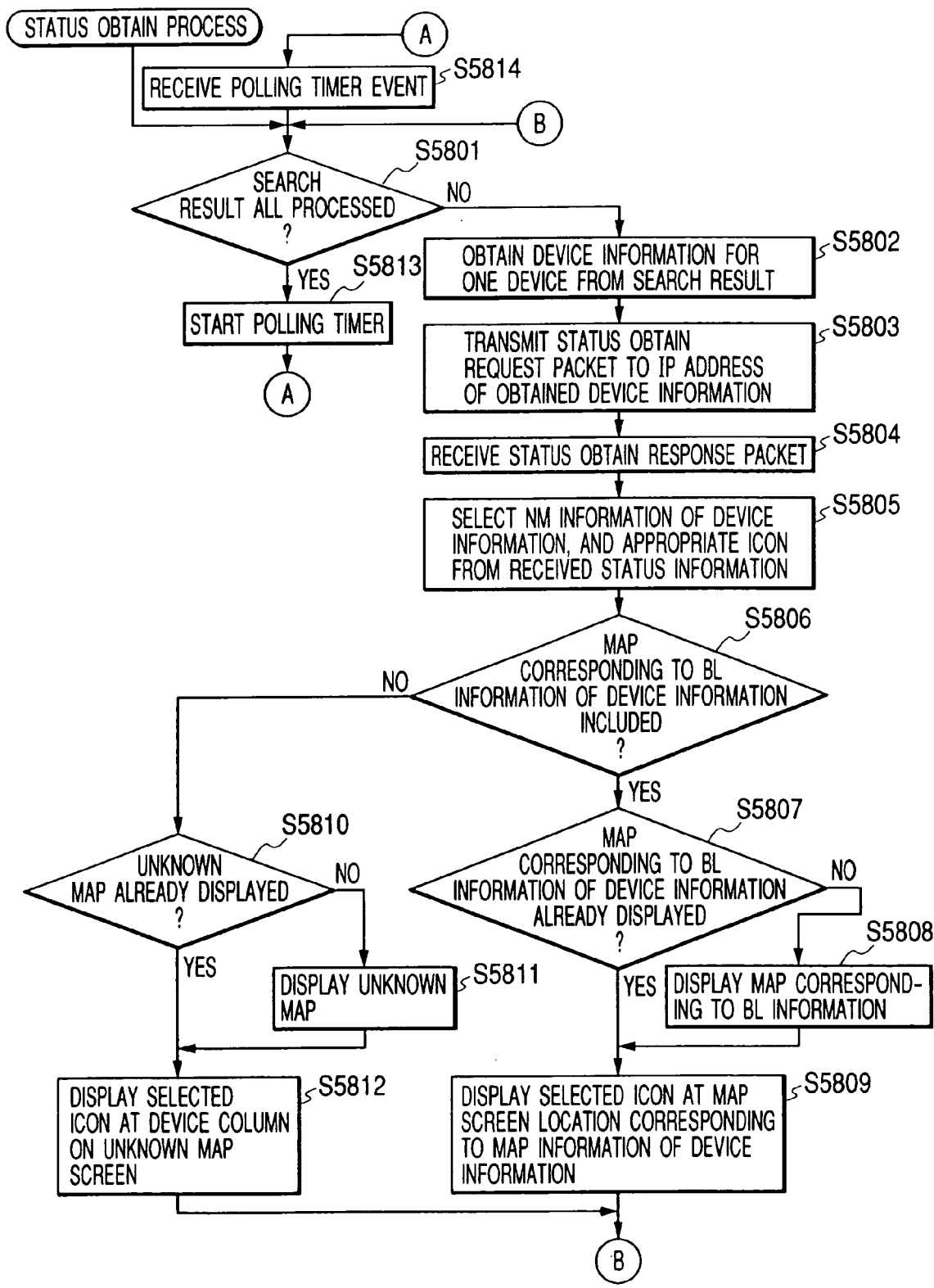

Next, an operation of the status obtain process started in the step S5703 of the flowchart shown in FIG. 57 is described in detail below by using a flowchart shown in FIG. 58. The status obtain process is a program for the client unit 111 to obtain device status at regular intervals and to display and superpose a device icon corresponding to the current status on a layout bit map.

After the status obtain process is started, the search results stored in the hard disk 211 in the step S5702 in FIG. 57 are referenced first to judge whether or not all of the search results are completed to be processed, in other words, whether or not the status obtain process is completed for the devices at all of the IP addresses included in the stored search results (step S5801).

If all of the search results are completed to be processed, a polling timer is started to obtain the device status found in the search process at regular intervals (step S5813) and then the client unit enters a time-out event wait state of the polling timer in step S5814. After receiving the time-out event of the polling timer, the control progresses to the step S5801 again to execute the same process.

Figure 60:
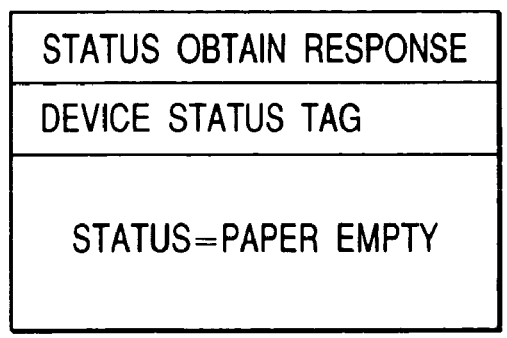
FIG. 60 is a diagram showing a response packet of the device according to the fourth embodiment.

In the above step S5801, if it is judged that there is any search result which has not been processed yet, device information (location information and attribute information) of a single device is obtained from the search result which has not been processed yet (step S5802). Furthermore, a status obtain request packet (not shown) is transmitted to an IP address included in the obtained attribute information (step S5803) and then the client unit enters a wait state for receiving a status obtain response packet as shown in FIG. 60. For example, if the search result shown in FIG. 14 is processed, the IP address is "192.1.2.1" and the status obtain request packet is transmitted to this IP address.

Subsequently, when receiving the status obtain response packet from the targeted device in step S5804, an appropriate device icon corresponding to the device status is selected out of the various device icons shown in FIG. 53 on the basis of the device name (NM) information included in the location information of the search result and the device status information of the received status obtain response packet (step S5805). For example, if the search result shown in FIG. 14 is processed, device name information is "LBP 1110." If the device status information of the status obtain response packet indicates No Paper, a bit map icon designated by 2001 is selected.

Next, it is judged whether or not the client unit 111 can display the layout bit map corresponding to the block (BL) information as location information, in other words, whether or not it stores the layout bit map information corresponding to the block (BL) information by using the information table shown in FIG. 15 (step S2906). In this embodiment, the location information which allows the client unit to display a layout bit map is location information including the information designated by 1401 in FIG. 15. Unless the location information includes this, it is judged whether or not an unknown map has already been displayed as shown in FIG. 20 (step S5810).

If the unknown map has not been displayed yet, the unknown map is displayed in the area 1901 shown in FIG. 20 (step S5811). After that, the device bit map icon selected in the above step S5805 is displayed in the area 1902 shown in FIG. 20 (step S5812). In this case, the layout map has not been normally displayed. In other words, an icon of a device whose location information has not been registered yet is displayed here.

On the other hand, if it is judged that the client unit can display the layout bit map in the step S5806, it is judged whether or not the layout bit map corresponding to the block (BL) information in the location information has already been displayed (step S5807). If it is judged that the layout bit map has not been displayed yet, the layout bit map corresponding to the above block (BL) information is displayed on the screen (step S5808). For example, if the search result in FIG. 14 is processed, "2-1" is the block (BL) information of the color printer 101 (LBP 1100) found out by the search, and therefore the layout bit map shown in FIG. 18 corresponding to this is displayed.

Subsequently, the device bit map icon selected in the above step S5805 is displayed at the corresponding display position on the layout bit map on the basis of the coordinate information (MAP) in the location information so as to be superposed on the layout bit map (step S5809). For example, if the search result in FIG. 14 is processed, "10X+10Y" is the coordinate information (MAP) of the color printer 101 (LBP 1100). In addition, if a result of querying the color printer 101 (LBP 1100) about status is "No Paper," a device icon indicating "No Paper" is displayed at the position shown in FIG. 54. By displaying this device icon so as to be superposed on the above layout bit map, the search result can be displayed as shown in FIG. 55.

Figure 59:
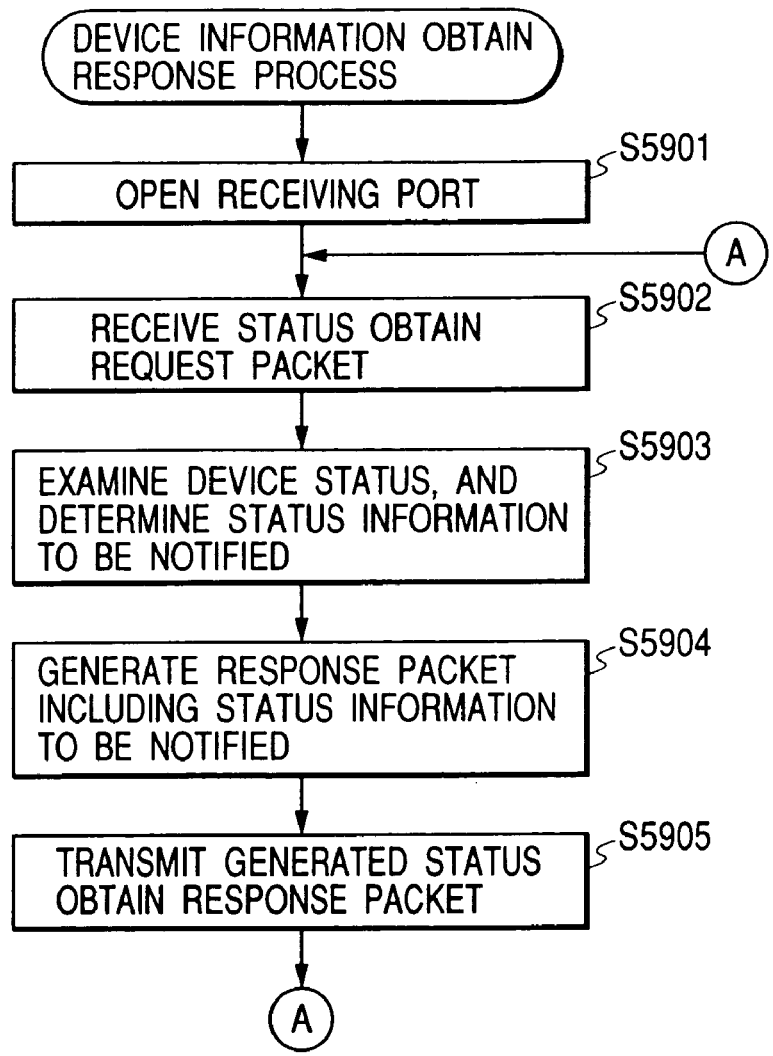
FIG. 59 is a flowchart showing a process of a device according to the fourth embodiment.

Next, the status obtain response process of the device is described in detail below by using a flowchart shown in FIG. 59. The device opens a receiving port for receiving the status obtain request packet after being turned on so as to be put in a receivable status (step S5901). Subsequently after receiving the status obtain request packet from the client unit 111 (step S5902), the device status of itself is examined and the device determines the status information to be notified of (step S5903). For example, if "No Paper" occurs, the status information indicating "No Paper" is determined as information to be transmitted.

Subsequently, the device generates a response packet as shown in FIG. 60 including status information to be notified of (step S5904). Then, the device transmits the above generated response packet to the client unit 111 (step S5905) and ten enters a receivable status of the status obtain request packet again.

As set forth in the above, according to the fourth embodiment, a location of a device on a network can be transmitted to a user understandably and the device information can also be transmitted to the user.

In addition, since the device status is obtained by polling from the device, the device status can be obtained reliably even if the packet is temporarily lost on the network.

Fifth Embodiment

In a fifth embodiment, a description is made for a system for understandably notifying a user of a location of a device on a network and the device status. In the fifth embodiment, the device status is obtained from an event notice transmitted from the device.

The fifth embodiment is based on the first embodiment, and therefore different portions from those of the first embodiment are mainly described.

Figure 65:
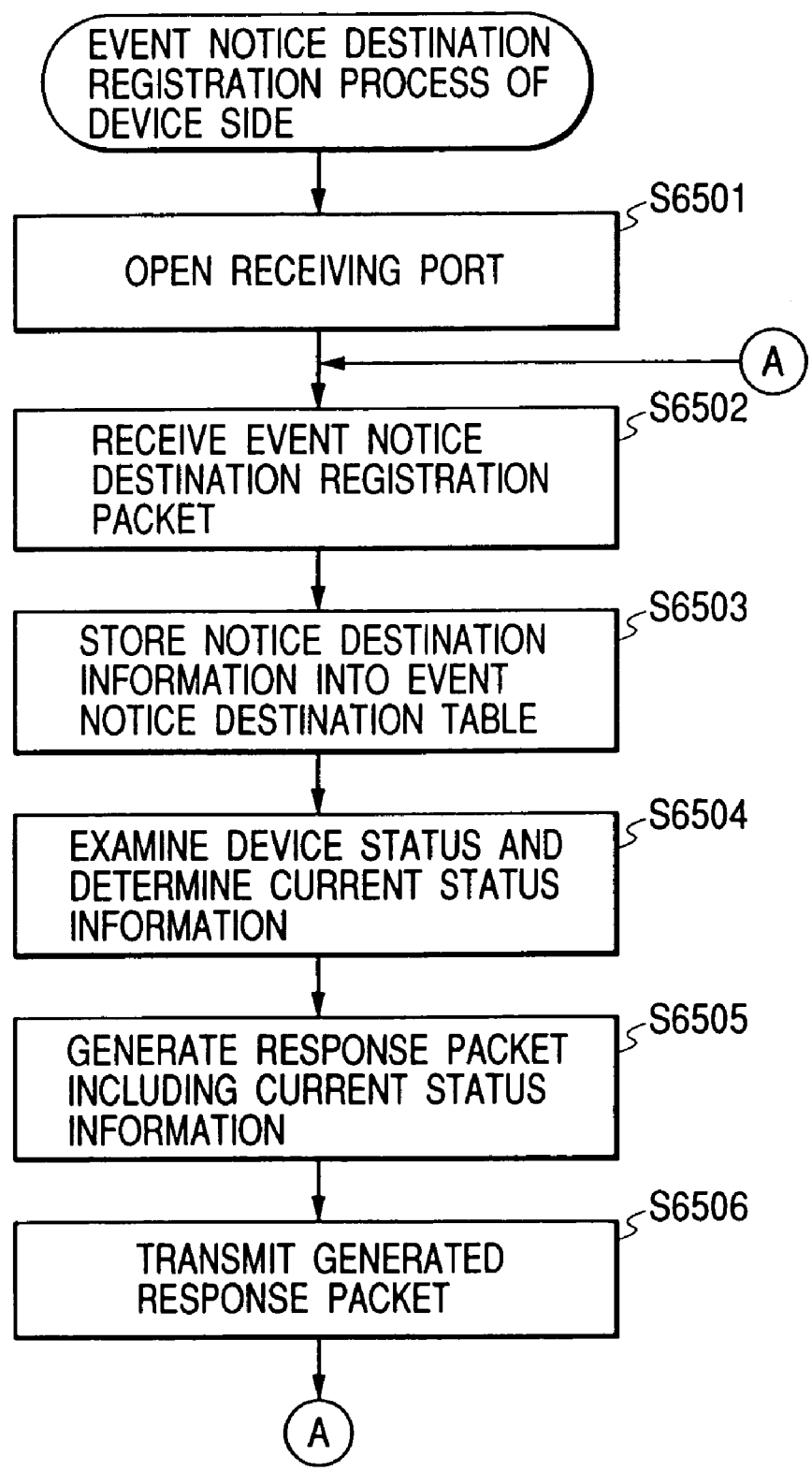
FIGS. 65 and 66 are flowcharts showing processes of a device according to the fifth embodiment.
Figure 66:
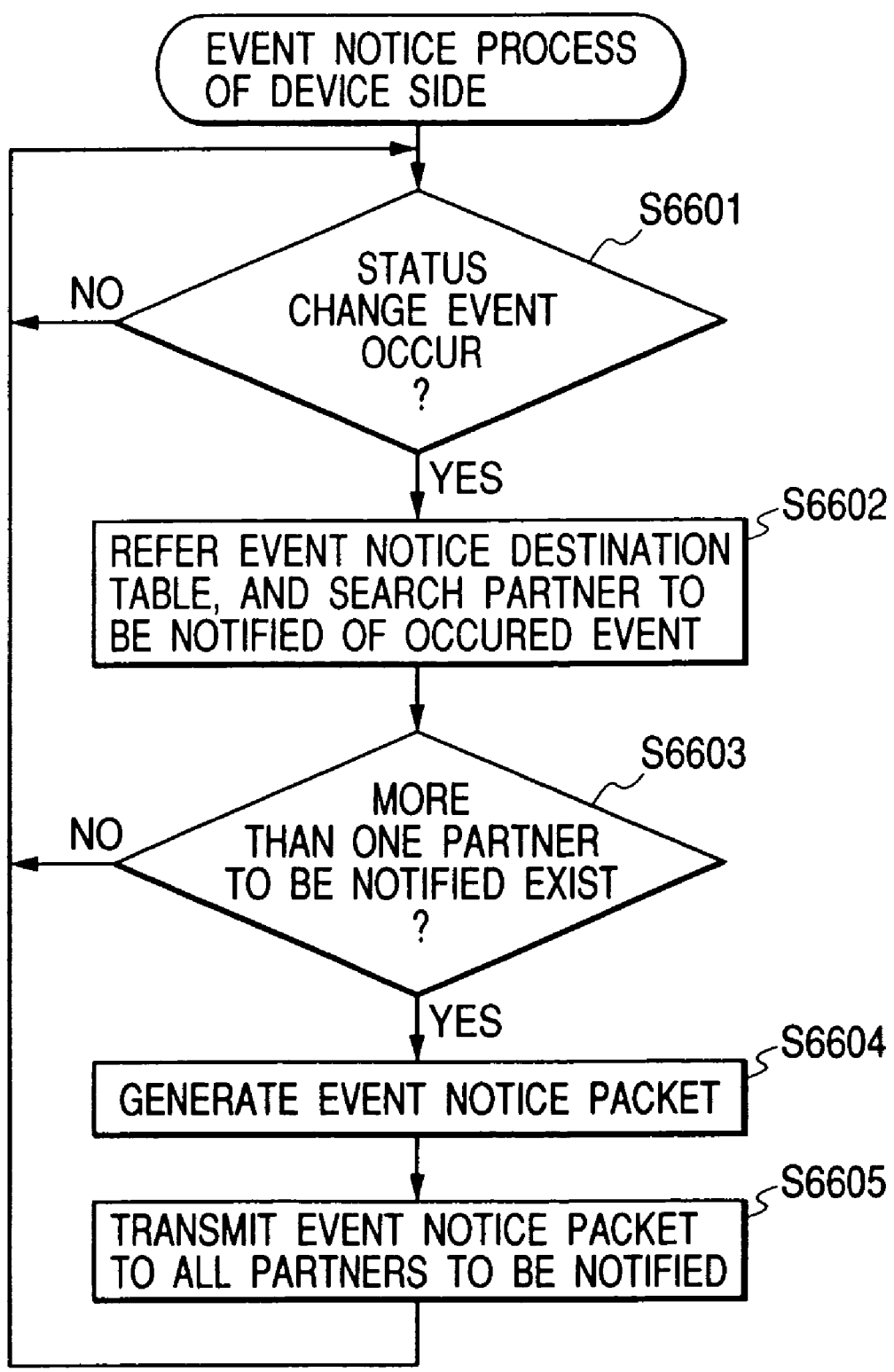

Referring to FIGS. 61 to 64, there are shown flowcharts of processes of a client unit 111 according to the fifth embodiment. In addition, FIGS. 65 to 66 are flowcharts of processes of the device according to the fifth embodiment. By using these flowcharts, this embodiment is described in detail below.

Figure 61:
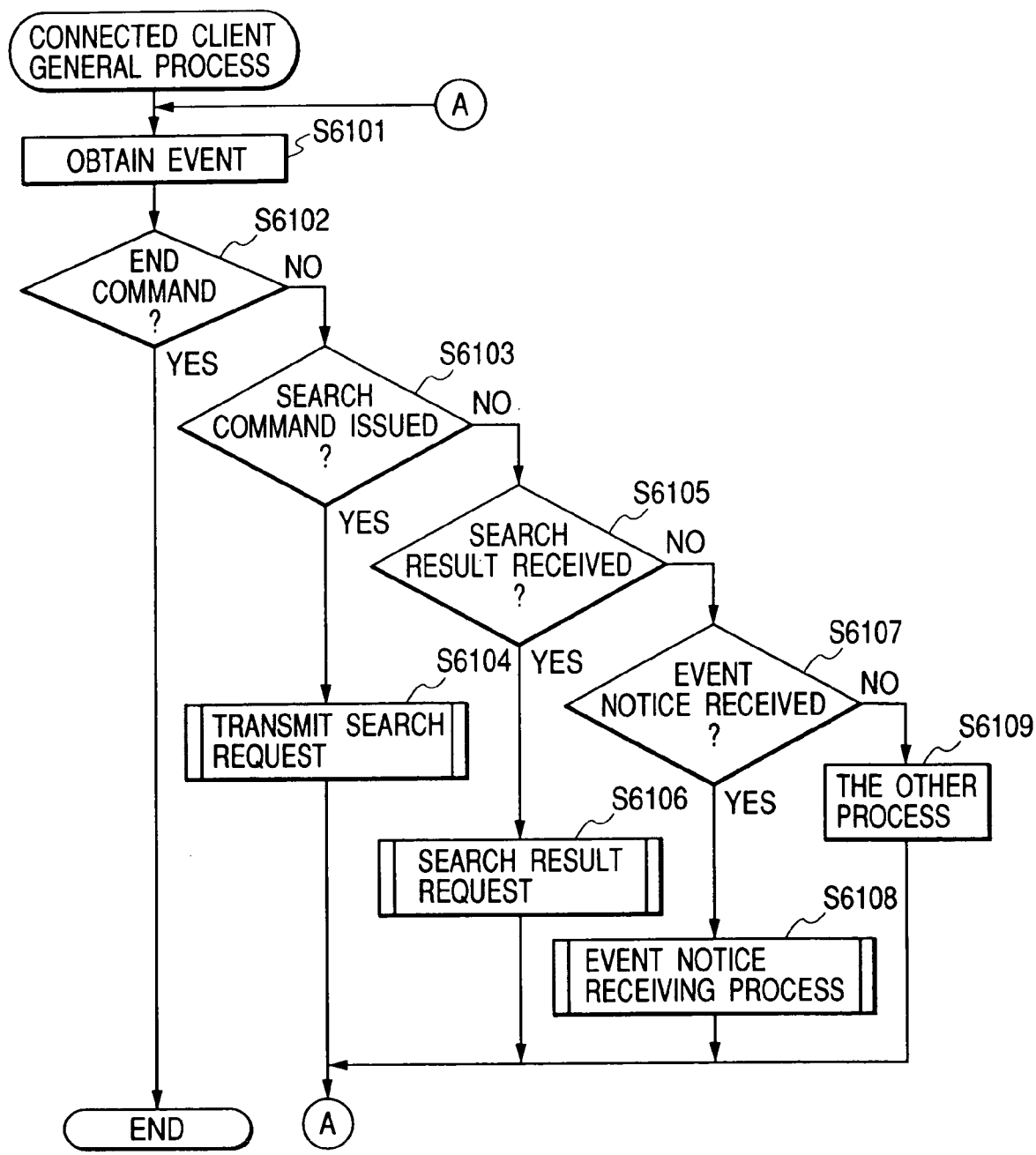
FIGS. 61, 62, 63 and 64 are flowcharts showing processes of a client unit according to a fifth embodiment.

Referring to FIG. 61, there is shown a flowchart of a general process of the client unit 111, in which processes of step S6107 and step S6108 are added to the processes of the first embodiment (FIG. 27). In the step S6107, it is judged whether or not an obtained event is an event notice reception (a response from the device to an event notice destination registration request issued in the search result process in the step S6106) from th device. If the event notice is judged to be received from the device, an event notice reception process described later (step S6108) is executed. Afterward, the control returns to step S6101 and the client unit 111 enters the event occurrence wait state again.

Figure 62:
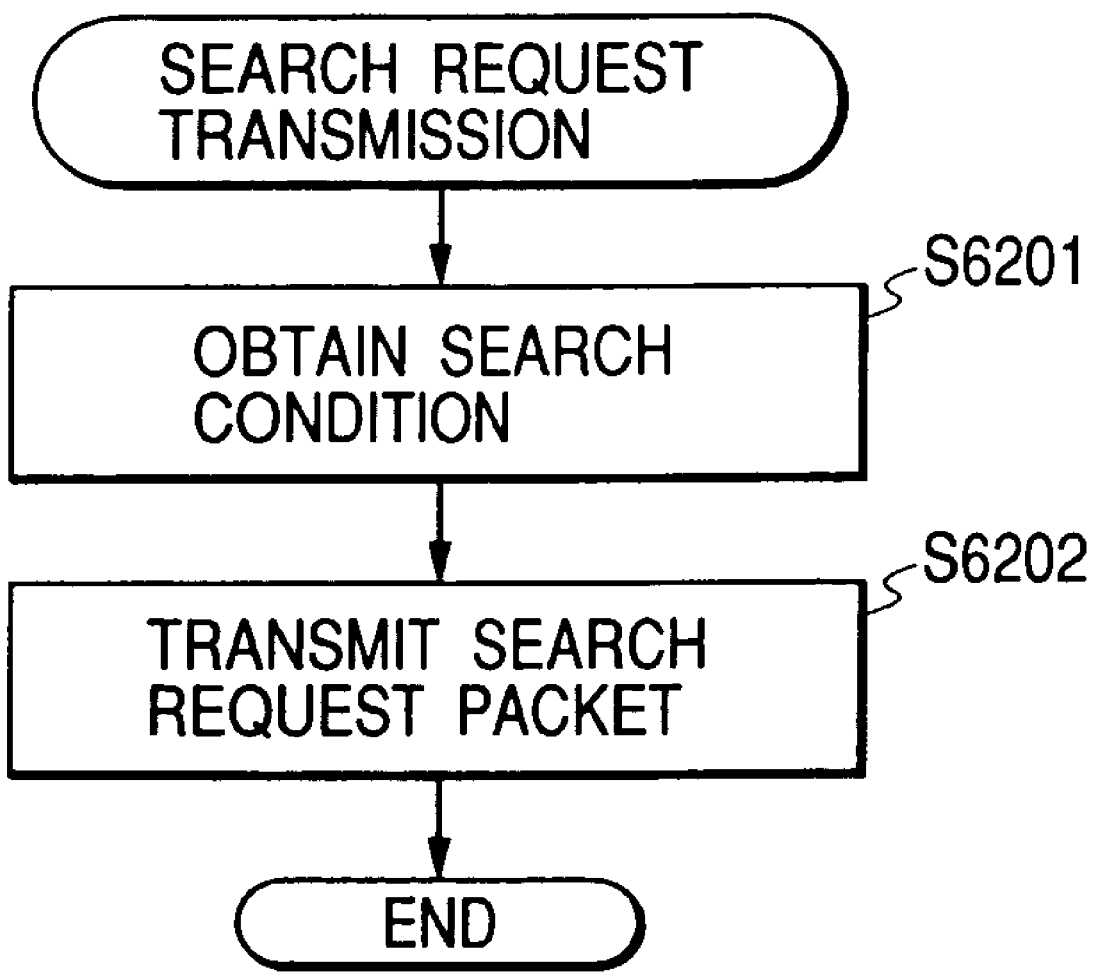

Referring to FIG. 62, there is shown a flowchart of a search request transmission process in the step S6104 shown in FIG. 61. This process is the same as the process described in the fourth embodiment.

Next, the search result process in the step S6106 shown in FIG. 61 is described in further detail below by using the flowchart in FIG. 63.

Figure 63:
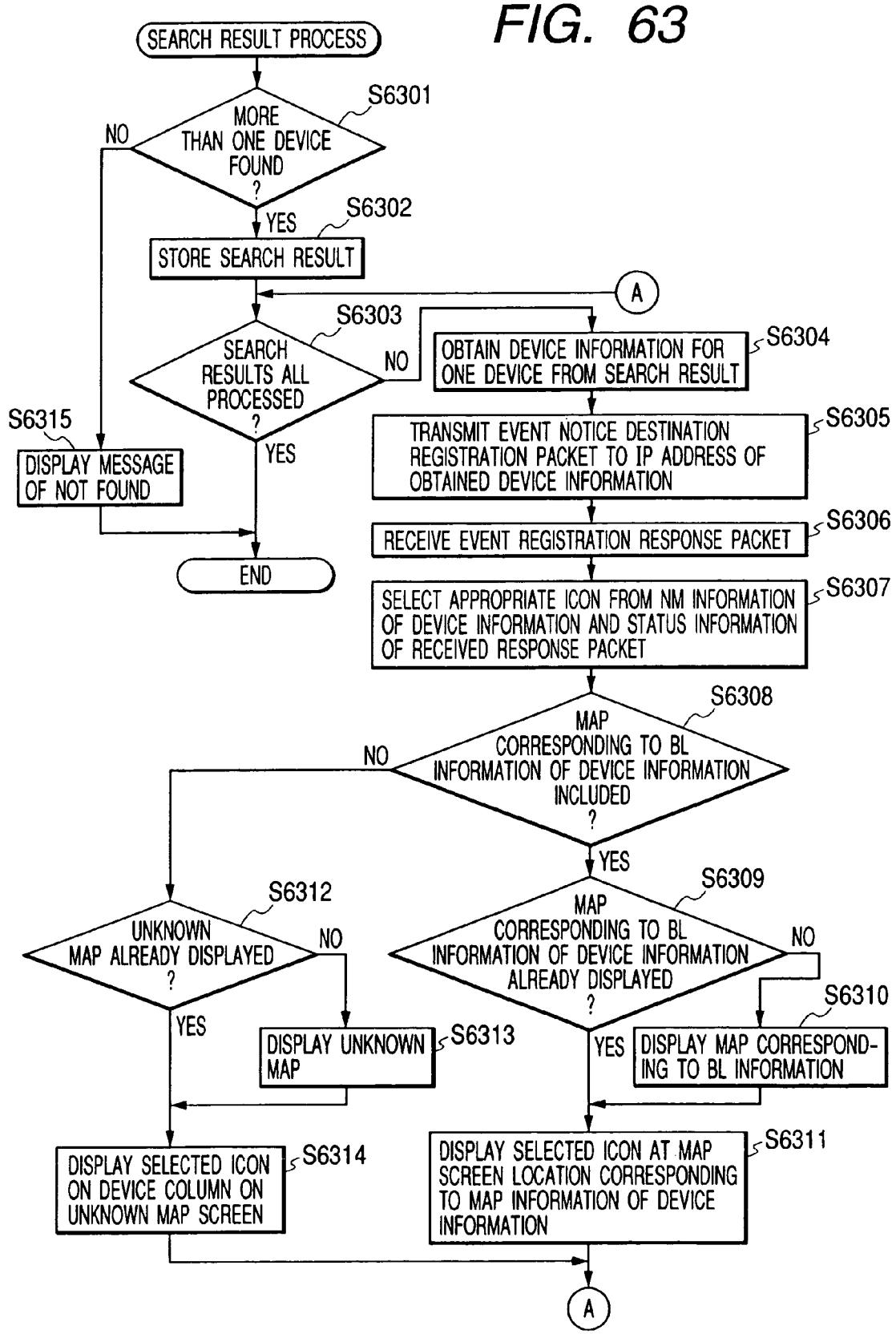

In FIG. 63, as a result of the device search, it is judged whether or not one or more devices satisfying the search condition are found (step S6301). If there is no device satisfying the search condition, the client unit displays a message (not shown) indicating that the specified device is not found (step S6315) and terminates the process.

On the other hand, if it is judged that one or more devices are found in the step S6301, the search result (location information and attribute information of the corresponding devices) is stored in a hard disk 211. For example, if a search result as shown in FIG. 14 is obtained, it is stored in the hard disk 211. After that, a status obtain process comprising the subsequent processes beginning with the process of the step S6303 is executed for each search result stored in the hard disk 211.

The status obtain process of this embodiment is a program for the client unit 111 to issue an event notice destination registration request to the device indicated by the search result, to obtain an event notice returned from the device as a response to it, and to display and superpose a device icon corresponding to the current status on a layout bit map according to device status information included in the event notice.

After the status obtain process is started, the search results stored in the hard disk 211 in the step S6302 are referenced first to judge whether or not all of the search results are completed to be processed, in other words, whether or not the event notice destination registration process is completed for the devices at all of the IP addresses included in the stored search results (step S6303). If all of the search results are completed to be processed, this process is terminated.

Figure 67:
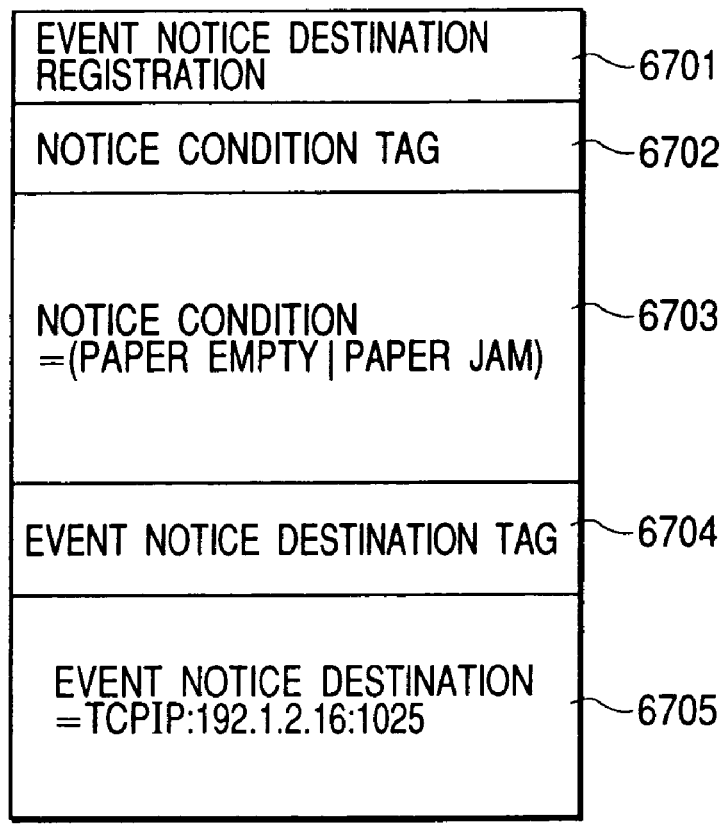
FIG. 67 is a diagram showing an event notice destination registration packet of the client unit according to the fifth embodiment.

On the other hand, if it is judged that there remains a search result which has not been processed yet, device information (location information and attribute information) of a single device is obtained from the search result which has not been processed yet (step S6304). Furthermore, an event notice destination registration packet as shown in FIG. 67 is transmitted to the IP addresses included in the obtained attribute information (step S6305). For example, if the search result shown in FIG. 14 is processed, an IP address is "192.1.2.1" and the event notice destination registration packet is transmitted to this IP address.

The event notice destination registration packet shown in FIG. 67 includes notice condition information for indicating what event occurrence causes an event notice to be executed and event notice destination information for indicating the notice destination.

In other words, a first field 6701 indicates that a content of this packet is an event notice destination registration. A second field 6702 is a tag for indicating that the subsequent information indicates a notice condition. A third field 6703 is used for storing information indicating an actual notice condition. A fourth field 6704 is a tag for indicating that the subsequent information indicates an event notice destination. The last field 6705 is used for storing information indicating an actual notice destination network address.

In this example shown in FIG. 67, an issue destination device of an event notice destination registration packet is a color printer 101 at the above IP address "192.1.2.1" with settings of "No Paper" and "Paper Jammed" of the color printer 101 as the notice condition information and a setting of IP address "192.1.2.16:1025" representing the client of itself.

After transmitting the event notice destination registration packet, the client unit enters a reception wait state for an event notice destination registration response packet. When receiving an event notice destination registration response packet as shown in FIG. 68 from a targeted device in the step S6306, the client unit selects an appropriate bit map icon corresponding to a device status out of the various device icons shown in FIG. 53 on the basis of the device name (NM) information included in the location information of the search result and on the device status information included in the received response packet (step S6307).

Figure 68:
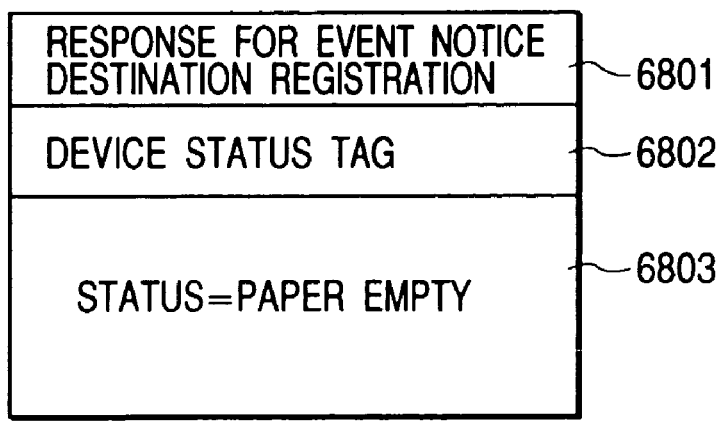
FIG. 68 is a diagram showing a response packet of a device according to the fifth embodiment.

Referring to FIG. 68, there is shown a diagram of the response packet transmitted from the device to the client unit 111. This response packet is transmitted to the event notice destination registration packet (FIG. 67) transmitted from the client unit 111 to the device in order to return the device status information representing the device status at that time.

In FIG. 68, a first field 6801 indicates that the content of this packet is a response of the event notice destination registration. A second field 6802 is a tag indicating that the subsequent information represents a device status. The last field 6803 is used to store information indicating actual device status (for example, an error code).

For example, if the client unit 111 receives the response packet as shown in FIG. 68, the device status information in the response packet indicates "No Paper" and therefore the device icon corresponding to the LBP 1110 shown in FIG. 53 is selected in the step S6307.

Next, it is judged whether or not the client unit 111 can display the layout bit map corresponding to the block (BL) information as location information, in other words, whether or not it stores the layout bit map information corresponding to the block (BL) information by using the information table shown in FIG. 15 (step S6308). In this embodiment, the location information which allows the client unit to display a layout bit map is location information including the information designated by 1401 in FIG. 15. Unless the location information includes this, it is judged whether or not an unknown map has already been displayed as shown in FIG. 20 (step S6312).

If the unknown map has not been displayed yet, the unknown map is displayed in the area 1901 shown in FIG. 20 (step S6313). After that, the device icon selected in the above step S6307 is displayed in the area 1902 shown in FIG. 20 (step S6314). In this case, the layout map has not been normally displayed. In other words, an icon of a device whose location information has not been registered yet is displayed here.

On the other hand, if it is judged that the client unit can display the layout bit map in the step S6308, it is judged whether or not the layout bit map corresponding to the block (BL) information in the location information has already been displayed (step S6309). If it is judged that the layout bit map has not been displayed yet, the layout bit map corresponding to the above block (BL) information is displayed on the screen (step S6310). For example, if the search result in FIG. 14 is processed, "2-1" is the block (BL) information of the color printer 101 (LBP 1100) found out by the search, and therefore the layout bit map shown in FIG. 18 corresponding to this is displayed.

Subsequently, the device icon selected in the above step S6307 is displayed at the corresponding display position on the layout bit map on the basis of the coordinate information (MAP) in the location information so as to be superposed on the layout bit map (step S6311). For example, if the search result in FIG. 14 is processed, "10X+10Y" is the coordinate information (MAP) of the color printer 101 (LBP 1100). In addition, if a result of querying the color printer 101 (LBP 1100) about status is "No Paper," a device bit map icon indicating "No Paper" is displayed at the position shown in FIG. 54. By displaying this device bit map icon so as to be superposed on the above layout bit map, the search result can be displayed as shown in FIG. 55.

Next, an operation of the event notice receiving process shown in the step S6108 in FIG. 61 is described in detail below by using a flowchart of FIG. 64.

Figure 64:
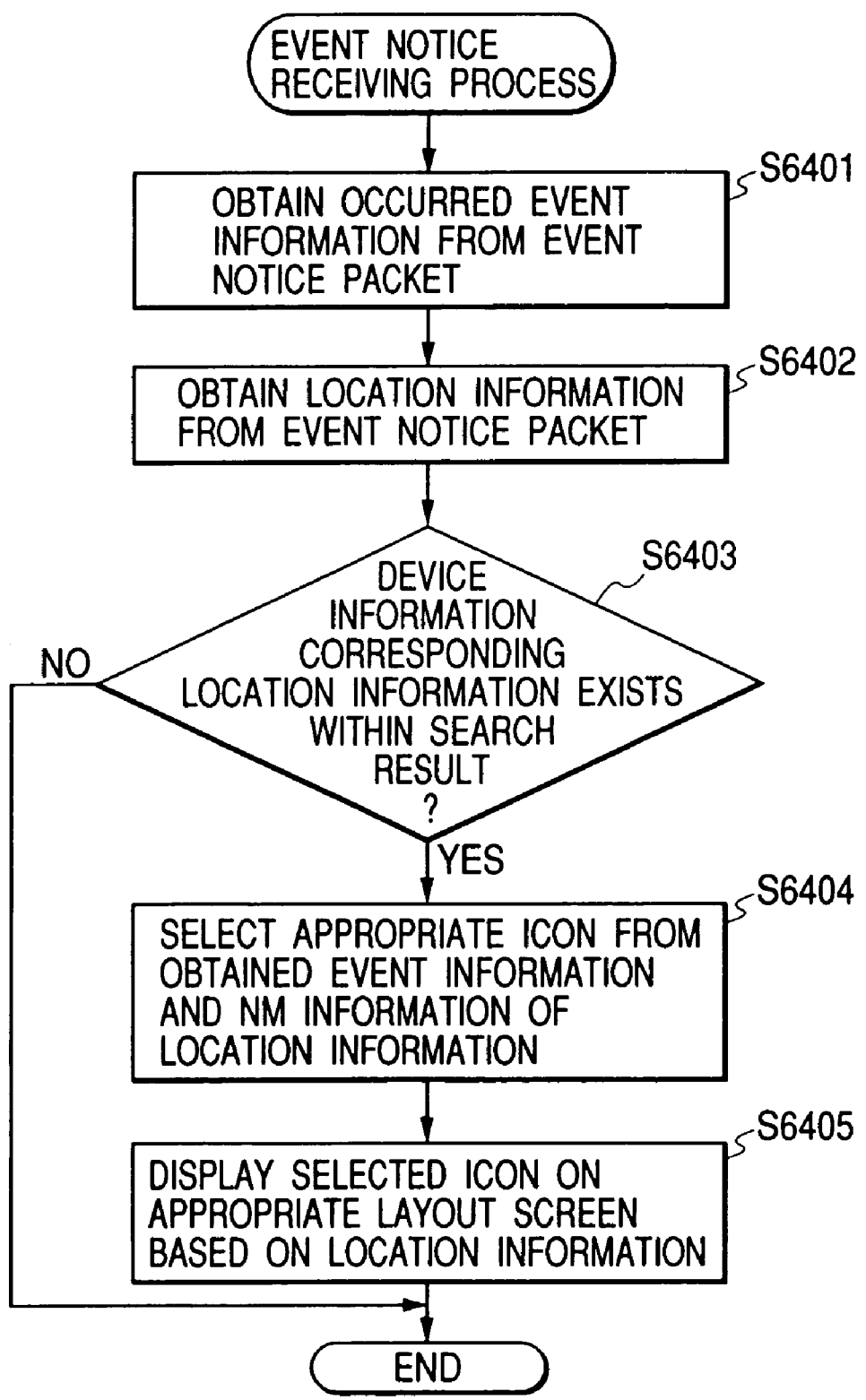

In FIG. 64, when receiving the event notice packet as shown in FIG. 69 from the device for which the event notice destination has been registered in the process of the step S6305 in FIG. 63, the client unit 111 obtains event information representing the content of the event which has occurred in the device from the event notice packet (step S6401) and then obtains location information indicating the device location (step S6402).

As shown in FIG. 69, each device monitors a status change of itself and at an occurrence of an event satisfying the notice condition registered from the client unit 111 it transmits information of the event to the notice destination registered from the client unit 111. At this time, the location information stored in the device is also transmitted in a packet together as a representation of the device location. An example in FIG. 69 shows a packet transmitted at an occurrence of an event of "No Paper" in the color printer 101 (LBP 1100).

Next, the client unit 111 judges whether or not there is device information having information matching the location information obtained from the above event notice packet in the search results stored in the hard disk by the device search process (step S6403). It is because the event notice destination registration process may be executed by another client unit 113 and therefore the location information of the device indicated in its own search result does not always match location information transmitted from the device at which the event has occurred.

If it is judged that there is no device information matching the location information in the event notice packet as a result of the judgment in the step S6403, the process is terminated directly. On the other hand, if there is matching device information, an appropriate device icon corresponding to the device status is selected out of the various device icons shown in FIG. 53 on the basis of the event information (status information) obtained from the event notice packet and on the device name (NM) information included in the location information (step S6404).

Subsequently, a layout bit map corresponding to the obtained location information is displayed on the screen and the device icon selected in the step S6404 is displayed at the corresponding display position on the layout bit map on the basis of the coordinate information (MAP) in the location information so as to be superposed on the layout bit map (step S6405). Accordingly, the device icon display is changed according to the device status change.

For example, if "Ready" as device status information is transmitted from the color printer 101 as a response to an event notice destination registration process which has been executed and further the "No Paper" event has occurred in the color printer 101 in a state that a device icon indicating the "Ready" status is displayed on the screen, the device icon indicating the "Ready" status is changed to an icon indicating the "No Paper" status as shown in FIG. 55 on the screen display.

Next, an operation of the event notice destination registration process of the device is described in detail below by using the flowchart shown in FIG. 65. In this description, the color printer 101 is focused on among the various devices to simplify the description.

The color printer 101 opens a receiving port for receiving an event notice destination registration packet as shown in FIG. 67 from the client unit 111 after being turned on, by which it enters a receivable status (step S6501). After that, when receiving an event notice destination registration packet from a search client PC (step S6502), the color printer stores a notice condition and notice destination information included in the event notice destination registration packet in the event notice destination table as shown in FIG. 70 for management (step S6503).

An event notice destination table shown in FIG. 70 is stored in the device, also including communication protocol information in addition to the notice condition registered from the client unit 111 and the notice destination network address.

Next, the color printer 101 examines the status of itself at the time when receiving the above event notice destination registration packet and determines status information to be transmitted (step S6504). For example, if the "No Paper" status occurs, status information indicating "No Paper" is determined as information to be transmitted. Next, the color printer generates a response packet as shown in FIG. 68 including the current status information to be transmitted (step S6505). Then, the color printer transmits the generated response packet to the client unit 111 which has issued the above event notice destination registration packet (step S6506) and then enters the event notice destination registration packet receivable status, again.

Next, an operation of an event notice process executed by the device will be described in detail below by using the flowchart shown in FIG. 66. In this description, the color printer 101 is focused on among the various devices to simplify the description, too.

The color printer 101 monitors status changes of itself to judge whether or not a status change event has occurred (step S6601). If a status change event occurs, the event notice destination table as shown in FIG. 70 is referenced and a client unit to be notified of the event occurrence is searched for (step S6602).

Then, it is judged whether or not there are one or more client units to be notified of the event (step S6603). At this point, it is judged whether or not there are client units in which the event which has occurred in the above color printer 101 is registered as a notice condition in the event notice destination table. If there are these client units, the device generates the event notice packet as shown in FIG. 69 including the event information (step S6604) and transmits it to all the client units to be notified of (step S6605). After that, the control returns to the step S6601 to enter the wait state for status change event occurrence, again.

While the layout bit map is stored in the client unit 111 in the fourth and fifth embodiments, the layout bit map can be stored in the server unit as described in the second embodiment.

While only the layout bit map corresponding to the block (BL) class is stored in the fourth and fifth embodiments, layout bit maps corresponding to respective classes of the hierarchical location information can be stored so as to be reflected on the search result display of the client unit 111 as described in the third embodiment.

As set forth hereinabove, according to the fifth embodiment, a user can be understandably informed of a location of a device on a network in addition to the device information. In addition, the device status is obtained by an event notice from the device, by which a network traffic can be reduced in comparison with a method of obtaining the device status by polling.

Other Embodiments

The above device search system can be achieved by using a technology used for the WWW technology, for example. In this case, a server 112 has a WWW server, a database feature (DBMS), and a gateway feature mediating between the WWW server and the DBMS. The WWW server provides a search screen with HTML or XML forms to a client. The client displays the search screen provided by the WWW server by means of a browser software and a user executes a search for a device using the displayed search screen. Furthermore, various types of data (MAP, icon, etc.) transmitted or received to or from the server, client, and device is provided with HTML, XML or other forms. To achieve a feature not included in a general-purpose browser software in the client unit, Applet which is one of the JAVA technologies can be used, for example.

The present invention can be applied to a system comprising a plurality of devices (for example, a host computer, an interface devices, a reader, a printer, etc.) or to a unit comprising a single device.

In this case, a program code itself of the above software achieves the feature of the above embodiment and the present invention comprises the program code itself and a means for supplying the program code to the computer, for example, a storage medium storing this kind of program code. As a storage medium for storing this kind of program code, there are a floppy disk, a hard disk, an optical disk, an optical magnetic disk, a CD-ROM, a magnetic tape, a non-volatile memory card, a ROM, for example.

A device control program on a network according to the present invention as set forth in the above can be executed by a PC 200 by using an externally-installed program. If so, the present invention is also applicable if the program is supplied to the PC 200 by means of a storage medium such as a CD-ROM, a flash memory, or a floppy disk or by loading information groups including the program from an external storage medium onto the PC 200 via a network such as an electronic mail or a personal computer communication.

Figure 30:
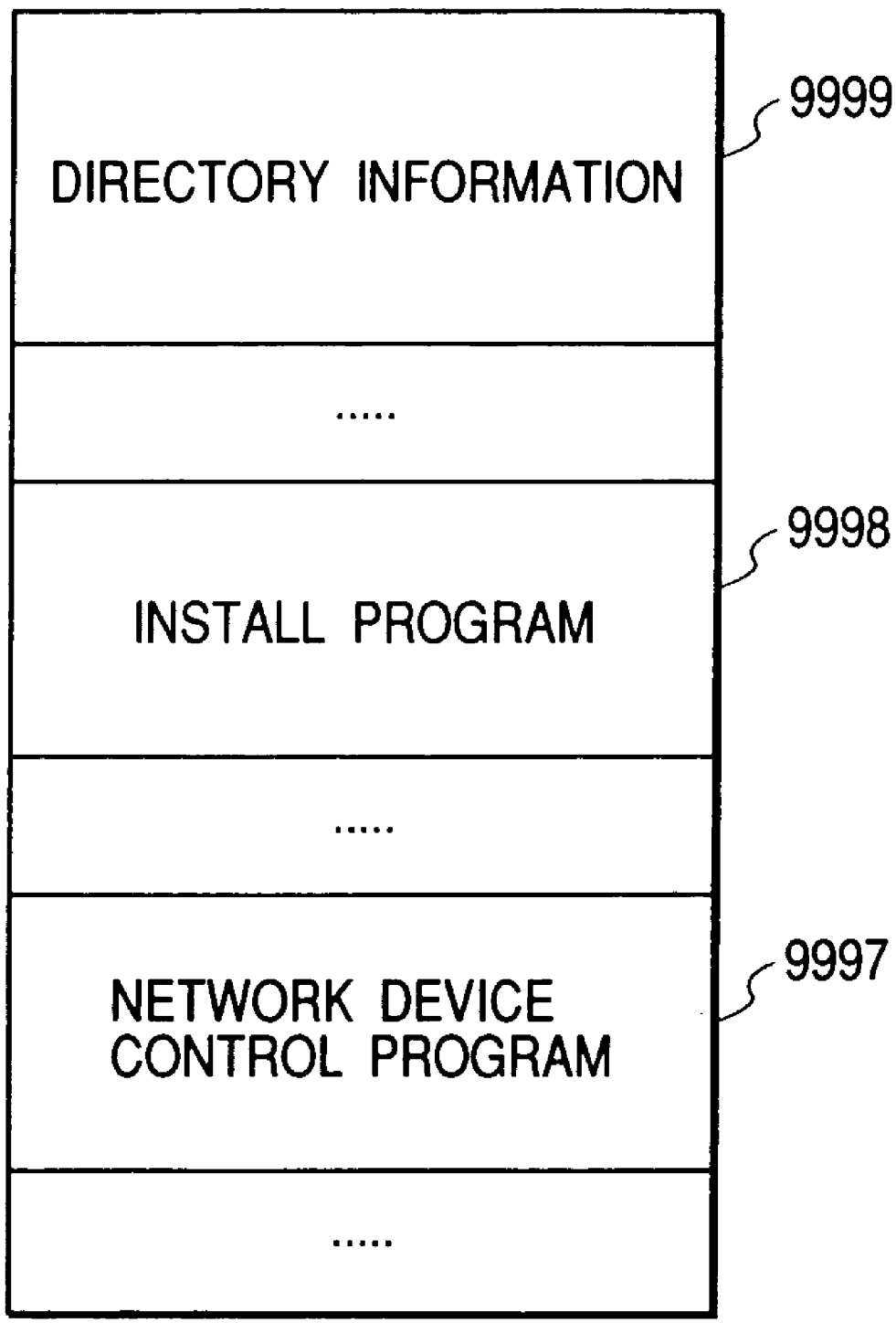
FIG. 30 is a diagram of assistance in explaining a memory map of a CD ROM.

For example, FIG. 30 shows a memory map of a CD-ROM which is an example of a storage medium.

In FIG. 30, an area 9999 is used for storing directory information, which indicates locations of subsequent areas such as an area 9998 for storing an install program and an area 9997 for storing a network device terminal equipment control program.

The area 9998 is used for storing an install program. The area 9997 is used for storing a network device control program. When the network control program of the present invention is installed in the PC 200, the install program stored in the area 9998 for storing the install program is loaded to the system first and then executed by the CPU 202.

Next, the install program executed by the CPU 202 reads the network device control program from the area 9997 for storing the network device control program and then stores it to the hard disk 211.

In addition, it is apparent that an application of the program code is within a scope of this embodiment in not only a case that the feature of the above embodiment is achieved by an execution of a program code with a computer, but a case that the feature of the embodiment is achieved by an execution of a program code with an operating system running in the computer or jointly with other application software.

Furthermore, it is apparent that an achievement of the feature of the above embodiment is within a scope of this invention if a supplied program code is stored into a memory installed in a feature expansion board of a computer or in a feature expansion unit connected to a computer and then a CPU or the like installed in the feature expansion board or the feature expansion unit executes a part or all of the actual processing on the basis of instructions of the program code, by which the feature of the above embodiment is achieved.

What is claimed is:

1. An information processing apparatus, comprising:
   a first transmitting unit adapted to transmit a job to a device connected to the information processing apparatus through a network;
   a second transmitting unit adapted to transmit to said device an event condition indicating an event that is to be notified by said device to said information processing apparatus;
   a receiving unit adapted to receive from said device event notification information of the event corresponding to the event condition transmitted by said second transmitting unit; and
   a display unit adapted to display information indicating said device and the received event notification information on a map for displaying a location of said device.

2. An information processing apparatus according to claim 1, further comprising a storing unit adapted to store map data for displaying the location of said device,
   wherein, said display unit displays the information indicating said device on the map displayed based on the map data.

3. An information processing apparatus according to claim 1, wherein, said display unit changes a display status of the information indicating said device according to a content of the received event notification information.

4. An information processing app apparatus according to claim 1, further comprising a second receiving unit adapted to receive map data for displaying the location of said device from another information processing apparatus on said network,
   wherein, said display unit displays the information indicating said device on the map displayed based on the map data received by said second receiving unit.

5. An information processing apparatus according to claim 1, further comprising a storing unit adapted to store map data corresponding to plural hierarchical location information for displaying the location of said device,
   wherein, said display unit displays the information indicating said device on the map displayed based on the map data.

6. An information processing apparatus according to claim 1, wherein said display unit displays the information indicating said device and the event notification information on a same screen.

7. An information processing apparatus according to claim 1, wherein said second transmitting unit transmits the event condition with respect to each job to be executed by said device.

8. An information processing apparatus according to claim 1, wherein said display unit displays an identifier of the job to be executed by said device and the event notification information on the map.

9. A device for processing a job requested from an information processing apparatus via a network, comprising:
   a storing unit adapted to store display location information on a map for displaying a location of said device;
   a receiving unit adapted to receive from said information processing apparatus an event condition indicating an event that is to be notified to said information processing apparatus; and
   a transmission unit adapted to transmit event notification information corresponding to the event condition received by said receiving unit and said display location information to said information processing apparatus according to an occurrence of said event.

10. A system having a device for processing a job requested from an information processing apparatus via a network and said information processing apparatus:
    said device comprising:
    a storing unit adapted to store display location information on a map for displaying a location of said device;
    a receiving unit adapted to receive from said information processing apparatus an event condition indicating an event that is to be notified to said information processing apparatus; and
    a transmission unit adapted to transmit event notification information corresponding to the event condition received by the receiving unit and said display location information to said information processing apparatus according to an occurrence of said event; and
    said information processing apparatus comprising:
    a receiving unit adapted to receive the event notification information corresponding to the event condition and the display location information transmitted by the transmission unit of said device; and
    a display unit adapted to display the location information of said device and the event notification information on the map for displaying the location of said device.

11. An information processing method of an information processing apparatus, comprising the steps of:
    a first transmitting step of transmitting a job to a device connected to the information processing apparatus through a network;
    a second transmitting step of transmitting to said device an event condition indicating an event that is to be notified by the device to the information processing apparatus;
    a receiving step of receiving from said device event notification information of the event corresponding to the event condition transmitted in the second transmitting step; and
    a display step of displaying information indicating said device and the received event notification information on a map for displaying a location of said device.

12. An information processing method according to claim 11, further comprising the step of storing map data for displaying the location of the device,
    wherein, the display step displays the information indicating the device on the map displayed based on the map data.

13. An information processing method according to claim 11, wherein, said display step changes a display status of the information indicating the device according to a content of the received event notification information.

14. An information processing method according to claim 11, further comprising a second receiving step of receiving map data for displaying the location of the device from another information processing apparatus on said network,
   wherein, said display step displays the information indicating the device on the map displayed based on the map data received by the second receiving step.

15. An information processing method according to claim 11, further comprising a storing step of storing map data corresponding to plural hierarchical location information for displaying the location of the device,
   wherein, the display step displays the information indicating the device on the map displayed based on the map data.

16. An information processing method according to claim 11, wherein the display step displays the information indicating the device and the event notification information on a same screen.

17. An information processing method according to claim 11, where said second transmitting step transmits the event condition with respect to each job to be executed by the device.

18. An information processing method according to claim 11, wherein said display step displays an identifier of the job to be executed by the device and the event notification information on the map.

19. A device control method of processing a requested job from an information processing apparatus via a network, comprising the steps of:
   a storing step of storing display location information on a map for displaying a location of the device;
   a receiving step of receiving from said information processing apparatus an event condition indicating an event that is to be notified to said information processing apparatus; and
   a transmitting step of transmitting event notification information corresponding to the event condition received by the receiving step and the display location information to said information processing at an occurrence of said event.

20. A storage medium storing a computer program to be executed by a computer of an information processing apparatus, said computer program comprising the steps of:
   a first transmitting step of transmitting a job to a device connected to the information processing apparatus through a network;
   a second transmitting step of transmitting to said device an event condition indicating an event that is to be notified by said device to said information processing apparatus;
   a receiving step of receiving from said device event notification information of the event corresponding to the event condition transmitted by the second transmitting step; and
   a display step of displaying information indicating the device and the received event notification information on a map for displaying a location of the device.

21. A storage medium storing a computer program to be executed by a computer of a device for processing a job requested from an information processing apparatus via a network, said computer program comprising the steps of:
   a storing step of storing display location information on a map for displaying a location of said device;
   a receiving step of receiving from said information processing apparatus an event condition indicating an event that is to be notified to said information processing apparatus; and
   a transmitting step of transmitting event notification information corresponding to the event condition received by the receiving step and said display location information to said information processing apparatus according to an occurrence of said event.

* * * * *

UNITED STATES PATENT AND TRADEMARK OFFICE
CERTIFICATE OF CORRECTION

PATENT NO. : 7,099,937 B1
APPLICATION NO. : 09/609222
DATED : August 29, 2006
INVENTOR(S) : Masato Ochiai et al.

It is certified that error appears in the above-identified patent and that said Letters Patent is hereby corrected as shown below:

COVER PAGE:
(56) References Cited U.S. Patent Documents
"2003/0115199 A1 6/2003 Ochial et al." should read
-- 2003/0115199 A1 6/2003 Ochiai et al., --; and
"2004/0083210 A1 4/2004 Ochial et al." should read
--2004/0083210 A1 4/2004 Ochiai et al. --.

COLUMN 4:
Line 46, "printer," should read -- printer 101, --; and
Line 50, "140" should read -- 104 --.

COLUMN 8:
Line 27, "branchÓ" should read -- branch --.

COLUMN 9:
Line 14, "unknown" should read -- "unknown --.

COLUMN 12:
Line 30, "ten" should read -- then --.

COLUMN 16:
Delete lines 9-14.

COLUMN 18:
Line 44, "vale" should read -- value --.

COLUMN 21:
Line 32, "ten" should read -- then --; and
Line 65, "th" should read -- the --.

COLUMN 26:
Line 30, "devices," should read -- device, --.

UNITED STATES PATENT AND TRADEMARK OFFICE
CERTIFICATE OF CORRECTION

PATENT NO. : 7,099,937 B1
APPLICATION NO. : 09/609222
DATED : August 29, 2006
INVENTOR(S) : Masato Ochiai et al.

It is certified that error appears in the above-identified patent and that said Letters Patent is hereby corrected as shown below:

<u>COLUMN 27</u>:
Line 45, delete "app".

Signed and Sealed this

Tenth Day of July, 2007

JON W. DUDAS
*Director of the United States Patent and Trademark Office*